(12) United States Patent
Lee et al.

(10) Patent No.: US 8,634,457 B2
(45) Date of Patent: *Jan. 21, 2014

(54) DETERMINING AVAILABILITY OF VIDEO DATA UNITS

(75) Inventors: Yen-Chi Lee, San Diego, CA (US); Kai Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 962 days.

This patent is subject to a terminal disclaimer.

(21) Appl. No.: 12/239,230

(22) Filed: Sep. 26, 2008

(65) Prior Publication Data

US 2010/0080285 A1    Apr. 1, 2010

(51) Int. Cl.
*H04N 7/12* (2006.01)
(52) U.S. Cl.
USPC ............. 375/240.02; 375/240.01; 375/240.12
(58) Field of Classification Search
USPC .......................... 375/240.01, 240.02, 240.24
See application file for complete search history.

(56) References Cited

U.S. PATENT DOCUMENTS

| | | | | |
|---|---|---|---|---|
| 4,961,114 | A * | 10/1990 | White | 348/597 |
| 5,381,274 | A * | 1/1995 | Ueda | 360/48 |
| 6,330,552 | B1 * | 12/2001 | Farrar et al. | 705/400 |
| 6,519,287 | B1 | 2/2003 | Hawkins et al. | |
| 7,599,435 | B2 | 10/2009 | Marpe et al. | |
| 2005/0259734 | A1 | 11/2005 | Hellman | |
| 2005/0259747 | A1 | 11/2005 | Schumann | |
| 2005/0281336 | A1 | 12/2005 | MacInnis | |
| 2007/0230582 | A1 | 10/2007 | Chiu | |
| 2008/0056347 | A1 | 3/2008 | Chiu et al. | |
| 2008/0075173 | A1 | 3/2008 | Jain et al. | |
| 2010/0080284 | A1 | 4/2010 | Lee et al. | |
| 2010/0080296 | A1 | 4/2010 | Lee et al. | |

FOREIGN PATENT DOCUMENTS

| | | |
|---|---|---|
| TW | 423258 B | 2/2001 |
| WO | 2006066195 | 6/2006 |
| WO | WO2007027414 A2 | 3/2007 |
| WO | WO2007038727 | 4/2007 |

OTHER PUBLICATIONS

A Novel Secure H.264 Transcoder using Selective Encryption; Thomas, N.M.; Lefol, D.; Bull, D.R.; Redmill, D.; Image Processing, 2007. ICIP 2007. IEEE International Conference on; vol. 4 Publication Year: 2007 , pp. IV-85-IV-88.*

(Continued)

*Primary Examiner* — Linglan Edwards
(74) *Attorney, Agent, or Firm* — Elaine H. Lo

(57) ABSTRACT

An apparatus performs efficient coding techniques to more efficiently determine an availability of neighboring video data units determined for the current video data unit. The apparatus comprises an availability determination unit that maintains an availability counter. The availability determination unit determination unit increments the availability counter after each of the plurality of video data units are processed and determines, based on the availability counter, whether one or more of the plurality of video data units (i) have been previously processed and (ii) are available for use as neighboring video data units in the processing of a current one of the plurality of video data units video data units. The apparatus further processes the current video data unit based on the determination of whether one or more of the neighboring video data units are available.

49 Claims, 35 Drawing Sheets

(56) References Cited

OTHER PUBLICATIONS

Exploiting MPEG-7 texture descriptors for fast H.264 mode decision; Ni, K.S.; Nguyen, T.Q.; Image Processing, 2008. ICIP 2008. 15th IEEE International Conference on ; Publication Year: 2008 , pp. 2796-2799.*

Xstream-X264: Real-time H.264 streaming with cross-layer integration; Sarwar, Golam; Boreli, Roksana; Lochin, Emmanuel; Multimedia and Expo (ICME), 2011 IEEE International Conference on; Publication Year: 2011 , pp. 1-4.*

Techniques to improve decoded video quality for erroneous H.264 bit streams in an asynchronous multiprocessor architecture; Signal Processing and Communications (SPCOM), 2012 International Conference on; Jul. 22-25, 2012; Author(s): Rajendran, R.*

Tourapis, et al., "Motion Vector Prediction With Reference Frame Consideration," Applications of Digital Image Processing XXVI., Proceedings of the SPIE, vol. 5203, pp. 440-447 (2003).

ITU-T H.264, "Series H: Audiovisual and Multimedia Systems," Mar. 2005. (H.264 standard), sections 6.3 and 6.4.

International Search Report & Written Opinion—PCT/US2009/058069, International Search Authority—European Patent Office—Feb. 3, 2010.

Partial International Search Report—PCT/US2009/058069, International Search Authority—European Patent Office—Dec. 11, 2009.

Wiegand T er al: "Overview of the H.24/AVC video coding standard" IEEE Transactions on Circuits and Systems for Video Technology, IEEE Service Center, Piscataway, NJ, US, vol. 13, No. 7, Jul. 1, 2003, pp. 560-576, XP011099249.

Taiwan Search Report—TW098132561—TIPO—Mar. 22, 2013.

* cited by examiner

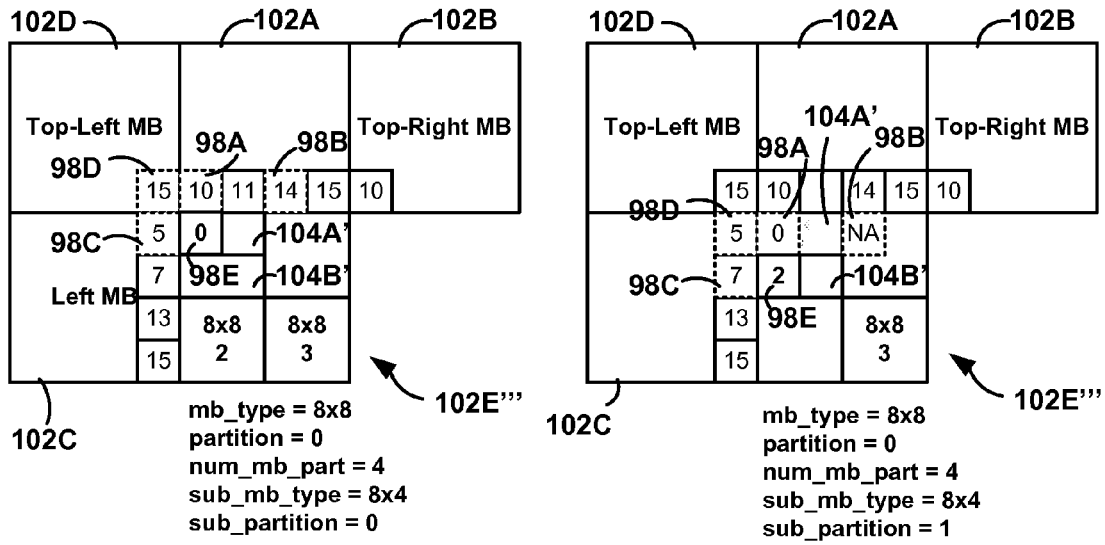
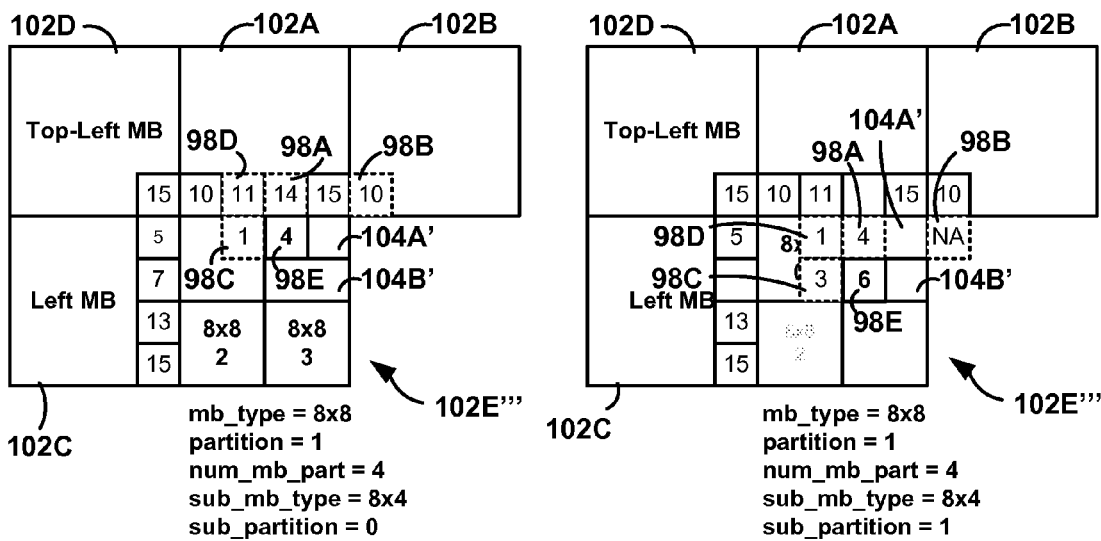
FIG. 6E

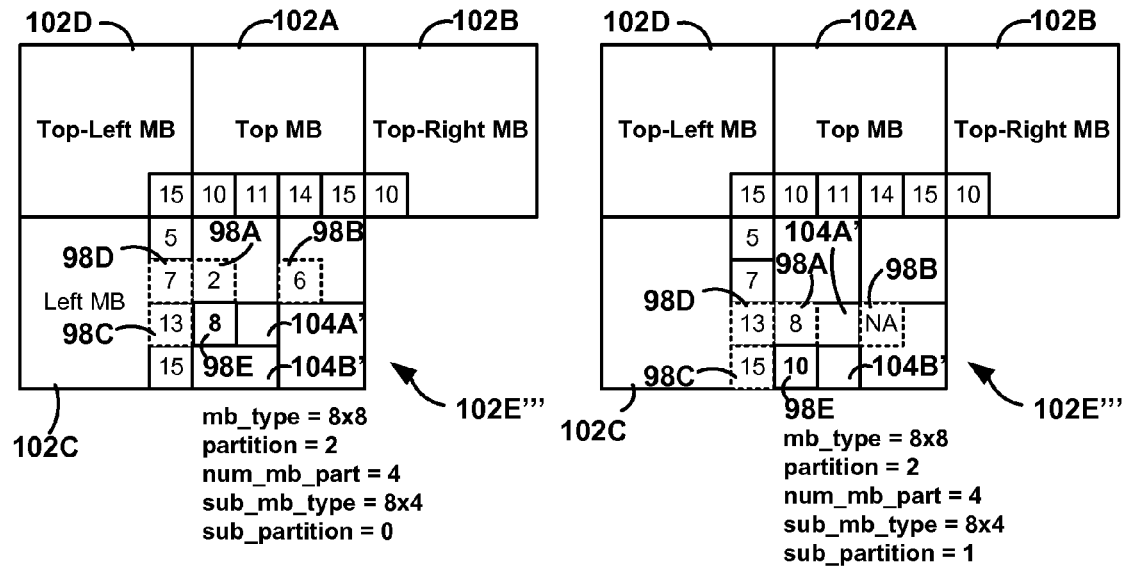
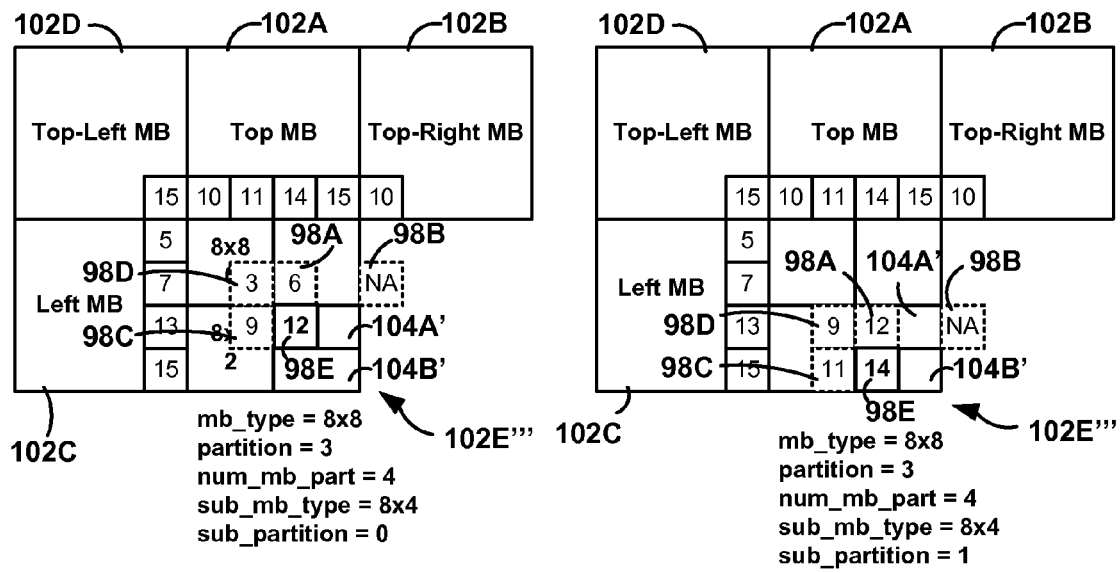
FIG. 6F

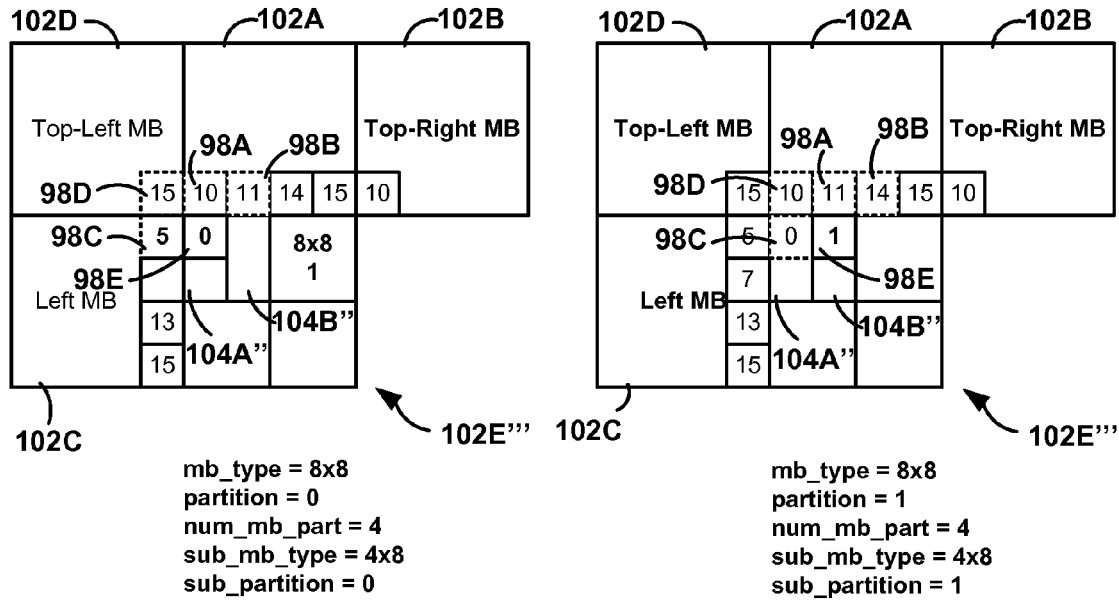
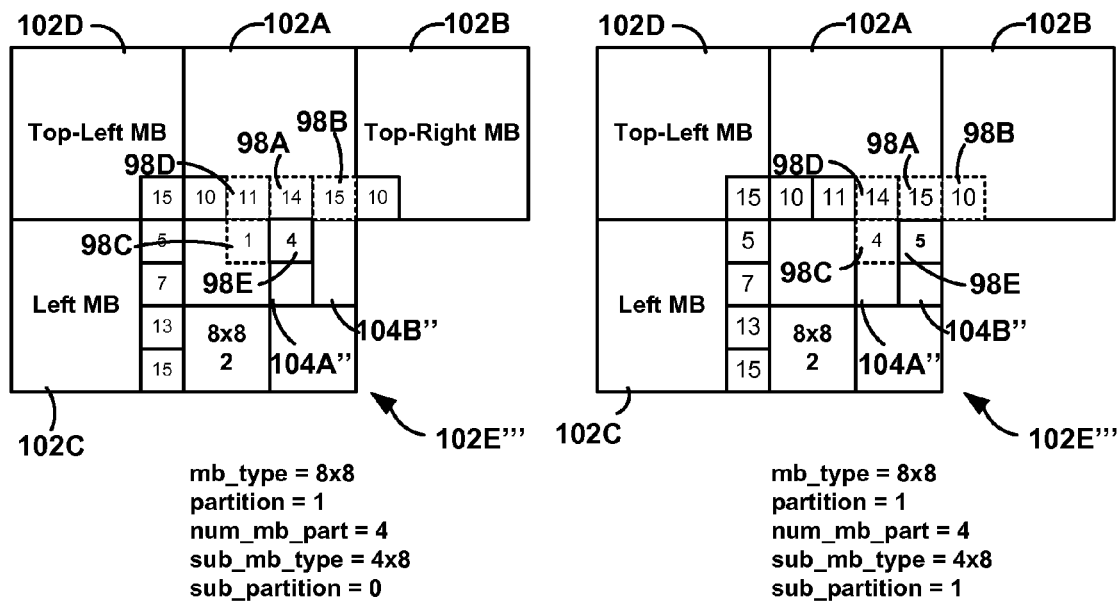
FIG. 6G

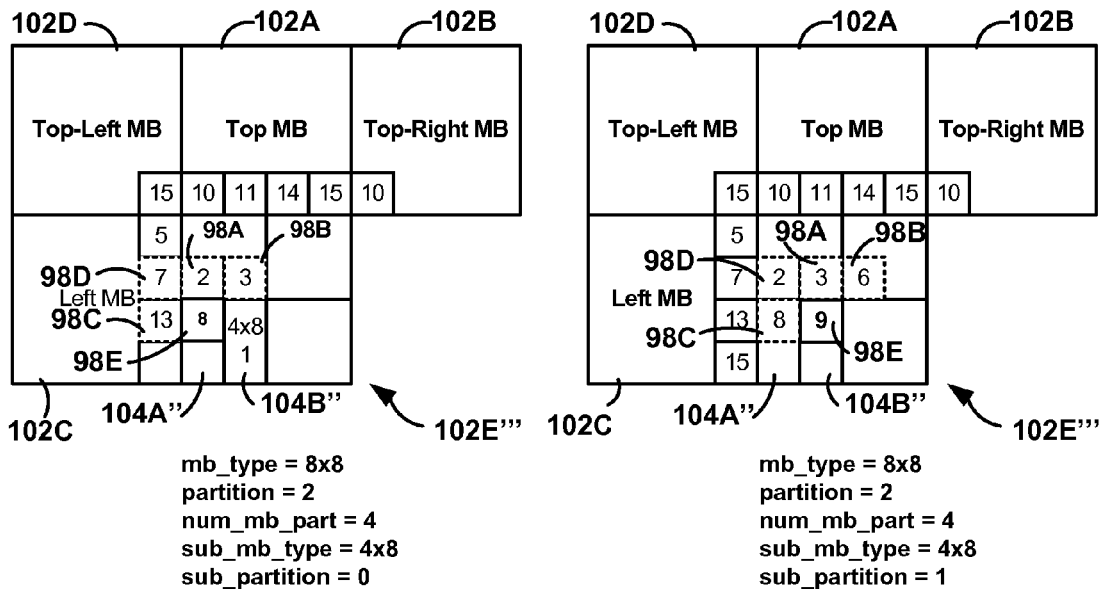
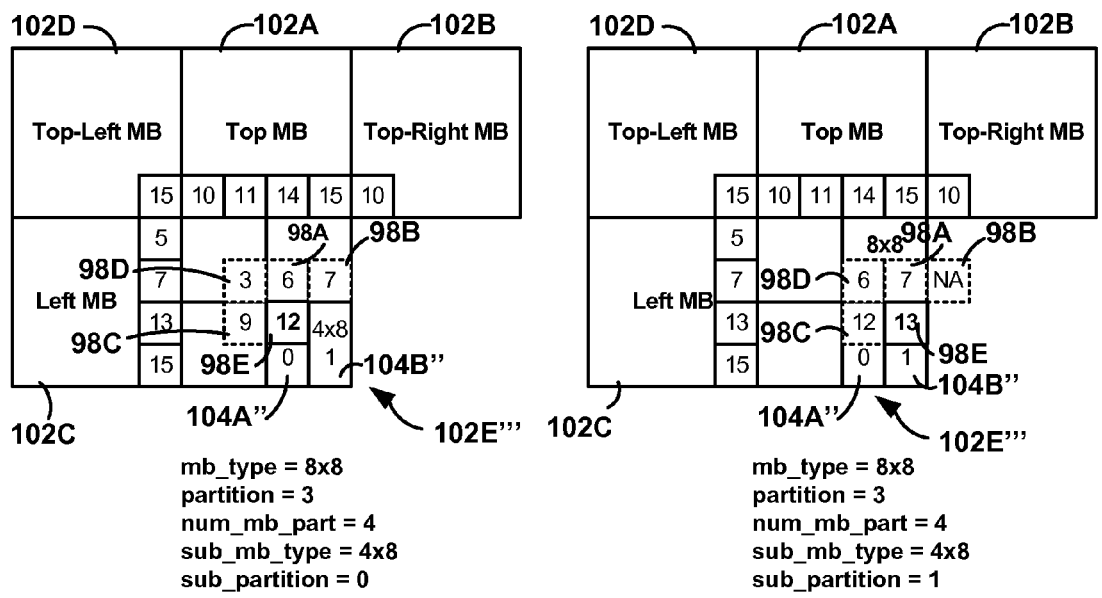
FIG. 6H

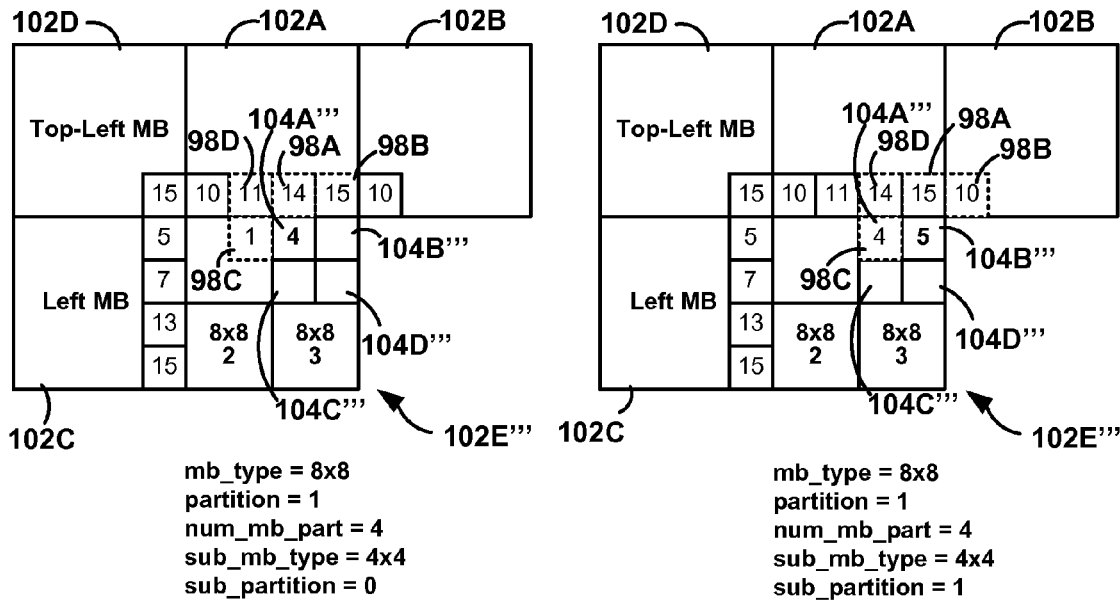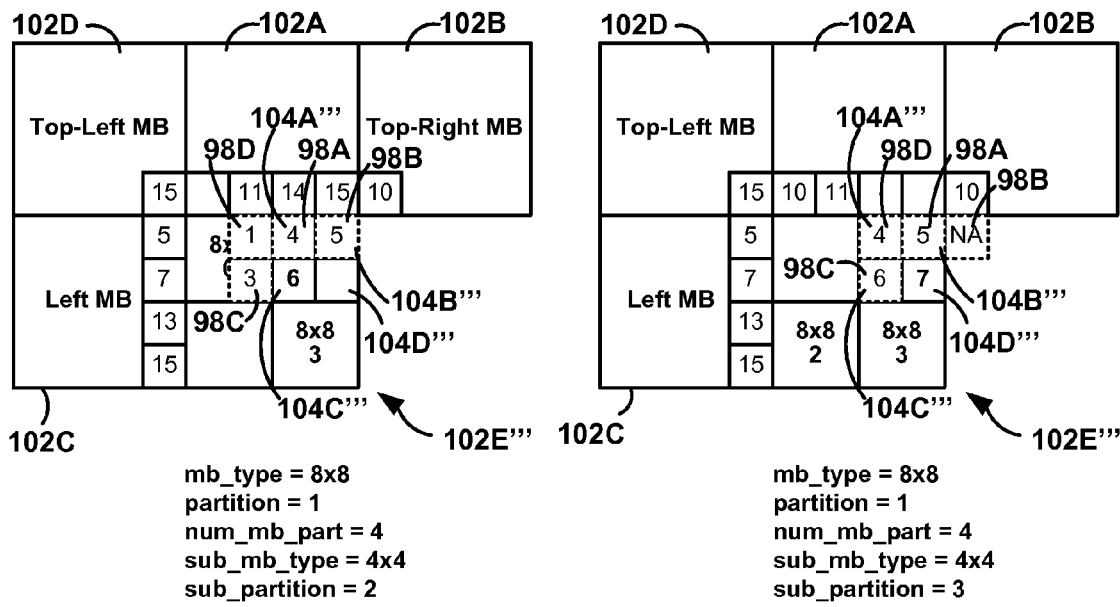
FIG. 6J

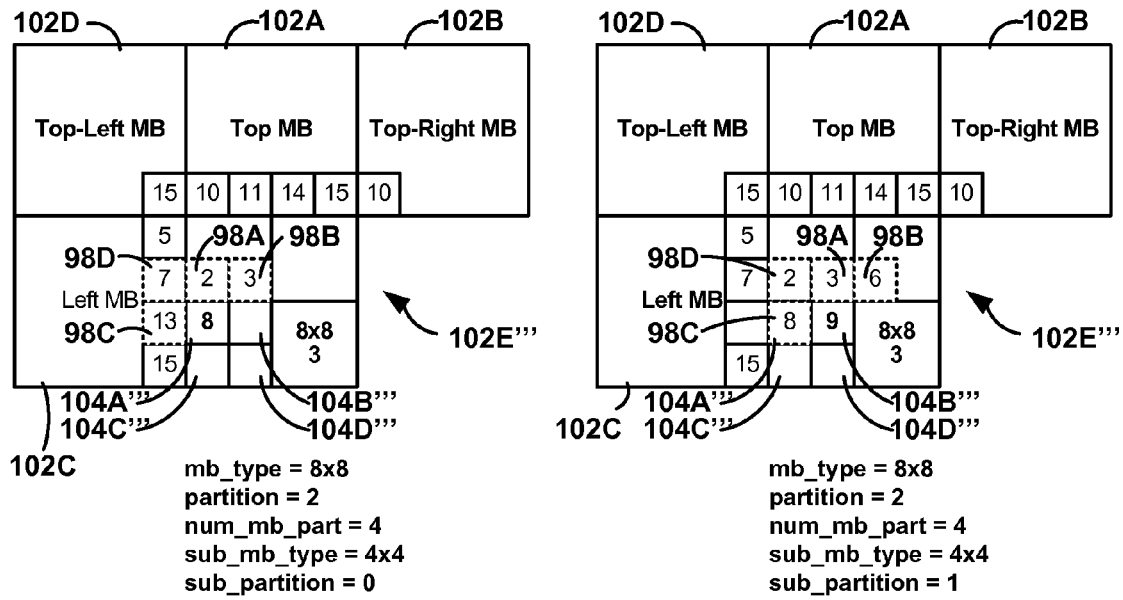
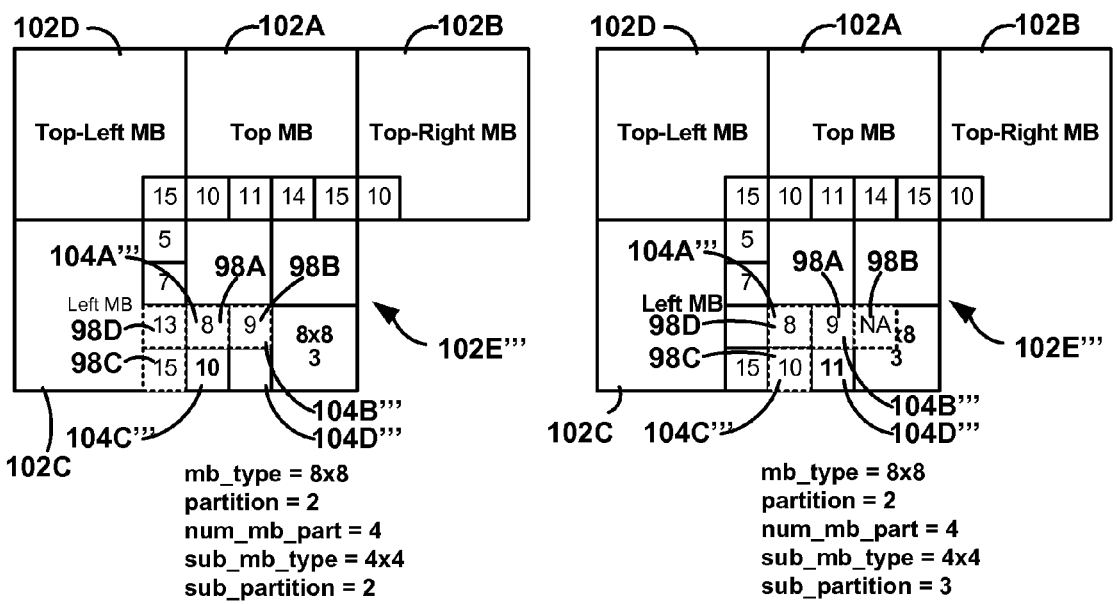
FIG. 6K

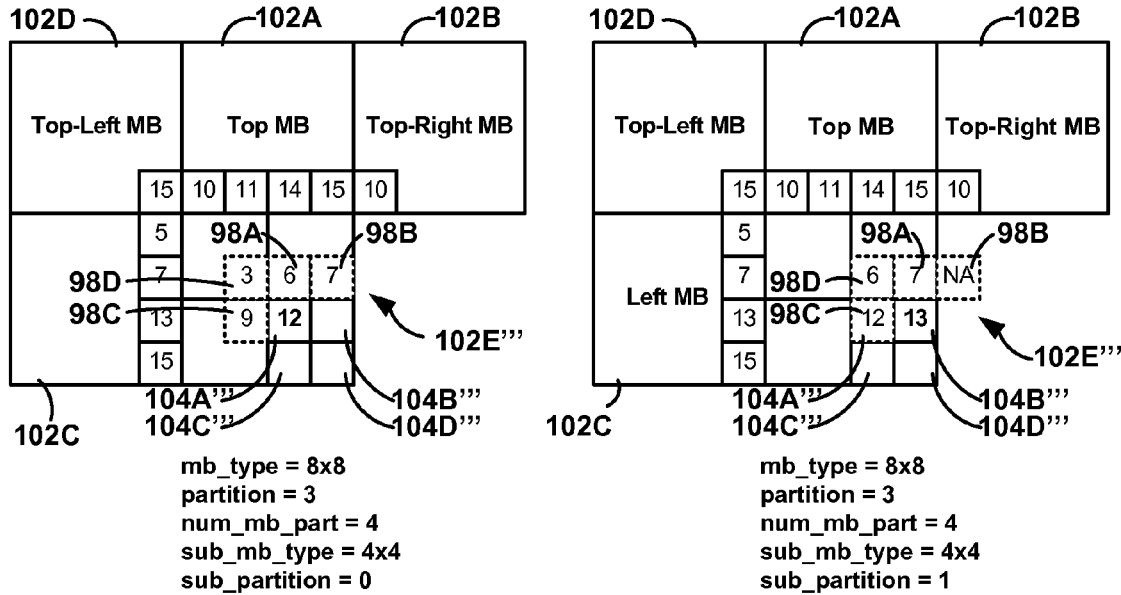
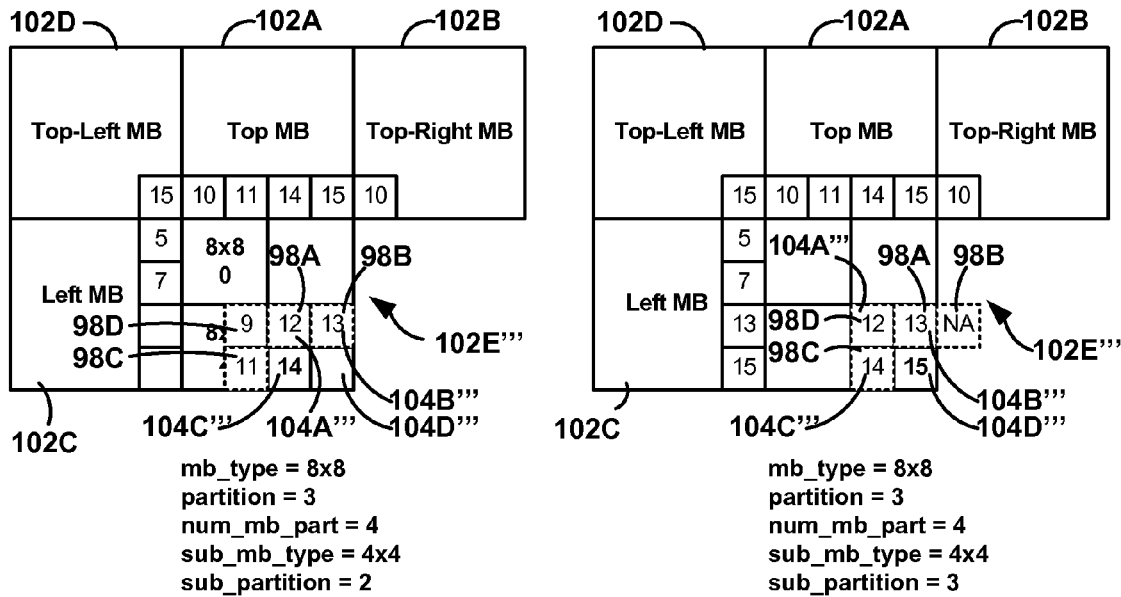
FIG. 6L

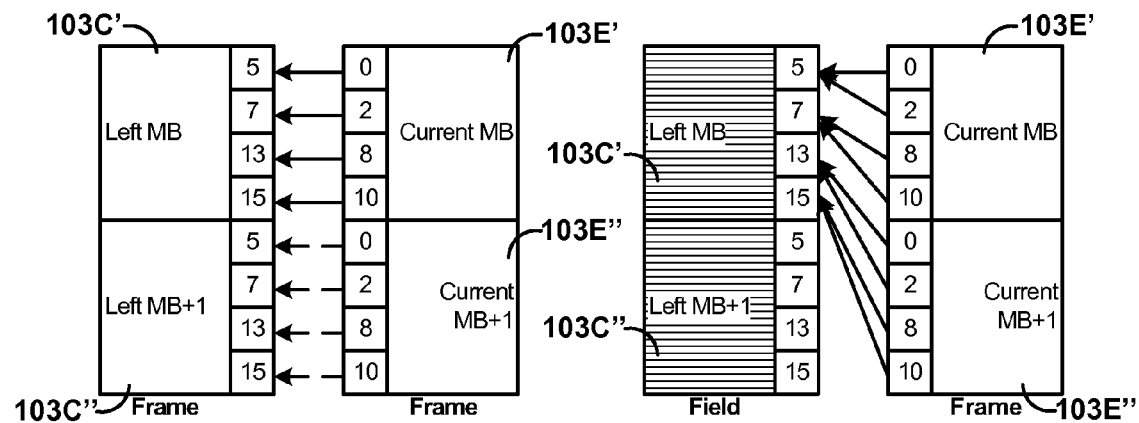
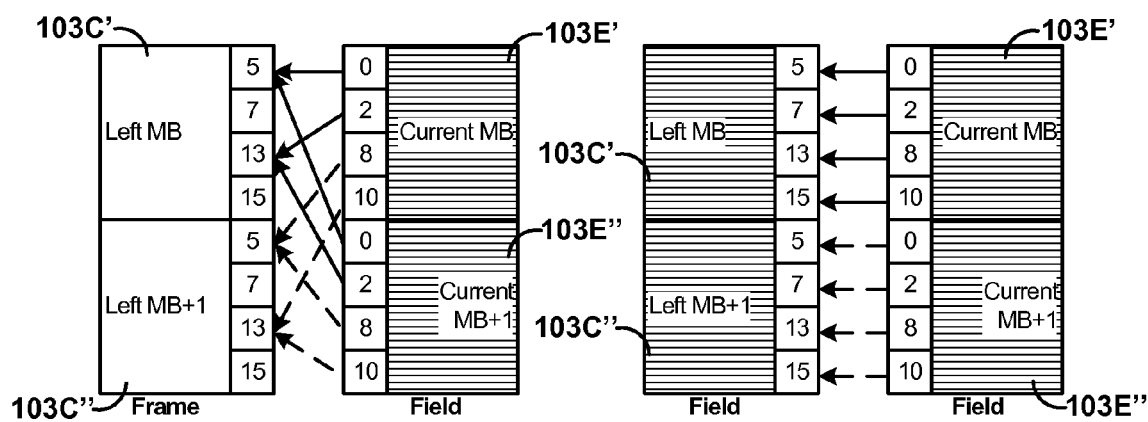
FIG. 7A

DETERMINING AVAILABILITY OF VIDEO DATA UNITS

This application is related to co-pending U.S. patent application Ser. No. 12/239,031 filed Sep. 26, 2008, entitled "Resolving Geometric Relationships Among Video Data Units," by named inventor Yen-Chi Lee, and U.S. patent application Ser. No. 12/239,196, filed Sep. 26, 2008, entitled "Locating Motion Vectors for Video Data Units," by named inventor Yen-Chi Lee, each of which are assigned to the assignee of the present application and incorporated herein by reference in their entirety.

TECHNICAL FIELD

The disclosure relates to digital video and, more particularly, techniques for coding digital video.

BACKGROUND

A number of video encoding and decoding techniques have been developed for encoding and decoding digital video data. The Moving Picture Experts Group (MPEG), for example, has developed several techniques including MPEG-1, MPEG-2 and MPEG-4. Other examples include the International Telecommunication Union (ITU)-T H.263 standard, and the ITU-T H.264 standard and its counterpart, ISO/IEC MPEG-4, Part 10, i.e., Advanced Video Coding (AVC). These video standards support efficient transmission and storage of video data by encoding data in a compressed manner to reduce the amount of data.

Video compression may involve spatial and/or temporal prediction to reduce redundancy inherent in video sequences. Intra-coding uses spatial prediction to reduce spatial redundancy of video blocks within the same video frame. Inter-coding uses temporal prediction to reduce temporal redundancy between video blocks in successive video frames. For inter-coding, a video encoder performs motion estimation to generate motion vectors indicating displacement of video blocks relative to corresponding prediction video blocks in one or more reference frames.

A source device may employ one of the above video encoding techniques to encode the digital video data. The source device archives the encoded video data and/or transmits the encoded video data to a destination device via a transmission channel. The transmission channel may make use of wired and/or wireless communication media. The destination device receives the encoded video data and decodes the received video data to recover the original digital video data for playback. Many devices include both an encoder and a decoder, which may be combined in so-called codec.

SUMMARY

This disclosure relates to techniques for efficiently coding video data. The video data may be organized into video data units, such as macroblocks or smaller blocks. Both a video encoder and a video decoder may employ the efficient coding techniques, in one aspect, to more efficiently resolve geometric relationships between video data units and thereby determine neighboring video data units for a current video data unit. In another aspect, the efficient coding techniques may be implemented by both the video encoder and video decoder to more efficiently determine availability of the neighboring video data units determined for the current video data unit. In yet another aspect, the efficient coding techniques may be implemented by both the video encoder and video decoder to more efficiently locate motion vector data within neighboring video data units. These various aspects of the efficient coding techniques may be implemented by the video encoder and decoder in conjunction with one another or independently of one another. Generally, however, the various aspects of the efficient coding techniques are described relative to one another in this disclosure for purposes of illustration.

In one aspect, this disclosure provides a method comprising obtaining video data that defines a plurality of video data units, determining, for a current one of the plurality of video data units to be processed, a partition width and a video unit number of the current video data unit, and accessing, using the determined partition width and video unit number, a plurality of look-up tables (LUTs) to output one or more indices identifying one or more of the plurality of video data units that neighbor the current video data unit.

In another aspect, this disclosure provides an apparatus comprising a geometric resolution unit that obtains video data defining a plurality of video data units, and determines, for a current one of the plurality of video data units to be processed, a partition width and a video unit number of the current video data unit, wherein the geometric resolution unit includes a plurality of look-up tables that resolve geometric relationships among the plurality of video data units, and wherein the geometric resolution unit further accesses, using the determined partition width and video unit number, the plurality of look-up tables (LUTs) to output one or more indices identifying one or more of the plurality of video data units that neighbor the current video data unit.

In an additional aspect, this disclosure provides an apparatus comprising means for obtaining video data defining a plurality of video data units, means for determining, for a current one of the plurality of video data units to be processed, a partition width and a video unit number of the current video data unit, means for resolving geometric relationships among the plurality of video data units, and means for accessing, using the determined partition width and video unit number, the means for resolving geometric relationships to output one or more indices identifying one or more of the plurality of video data units that neighbor the current video data unit.

In yet another aspect, this disclosure provides a computer-readable medium comprising instructions that cause a programmable processor to obtain video data that defines a plurality of video data units determine, for a current one of the plurality of video data units to be processed, a partition width and a video unit number of the current video data unit, and access, using the determined partition width and video unit number, a plurality of look-up tables (LUTs) to output one or more indices identifying one or more of the plurality of video data units that neighbor the current video data unit.

In another aspect, this disclosure provides a method comprising processing a plurality of video data units defined by video data, incrementing an availability counter after processing each of the plurality of video data units, determining, based on the availability counter, whether one or more of the plurality of video data units (i) have been previously decoded and (ii) are available for use as neighboring video data units in the processing of a current one of the plurality of video data units video data units, and processing the current video data unit based on the determination.

In a further aspect, this disclosure provides an apparatus comprising an availability determination unit that includes an availability counter, wherein the availability determination unit processes a plurality of video data units defined by video data in raster scan order, increments the availability counter after processing each of the plurality of video data units and determines, based on the availability counter, whether one or more of the plurality of video data units (i) have been previously decoded and (ii) are available for use as neighboring video data units in the processing of a current one of the plurality of video data units video data units, and another unit that processes the current video data unit based on the determination of whether one or more of the neighboring video data units are available.

In an additional aspect, this disclosure provides an apparatus comprising means for processing a plurality of video data units defined by video data, means for incrementing an availability counter after processing each of the plurality of video data units, means for determining, based on the availability counter, whether one or more of the plurality of video data units (i) have been previously decoded and (ii) are available for use as neighboring video data units in the processing of a current one of the plurality of video data units video data units, and means for processing the current video data unit based on the determination.

In one other aspect, this disclosure provides a computer-readable storage medium comprising instructions that cause a programmable processor to process a plurality of video data units defined by video data, increment an availability counter after processing each of the plurality of video data units, determine, based on the availability counter, whether one or more of the plurality of video data units (i) have been previously decoded and (ii) are available for use as neighboring video data units in the processing of a current one of the plurality of video data units video data units, and process the current video data unit based on the determination.

In another aspect, this disclosure provides a method comprising obtaining video data that defines a plurality of video data units, determining, for a current one of the plurality of video data units to be processed, which of the plurality of video data units neighbor the current video data unit, and accessing, for each of the neighboring video data units, a look-up table (LUT) to determine a location of a motion vector within a section of the video data with which the neighboring video data unit is associated.

In a further aspect, this disclosure provides an apparatus comprising a motion vector (MV) location unit that includes a look-up table (LUT), obtains video data defining a plurality of video data units and processes the plurality of video data units, and a geometric resolution unit that determines, while processing a current one of the plurality of video data units, which of the plurality of video data units neighbor the current video data unit, wherein the MV location unit accesses, for each of the neighboring video data units, the LUT to determine a location of a motion vector within a section of the video data to which the neighboring video data unit is associated.

In an additional aspect, this disclosure provides an apparatus comprising means for obtaining video data that defines a plurality of video data units, means for determining, for a current one of the plurality of video data units to be processed, which of the plurality of video data units neighbor the current video data unit, and means for accessing, for each of the neighboring video data units, a look-up table (LUT) to determine a location of a motion vector within a section of the video data with which the neighboring video data unit is associated.

In yet another aspect, this disclosure provides a computer-readable storage medium comprising instructions that cause a programmable processor to obtain video data that defines a plurality of video data units, determine, for a current one of the plurality of video data units to be processed, which of the plurality of video data units neighbor the current video data unit, and access, for each of the neighboring video data units, a look-up table (LUT) to determine a location of a motion vector within a section of the video data with which the neighboring video data unit is associated.

The details of one or more aspects of the disclosure are set forth in the accompanying drawings and the description below. Other features, objects, and advantages of the disclosure will be apparent from the description and drawings, and from the claims.

BRIEF DESCRIPTION OF DRAWINGS

FIGS. 6A-6L are block diagrams each illustrating the geometric relationships between neighboring macroblocks and a current macroblock of a non-MBAFF coded frame.

FIGS. 7A-7E are block diagrams each illustrating the geometric relationships between neighboring macroblocks and a current macroblock of a MBAFF coded frame.

DETAILED DESCRIPTION

Figure 1:
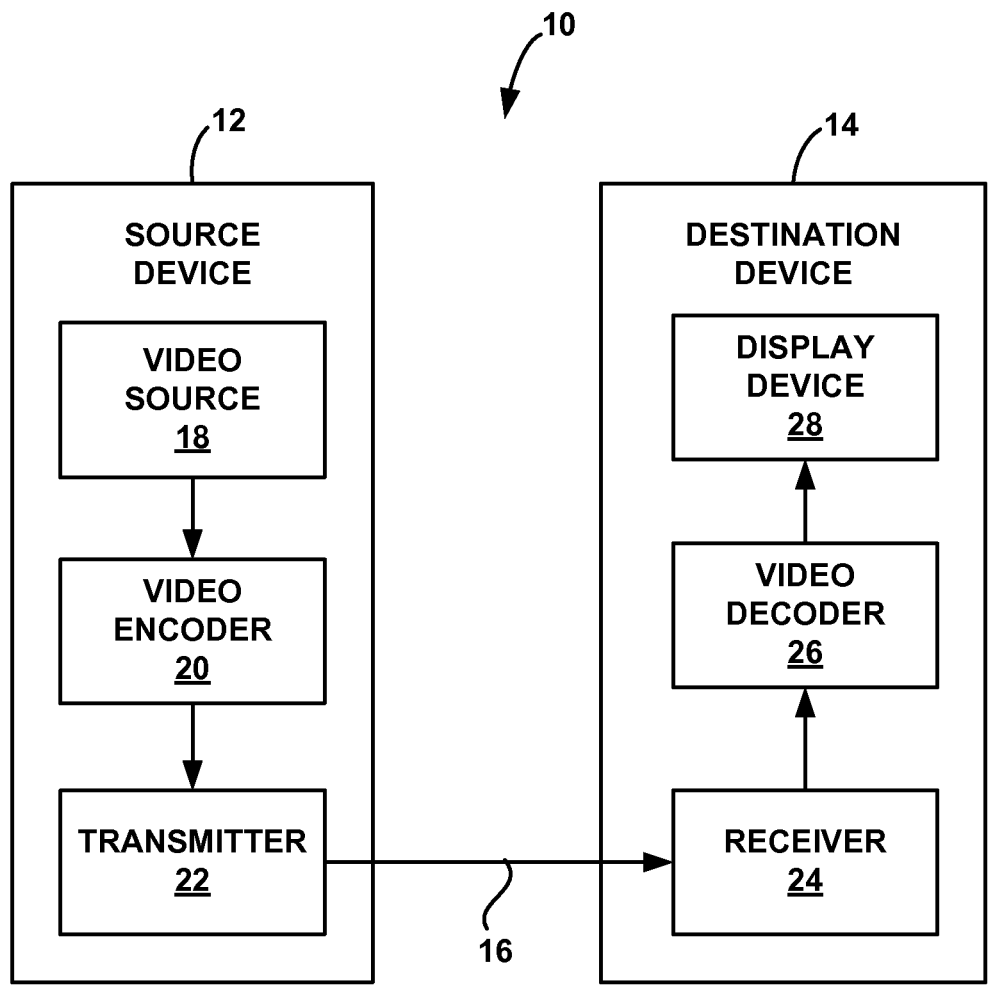
FIG. 1 is a block diagram illustrating a video encoding and decoding system that performs efficient coding techniques as described in this disclosure.

This disclosure is directed to efficient coding techniques for encoding and decoding digital video. In one aspect, this disclosure is directed to coding techniques for efficiently resolving geometric relationships among video data units of digital video data. In another aspect, this disclosure describes coding techniques for efficiently checking or determining an availability of the video data units of digital video data. In yet another aspect, this disclosure is directed to coding techniques for efficiently determining a location of a motion vector encoded within the encoded digital video data.

While each of the above aspects of the efficient coding techniques are generally described in this disclosure relative to one another, each of these aspects may be separately implemented or otherwise performed independently of one another or in separate and distinct contexts. Moreover, although generally described in this disclosure with respect to a decoder that decodes video data, one or more of the above aspects of the efficient coding techniques may be implemented by an encoder to more efficiently encode digital video.

The efficient coding techniques directed to resolving geometric relationships may involve identifying one or more portions of encoded video data relevant to decoding a given portion of the encoded video data. For example, a video decoder may, while currently decoding a first video data unit, determine one or more other video data units relevant to decoding the first video data unit. For purposes of illustration, this disclosure will generally refer to video data units in the form of video slices and blocks in the form of macro-blocks (MBs). However, the disclosure may be readily applicable to other types of video data units and blocks. A video sequence includes multiple video frames. Each frame may include multiple video slices. Each video slice may include a slice header. Each frame or slice may include multiple blocks, such as MBs or smaller sub-partitions.

These geometrically relevant video data units may be referred to as "neighboring" video data units or, in some instances, as "neighboring" MBs. Neighboring MBs may be required to decode a current video data unit or again, in some instances, a current MB. A "current" MB may refer to a MB that the decoder is currently decoding. The decoder may access the neighboring MBs, while decoding the current MB, in a number of instances, such as motion vector (MV) reconstruction, determining a prediction mode, decoding MBs entropy encoded according to a Context Adaptive Binary Arithmetic Coding (CABAC) and selection of a de-blocking filter.

In each of these instances, the decoder may implement the efficient coding techniques directed to resolving the above geometric relationships among MBs to determine neighboring MBs for the current MB. Moreover, in each of the above instances, the decoder may implement the efficient coding techniques directed to determining an availability of each of the neighboring MBs. The efficient decoding techniques directed to MV location, however, may be implemented by the decoder only in circumstances involving MVs, such as motion vector reconstruction. As a result, the efficient coding techniques are described in this disclosure with respect to MV reconstruction to facilitate the discussion of each of the various aspects of the efficient coding techniques.

The geometric relationship resolution techniques may further involve determining one or more neighboring MBs for a current MB of video data encoded according to the one or more encoding modes. In other words, the determination of neighboring MBs may depend upon a mode in which the current MB is encoded. In some aspects, each video data unit or block of the video data may be encoded according to one of a plurality of encoding modes. Some encoding modes may encode MBs as pairs, which may further complicate the resolution of geometrical relationships among MBs. In this respect, these techniques may determine the neighboring MBs for the current MB of video data encoded according to these encoding modes that complicate the determination of neighboring MBs. Moreover, these techniques may reduce implementation complexity and improve decoder throughput by performing the resolution of neighboring MBs for multiple encoding modes in hardware.

For example, a frame of video data may be encoded according to two encoding schemes, such as a Picture Adaptive Field/Frame (PAFF) coding scheme and a Macroblock Adaptive Field/Frame (MBAFF) coding scheme. These two encoding scheme generally refer to a scope or localization with which each MB of a given frame or slice is encoded as either a field mode MB or a frame mode MB. In PAFF coding, a frame is encoded according to either the field mode or the frame mode, thereby localizing the frame or field mode on a frame basis. Consequently, every MB of the frame is encoded according to either the frame or the field mode. In MBAFF coding, each MB of a given frame may be adaptively encoded, thereby localizing the frame or field mode on a MB basis. Accordingly, each MB of the frame is encoded according to either the frame or field mode on a MB basis.

The field mode may generally refer to a form of scanning referred to as "interlaced," while the frame mode may generally refer to a form of scanning referred to as "progressive." An interlaced frame may comprise two fields that are separated in capture time, while the two fields of a progressive frame share the same capture time. Interlaced frames are often employed to reduce bandwidth requirements, as the first field (e.g., odd lines of a frame) may be captured and transmitted and then, subsequent to the capture of the first field, the second field (e.g., even lines of a frame) may be captured and transmitted.

A MB coded according to the field mode may comprise, for example, a block of pixels from every other line and may be associated with another MB comprising a same sized block of pixels containing complementary lines to that of the associated MB. That is, the first MB may encode, for example, a 16×16 block of pixels representing the odd lines or first field of the frame and the second associated MB may encode a 16×16 block of pixels representing the complementary even lines or second field of the same frame. In this respect, field encoded MBs may be referred to as "MB pairs," thereby signifying that each field encoded MB has an associated paired MB containing the complimentary pixels to that of the first MB. An MB coded according to the frame mode may, however, comprise a block of contiguous pixels, e.g., a 16×16 block of pixels from both odd and even lines of pixels of the frame. Frame coded MBs generally are not referred to as MB pairs, as these MBs encode both fields to the same MB, unlike field coded MBs that encode each field to a separate MB, thereby resulting in MB pairs.

For PAFF or other non-MBAFF coding schemes, a decoder may more readily resolve the geometric relationships between neighboring MBs and the current MB, as all the MBs are coded according to either the frame or field modes. While resolution of field mode MBs may involve maintaining twice as many MBs, e.g., the two MBs of the MB pairs, the geometric relationship between field encoded MB pairs is still rather straightforward. In MBAFF, however, where both field and frame modes may reside in the same frame and MBs of different modes may refer to one another, resolving the geometric relationships between neighboring MBs and the current MB may require substantial computational complexity. The decoder may implement the coding techniques described in this disclosure to more efficiently resolve the geometrical relationships between neighboring MBs and the current MB so as to more efficiently retrieve the information from the neighboring MBs regardless of whether encoded according to a non-MBAFF or MBAFF coding scheme.

In this respect, the decoder that implements the efficient coding techniques directed to resolving geometric relationships may base the determination of neighboring MBs on a mode in which each MB is encoded. These techniques may also involve determining a partition width and video unit number of each MB, as these may also influence the determination of neighboring MBs. The partition width refers to a width in pixels of each MB. Some video coding standards may adapt the size of MBs or blocks based on, for example, the pixel values, motion vector magnitudes and other criteria. The video unit number identifies a location of the MB within a slice or frame. As each of the partition width and video unit numbers are pertinent to the location of the current MB, the techniques may utilize each to resolve the geometrical relationships among neighboring MBs and the current MB.

In operation, the decoder may implement the above techniques using one or more lookup tables (LUTs). In some instances, the decoder may include a first LUT to resolve the geometrical relationship between neighboring MBs and a current MB based on a video unit number and partition width of the current MB. The first LUT may resolve the geometrical relationship assuming that each MB is encoded according to a non-MBAFF mode. The first LUT may produce, as output, indices identifying the neighboring MBs. The decoder may also include a second LUT that resolves the geometric relationships among the neighboring MBs and the current MB for MBAFF encoded MBs. That is, if the MBs are MBAFF encoded, the decoder may use the second LUT to adjust the indices output by the first LUT. The second LUT may receive as input the indices determined by the first LUT and adjust these indices to account for the MBAFF coding scheme, e.g., that the neighboring MBs and current MB may be encoded according to different modes. The second LUT, if not bypassed, may output these adjusted indices identifying the neighboring MBs for a current MB, when the frame in which these MBs reside is MBAFF coded.

After determining the neighboring MBs for the current MB or MB pair, the efficient coding techniques may, in some aspects, determine an availability for each of the neighboring MBs. As used in this disclosure, "availability" may refer to whether a neighboring or other geometrically relevant video data unit or block has been previously decoded and is available for use in decoding the current video data unit or block. The neighboring MB availability check techniques may involve maintaining a counter or other incremental measure while decoding video data units or blocks. The counter may be referred to as an "availability counter" as the counter is used in determining the availability of neighboring MBs. Based on a value of the availability counter, the decoder may determine whether a neighboring MB, identified either by the geometric relationship resolution techniques described above or by any other technique, is available for use in decoding the current MB. The availability techniques may likewise reduce implementation complexity by relying on a counter instead of carrying out complicated calculations based on MB location data, such as slice identifiers, and MB index, and/or MB encoding data, such as various flags and width of frames in MBs. Instead, the value of the counter may provide a direct indication of neighboring video data unit availability.

After determining the availability of neighboring MBs, the decoder may access those neighboring MBs determined to be available and use such neighboring MBs to reconstruct a motion vector (MV) for the current MB. MV reconstruction may involve accessing MVs associated with the neighboring MBs and calculating, based on these neighboring MVs, an MV for the current MB. In some instances, the neighboring MV is stored within a predefined portion of a neighboring MB. Without copying or otherwise replicating the MV to each MB, the efficient decoding techniques directed to MV location may efficiently identify the location of the neighboring MVs pertinent to decoding the current MB. Using these techniques directed to efficient MV location, the decoder may more efficiently reconstruct the MV for the current MB as a result of this efficient location. The motion vector location techniques may, therefore, promote efficient power consumption by not requiring operations to copy an MV pertinent generally to decoding each MB and particularly to reconstructing an MV for each MB.

In this manner, the efficient decoding techniques may, in various aspects, substantially reduce implementation complexity, while improving decoder throughput and promoting efficient power consumption, especially when implemented in embedded systems such as mobile devices. In operation, the decoder may implement one or more of the various aspects of the efficient coding techniques as a series of lookup tables and discrete hardware logic, such as shifters, "AND" gates, "XOR" gates, comparators and other various hardware gates or logic. The efficient coding techniques may reduce implementation complexity by reducing generally the amount of hardware logic and, particularly, the number of hardware gates and comparators, required to determine neighboring MBs and the availability of such blocks. The efficient coding techniques may improve decoder throughput through the use of lookup tables, which may determine neighboring MBs more quickly than comparable hardware or software based methods. The efficient coding techniques may further promote efficient power consumption, again, by maintaining a lookup table to determine the location of MVs and avoiding the copying of MVs.

FIG. 1 is a block diagram illustrating a video encoding and decoding system 10 that may be configured to perform efficient coding techniques as described in this disclosure. As shown in FIG. 1, system 10 includes a source device 12 that transmits encoded video data to a destination device 14 via a communication channel 16. Communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting encoded video data from source device 12 to destination device 14.

Source device 12 generates coded video data for transmission to destination device 14. Source device 12 may include a video source 18, a video encoder 20, and a transmitter 22. Video source 18 of source device 12 may include a video capture device, such as a video camera, a video archive containing previously captured video, or a video feed from a video content provider. As a further alternative, video source 18 may generate computer graphics-based data as the source video, or a combination of live or archived video and computer generated video. In some cases, if video source 18 is a video camera, source device 12 may form a so-called camera phone or video phone, or any other type of camera-equipped computing or communication device, including mobile telephones or other devices. In other aspects, video source 18 may be coupled to or integrated with a source device 12. In each case, the captured, pre-captured, and/or computer-generated video may be encoded by video encoder 20 for transmission from source device 12 to destination device 14 via transmitter 22 and communication channel 16.

Video encoder 20 receives video data from video source 18. The video data received from video source 18 may be arranged in a video sequence comprising a series of video data units, such as video frames. Some or all of the frames may be divided into smaller video data units, such as video slices. Video encoder 20 may operate on blocks of pixels (referred to herein as video blocks) within individual video frames or slices in order to encode the video data. A frame or slice may contain multiple video blocks. The video blocks may have fixed or varying sizes, and may differ in size according to a specified coding standard. A 16×16 pixel video block, commonly referred to as a macroblock (MB), may be arranged into sub-blocks.

As an example, the International Telecommunication Union Standardization Sector (ITU-T) H.264/MPEG-4, Part 10, Advanced Video Coding (AVC) (hereinafter "H.264/MPEG-4 AVC" standard) supports intra prediction in various block sizes, such as 16×16, 8×8, or 4×4 for luma components, and 8×8 for chroma components, as well as inter prediction in various block sizes, such as 16×16, 16×8, 8×16, 8×8, 8×4, 4×8 and 4×4 for luma components and corresponding scaled sizes for chroma components. In general, MBs and the various sub-blocks may be considered to be video blocks. Thus, MBs may be considered to be video blocks, and if partitioned or sub-partitioned, MBs can themselves be considered to define sets of video blocks. In some aspects, neighboring availability check techniques may direct availability determinations based on the width of video block, such as a MB or sub-block.

While the techniques are described in this disclosure with respect to a variety of video data units, such as video frames or video slices, the techniques may be generally applicable to any encoding and decoding of video data. Moreover, the techniques are described in this disclosure with respect to video data encoded and decoded according to the H.264/MPEG-4 AVC standard. However, the techniques are described in reference to this standard for purposes of illustration. In various aspects, such techniques may, however, be readily applied to any of a variety of other video coding standards, such as those defined by the Moving Picture Experts Group (MPEG) in MPEG-1, MPEG-2 and MPEG-4, the ITU-T H.263 standard, the Society of Motion Picture and Television Engineers (SMPTE) 421M video CODEC standard (commonly referred to as "VC-1"), the standard defined by the Audio Video Coding Standard Workgroup of China (commonly referred to as "AVS"), as well as any other video coding standard defined by a standards body or developed by an organization as a proprietary standard.

For purposes of illustration, and without limitation, application of various coding techniques will be described with reference to H.264/MPEG-4 AVC coding. Video encoder 20 may encode each block (e.g., a macroblock (MB)) according to intra-coding and inter-coding prediction schemes, e.g., as set forth in the H.264/MPEG-4 AVC standard. Following intra- or inter-based prediction of the video blocks, video encoder 20 may perform a number of other operations on the video blocks. These additional operations may include transformation operations (such as 4×4 or 8×8 integer transform used in H.264/MPEG-4 Part 10 AVC or a discrete cosine transformation DCT), quantization operations, entropy coding operations and filtering operations. Video encoder 20 then encodes each of the blocks of the sequence of video frames and outputs encoded video data, which may be referred to as an "encoded bitstream."

Source device 12 may transmit the encoded video data to destination device 14 via transmitter 22. Receiver 24 of destination device 14 receives the encoded video data from source device 12 via channel 16. Destination device 14 may include a receiver 24, video decoder 26, and display device 28. Video decoder 26 may decode the encoded video data to obtain the original video data for playback on display device 28. Display device 28 may comprise any of a variety of display devices such as a cathode ray tube (CRT), a liquid crystal display (LCD), a plasma display, a light emitting diode (LED) display, an organic LED display, or another type of display unit.

Video decoder 26 may implement the efficient decoding techniques described in this disclosure to efficiently decode the encoded video data. As described above, video encoder 20 may encode the video data using an inter-coding prediction schemes. For inter-coding prediction schemes, video encoder 20 may, when currently encoding a MB, rely on information derived from MBs having a geometrical relationship to this current MB. These geometrically related MBs may be referred to herein as "neighboring" MBs or more generally as "neighboring" video data units. A "current" MB may refer to a MB that video encoder 20 is currently encoding or decoder 26 is currently decoding.

The plurality of neighboring MBs are typically adjacent to the current MB, as described in more detail below. Briefly, however, one of the plurality of neighboring MBs may lie directly above or on top of the current MB and may be referred to as the "top" neighboring MB. A second one of the plurality of neighboring MBs may lie above or on top of and to the right of the current MB and may be referred to as the "top-right" neighboring MB. A third one of the plurality of neighboring MBs may lie directly to the left of the current MB and may be referred to as the "left" neighboring MB. A fourth one of the plurality of neighboring MBs may lie on top of and to the left of the current MB and may be referred to as the "top-left" neighboring MB.

Determination of these neighboring MBs or resolution of the geometrical relationship between various MBs may depend on which of a plurality of encoding schemes video encoder 20 chose to encode the frame. Video encoder 20 may employ a Picture Adaptive Frame/Field (PAFF) coding scheme or a MacroBlock Adaptive Frame/Field (MBAFF) coding scheme to encode a frame. In PAFF coding, video encoder 20 selects to encode the MBs of an entire picture or frame according to either a field or a frame mode. In MBAFF coding, video encoder 20 selects or adapts the coding of either the field or the frame mode on a more localized basis, e.g., a MB basis. Generally, video encoder 20 may employ field coding when there is fast picture-to-picture motion, and employ frame coding when the video scene contains significant detail with limited motion (if the video has interlaced content).

The field mode may refer to a type of encoding commonly referred to as an "interlaced scan" form, while the frame mode may refer to a type of coding commonly referred to as a "progressive scan" form. An interlaced frame may comprise two fields that are separated in capture time, while the two fields of a progressive frame share the same capture time. Interlaced frames are often employed to reduce bandwidth requirements, as the first field (e.g., odd lines of a frame) may be captured and transmitted and then, subsequent to the capture of the first field, the second field (e.g., even lines of a frame) may be captured and transmitted, thereby reducing the bandwidth required at any given instant of time in half.

To represent both of these interlaced and progressive types of coding, the H.264/MPEG-4 AVC standard permits MBs to be encoded according to either a frame or a field mode on either a picture basis in accordance with PAFF or an MB basis in accordance with MBAFF. An MB coded according to the frame mode may comprise a block of contiguous pixels, e.g., a 16×16 block of pixels from both odd and even lines of pixels of the frame. An MB coded according to the field mode, however, may comprise, for example, a block of pixels from every other line (e.g., odd lines) and may be associated with another MB comprising a same-sized block of pixels containing complementary lines to that of the associated MB. That is, the first MB may encode, for example, a 16×16 block of pixels from the odd lines or first field of the frame and the second associated MB may encode a 16×16 block of pixels representing the complementary even lines or second field of the same frame. In this respect, field encoded MBs may be referred to as "MB pairs," as each field encoded MB has an associated MB containing the complimentary pixels to that of the first MB.

Video encoder 20 may embed the mode used to encode the MBs of the frame in the frame header or picture for PAFF or in each MB header of the MBs for MBAFF. Video decoder 26 may retrieve this mode when decoding the MBs of a given frame. For PAFF or, more generally, non-MBAFF coding schemes, video decoder 26 may more readily resolve the geometric relationships between neighboring MBs and the current MB, as all the MBs are either frame or field coded. That is, when the current MB and all of the neighboring MBs are encoded according to the same frame or field mode, as in PAFF, decoder 26 may derive the top, top-right, left, and top-left neighboring MBs for the current MB in a relatively straightforward manner, as discussed in more detail below.

In MBAFF, where both field and frame modes may reside in the same frame and MBs of different modes may refer to one another, resolving the geometric relationships between neighboring MBs and the current MB may require substantial computational complexity. That is, when one of more of the neighboring MBs are encoded according to one of the frame and field modes while the current MB is encoded according to the other one of the frame or field modes, decoder 26 may not readily resolve the top, top-right, left, and top-left neighboring MBs. Decoder 26 may not readily resolve these geometrical relationships because, as described below in more detail, of the separation of fields into two MB pairs in field encoded MBs, while a frame coded MB may comprise both fields in the same frame.

Video decoder 26 may require information from neighboring MBs in a variety of instances to decode the current MB. For example, video decoder 26 may reconstruct a motion vector (MV) for a current MB from MVs for neighboring MBs. Reconstruction may be required because video encoder 20, to facilitate compression of video data and/or improve encoder efficiency, may not transmit the actual MV for each encoded MB. Instead, the video encoder may use the MVs of the neighboring MBs as predicted MVs and encode an MV difference between the encoded MV and the MV for the corresponding MB. In this instance, video decoder 26 may reconstruct an MV for the current MB for which an MV was not entirely encoded by accessing MVs stored in those neighboring MBs of the current MB.

As another example, video decoder 26 may determine a prediction mode for a current MB from prediction modes stored in neighboring MBs. Similar to the above MV reconstruction, video encoder 20 may not encode each MB with a prediction mode, but instead encode the difference of prediction mode between current MB and the neighboring MB. Video decoder 26 may then determine a prediction mode for the current MB by accessing a prediction mode stored to one of the neighboring MBs of the current MB.

Video decoder 26 may also resolve geometric relationships to determine neighboring MBs for the current MB during a process referred to as "Context-Adaptive Binary Arithmetic Coding" or CABAC, for short. CABAC refers to a lossless compression technique that may utilize information concerning neighboring MBs to compress the current MB. Video decoder 26 may therefore utilize the efficient decoding techniques to efficiently determine neighboring MBs for the current MB in order to decompress the compressed information relevant for decoding the current MB.

As yet another example, video decoder 26 may also employ these efficient decoding techniques directed to resolving geometric relationships when determining boundary strength. That is, the decoder may include a de-blocking filter that selects which filter to employ based on a boundary strength measurement. Boundary strength refers to the strength of the boundary between the neighboring MBs and the current MB. The boundary strength may be determined based on the type of coding, e.g., intra- or inter-coding, of the neighboring and current MBs. Again, the decoder may utilize the efficient decoding techniques in the de-blocking filter to efficiently resolve the geometrical relationships of MBs, e.g., determine neighboring MBs for a current MB, in order to determine these modes of neighboring MBs and compute the resulting boundary strength. The decoder may then apply the selected filter to the current and neighboring MBs in order to reduce pixel blocking by smoothing pixel values at the boundaries.

In each of the above examples, video decoder 26 may employ one or more aspects of the efficient coding techniques described in this disclosure to more efficiently resolve geometrical relationships among video data units. In various aspects, the efficient coding techniques directed to determining an availability for each of the neighboring MBs may also apply in each of the above examples. In various aspects, the efficient coding techniques for locating an mv, however, may be limited to MV reconstruction or other instances that require MVs to decode a current MB. To facilitate the discussion, the efficient coding techniques are therefore discussed in the context of MV reconstruction, as this example involves all aspects of the efficient coding techniques. While described in this disclosure relative to MV reconstruction, video decoder 26 may employ these various aspects of the efficient coding techniques in any of the applicable example instances described above as well as other instances involving geometric relationship resolution, availability determinations and motion vector location, respectively.

As an illustration, video decoder 26 may, during MV reconstruction, first resolve the geometric relationships between the neighboring MBs and the current MB. Video decoder 26 may include a buffer to store a plurality of MBs. The buffer may be arranged in such a manner that enables video decoder 26 to quickly locate neighboring MBs by an identifier, which may be referred to in this disclosure as an "index." Thus, each buffered MB or sub-block of the MB may be indexed. Typically, the index identifies a 4×4 block of pixels of the MB. In this manner, video decoder 26 may receive and buffer a plurality of video data units or MBs.

Video decoder 26 may further implement the efficient coding techniques directed to determining neighboring MBs by way of, for example, one or more lookup tables. Video decoder 26 may determine, while decoding or reconstructing an MV for the current MB of the plurality of MBs, a partition width and a video unit number of the current video data unit. The partition width and video unit number may be encoded in the header of each of the MBs. Video decoder 26 may parse the header of the MB to determine the partition width and video unit number. The partition width may identify the width, in pixels, of the current block. A block may refer to MB (e.g., a 16 pixel by 16 pixel block) or other sub-partitions, including sub-partitions with same or different widths and heights. Thus, if the current block is a 16×16 MB, the partition width may indicate a value of 16. The video unit number, which may also be referred to as a "block index" when the video units represent blocks, refers to a number assigned to the decoding order of the current MB.

In some instances, the video unit number may identify a number, in decoding order, of the current block within a frame. In other instances, the video unit number may identify a number, in decoding order, of the current block within a slice. In a non-MBAFF frame, such as a PAFF frame, video units are decoded in raster scan order and the video unit number may identify a number, in raster scan order, of the current block within a frame. Raster scan order may refer to an ordering of blocks that proceeds from right-to-left, followed by top-to-bottom. Thus, considering a frame as a finite two-dimensional plane, raster scan ordering may begin at the top-left most block of the frame, e.g., a video unit number of zero, and proceeds to the top-right-most block of the frame, then increment to the second most top-left block and proceed to the second most top-right block, etc., until reaching the bottom-right most block of the frame, e.g. a video unit number of variable "N." In a MBAFF frame, video units are decoded in vertical pairs, as described above, where the pairs are decoded in raster scan order. That is, given a first pair of video units, the top video unit of the pair is decoded and followed by the bottom video unit of the pair, and then the next pair of video data units, in raster scan order, is decoded in a similar fashion, etc.

Based on the partition width and video unit number for the current MB, video decoder 26 may access the one or more look-up tables (LUTs) to output one or more of the above described indices identifying one or more of the plurality of buffered blocks that neighbor the current block. The one or more LUTs may identify the neighboring blocks regardless of the encoding scheme or, more particularly, regardless of whether the video data was encoded according to the PAFF (or, more generally, non-MBAFF) or MBAFF encoding schemes. In some instances, video decoder 26 may comprise a first LUT that resolves the geometric relationship among the various blocks, e.g., identifies or determines the indices associated with the neighboring blocks for the current block, assuming a non-MBAFF encoding scheme. This first LUT may be referred to as a "first-stage" LUT.

Video decoder 26 may also comprise a second LUT that resolves the geometric relationship among the various blocks, e.g., identifies or determines the neighboring blocks for the current block, assuming the MBAFF coding scheme. The indices output by the first-stage LUT may feed into the second-stage LUT, and based on the indices output by the first-stage LUT, the second-stage LUT may adjust the indices to account for the MBAFF coding scheme. The second-stage LUT may therefore output adjusted indices identifying the neighboring blocks for the current blocks, but only if the MBAFF mode is indicated for a given frame. These indices, again, may identify the buffered blocks stored to the buffer that may represent neighboring blocks for the current block. In this respect, video decoder 26 may derive the neighboring blocks for the current block in as little as two stages, which may take about one clock cycle.

Regardless of the manner in which video decoder 26 resolves the geometric relationships between neighboring and current blocks, video decoder 26 may next determine the availability of the neighboring blocks. That is, in some instances, one or more of the neighboring blocks and the respective neighboring MVs may not be available for use in reconstructing an MV for the current block. For example, a determined neighboring block may not reside within a same slice as that of the current block, or video decoder 26 may not have, as of yet, decoded the neighboring block. As used in this disclosure, "availability" may, therefore, refer to whether a neighboring or other geometrically relevant video data unit or block has been previously decoded and is available for use in the decoding of the current video data unit or block. Specifically, availability may refer, in some aspects, to a decoded state of an MB or other block such that decoded values are available for use, or prohibited for use according to video standards. The decoded values may vary based on the context in which the efficient coding techniques are implemented. For example, when implemented in MV reconstruction in inter-coded MBs, decoded values may refer to motion vectors and reference indices locating the appropriate block in the reference frame. As another example, when implemented for prediction mode in intra-coded MBs, decoded values may refer to intra-prediction modes. As another example, when implemented in a de-blocking filter, decoded values may refer to all information within a neighboring MBs, including pixel values, motion vectors, Coded Block Pattern (CBP) values, and coding mode. As described in more detail below, video decoder 26 may employ, in one aspect, the efficient coding techniques described in this disclosure to more efficiently determine the availability of neighboring blocks for use in decoding of a current block.

For example, video decoder 26 may implement, in one aspect, the efficient availability techniques by maintaining a counter while processing the encoded video data to decode the plurality of block in raster scan order. Video decoder 26 may decode the encoded video data in decoding order by decoding, for example, each block of a frame or slice from right to left, top to bottom, in the manner described above. After decoding each of the blocks, video decoder 26 may increment the counter, which may be referred to herein as an "availability counter," as it forms the basis upon which video decoder 26 determines the availability of neighboring blocks. Video decoder 26 may, while decoding the current block, access the availability counter to determine whether one or more of the plurality of blocks (i) have been previously decoded and (ii) are available for use as neighboring blocks in the processing or decoding of the current block.

To illustrate, video decoder 26 may receive a first block of a slice. A slice generally represents a portion of frame that can be independently decoded. That is, a block of a first slice may not refer to or rely on information or blocks of other slices in order to decode the block of the first slice. Thus, when decoding a block of a slice, video decoder 26 may rely only on blocks of the current slice. To reflect this independence, video decoder 26 may reset the availability counter value to zero at the beginning of each slice. An availability counter value equal to zero may indicate that all neighboring blocks are unavailable. After decoding the first block of the slice, video decoder 26 may increment the counter by one. Assuming the first block is not a last block of a row or line, video decoder 26 may determine that one neighboring block, e.g., the left neighboring block, is available for use in decoding the second or current block. In this manner, video decoder 26 may base the determination of the availability of each neighboring block on the counter value. Video decoder 26 may also maintain flags or other identifiers on which it may base the availability decision, such as flags indicating whether the current block is the first block in a row, or the current block is the last block in a row.

With respect to the geometric resolution techniques described above, video decoder 26 may determine the availability of neighboring blocks during a third-stage, after the first and second stage LUTs. Upon determining those neighboring blocks that are available, video decoder 26 may, based on the availability determination, utilize the indices of neighboring block determined to be available to access the buffered blocks in order to process the current block.

As described above, one example of processing the current block may involve reconstructing an MV for the current block. Video decoder 26 may be configured to perform MV reconstruction by employing the efficient coding techniques directed to efficiently locating MVs for those available neighboring blocks. In some instances, video decoder 26 may only reconstruct an MV for the current block and store this MV to a sub-block of the current block. For example, video decoder 26 may reconstruct, for a 16×16 inter-predicted MB (which is sometimes referred to as an "inter 16×16 MB"), only one MV and store this in a sub-block (e.g., a block of 4×4 pixels) with an index of zero. Video decoder 26 may, however, at some later point access sub-block five, i.e., a sub-block identified by an index of five, which again may comprise a 4×4 pixel block, of this same inter_16×16 MB. Video decoder 26 may, in an attempt to reconstruct an MV for another block, require the MV corresponding to this sub-block five, e.g., the MV stored to sub-block zero. Video decoder 26 may be configured to perform the efficient MV location techniques to avoid copying the MV to each of the 16 sub-blocks, for example, of the inter_16×16 MB.

As an illustration, video decoder 26 may comprise at least one LUT that can be used to lookup the location of the MV for a given sub-block. Video decoder 26 may determine an index for each of the available neighboring blocks in the manner described above, e.g., via the above three-stages, or via any other technique. Video decoder 26 may then access, for each of the neighboring video data units, a look-up table (LUT) using the corresponding index to determine a location of an MV within a sub-block or section of the encoded video data to which the neighboring block is associated. By avoiding the copying of MVs to each sub-block, video decoder 26 may more efficiently locate MVs and avoid consuming power unnecessarily to copy an MV to each sub-block. In this respect, video decoder 26 may promote efficient utilization of power.

Again, with respect to the above various aspects of the efficient coding techniques directed to determining neighboring blocks and the availability of the neighboring blocks, video decoder 26 may perform the efficient coding techniques directed to MV location during a forth stage, which may require about four clock cycles. In this respect, video decoder 26 may implement the various aspects of the efficient coding techniques in a pipelined or staged architecture comprising at least four stages, which is described in further detail below.

Further details of possible implementations of system 10 will now be described. In some cases, source device 12 and destination device 14 may operate in a substantially symmetrical manner. For example, source device 12 and destination device 14 may each include video encoding and decoding components. Hence, system 10 may support one-way or two-way video transmission between devices 12, 14, e.g., for video streaming, video broadcasting, or video telephony. The sequential error handling techniques described herein may be applicable to devices that include both encoding and decoding components, e.g., in a combined CODEC. In addition, in some aspects, the error handling techniques may be applied within a decoder that resides in the same device in which an encoder that encoded the data to be decoded resides. In this case, for example, encoded data may be archived locally and then decoded for local playback, rather than transmitted to another device such as destination device 14.

As described previously, video encoder 20 and video decoder 26 may operate according to a video compression standard, such as Moving Picture Experts Group (MPEG)-2, MPEG-4, ITU-T H.263, or H.264/MPEG-4 AVC. Although not shown in FIG. 1, in some aspects, video encoder 20 and video decoder 26 may each be integrated with an audio encoder and decoder, respectively, and may include appropriate MUX-DEMUX units, or other hardware and software, to handle encoding of both audio and video in a common data stream or separate data streams. In this manner, source device 12 and destination device 14 may operate on multimedia data including audio and video data. If applicable, the MUX-DEMUX units may conform to the ITU H.223 multiplexer protocol, or other protocols such as the user datagram protocol (UDP).

The H.264/MPEG-4 AVC standard was formulated by the ITU-T Video Coding Experts Group (VCEG) together with the ISO/IEC MPEG as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification.

In some cases, video encoder 20 and video decoder 26 may be configured to support scalable video coding (SVC) for spatial, temporal and/or signal-to-noise ratio (SNR) scalability. Video encoder 20 and video decoder 26 may be configured, in some aspects, to support fine granularity SNR scalability (FGS) coding for SVC. Video encoder 20 and video decoder 26 may support various degrees of scalability by supporting encoding, transmission and decoding of a base layer and one or more scalable enhancement layers. For scalable video coding, a base layer carries video data with a baseline level of quality. One or more enhancement layers carry additional data to support higher spatial, temporal and/or SNR levels.

A base layer may be transmitted in a manner that is more reliable than the transmission of enhancement layers. For example, the most reliable portions of a modulated signal may be used to transmit the base layer, while less reliable portions of the modulated signal may be used to transmit the enhancement layers. The base and enhancement layers are encoded using hierarchical modulation on the physical layer such that the base layer and enhancement layer can be transmitted on the same carrier or subcarriers but with different transmission characteristics resulting in different packet error rate (PER).

In some aspects, for video broadcasting, the techniques described in this disclosure also may be applied to Enhanced H.264 video coding for delivering real-time video services in terrestrial mobile multimedia multicast (TM3) systems using the Forward Link Only (FLO) Air Interface Specification, "Forward Link Only Air Interface Specification for Terrestrial Mobile Multimedia Multicast," published in July 2007 as Technical Standard TIA-1099 (the "FLO Specification"). For example, channel 16 may comprise a wireless information channel used to broadcast wireless video information according to the FLO Specification, or the like. The FLO Specification includes examples defining bitstream syntax and semantics and decoding processes suitable for the FLO Air Interface.

Alternatively, video may be broadcasted according to other standards such as DVB-H (digital video broadcast-handheld), ISDB-T (integrated services digital broadcast-terrestrial), or DMB (digital media broadcast). Hence, in various aspects, source device 12 may be a mobile wireless terminal, a video streaming server, or a video broadcast server. However, techniques described in this disclosure are not limited to any particular type of broadcast, multicast, or point-to-point system. In the case of video broadcast, source device 12 may broadcast several channels of video data to multiple destination devices, each of which may be similar to destination device 14 of FIG. 1. Thus, although a single destination device 14 is shown in FIG. 1, for video broadcasting, source device 12 may more typically broadcast the video content simultaneously to many destination devices.

Transmitter 22, communication channel 16, and receiver 24 may be configured for communication according to any wired or wireless communication system, including one or more of a Ethernet, telephone (e.g., POTS), cable, power-line, and fiber optic systems, and/or a wireless system comprising one or more of a code division multiple access (CDMA or CDMA2000) communication system, a frequency division multiple access (FDMA) system, an orthogonal frequency division multiple (OFDM) access system, a time division multiple access (TDMA) system such as GSM (Global System for Mobile Communication), GPRS (General packet Radio Service), or EDGE (enhanced data GSM environment), a TETRA (Terrestrial Trunked Radio) mobile telephone system, a wideband code division multiple access (WCDMA) system, a high data rate 1xEV-DO (First generation Evolution Data Only) or 1xEV-DO Gold Multicast system, an IEEE 802.18 system, a MediaFLO™ system, a DMB system, a DVB-H system, or another scheme for data communication between two or more devices.

Video encoder 20 and video decoder 26 each may be implemented with one or more microprocessors, digital signal processors (DSPs), application specific integrated circuits (ASICs), field programmable gate arrays (FPGAs), discrete logic, software, hardware, firmware or any combinations thereof. Each of video encoder 20 and video decoder 26 may be included in one or more encoders or decoders, either of which may be integrated as part of a combined encoder/decoder (CODEC) in a respective mobile device, subscriber device, broadcast device, server, or the like. In addition, source device 12 and destination device 14 each may include appropriate modulation, demodulation, frequency conversion, filtering, and amplifier components for transmission and reception of encoded video, as applicable, including radio frequency (RF) wireless components and antennas sufficient to support wireless communication, if applicable. For ease of illustration, however, such components are generally summarized as being transmitter 22 of source device 12 and receiver 24 of destination device 14 in FIG. 1.

While each of the above aspects of the efficient coding techniques are generally described in this disclosure relative to one another, each of these aspects may be separately implemented or otherwise performed outside of one another or in separate and distinct contexts. Moreover, although generally described in this disclosure with respect to video decoder 26 that decodes video data, one or more of the above aspects of the efficient coding techniques may be implemented by video encoder 20 to more efficiently encode digital video. The following FIG. 2 and accompanying discussion may illustrate one or more instances in which a video encoder 20 may implement, in various aspects, the efficient coding techniques described in this disclosure.

Figure 2:
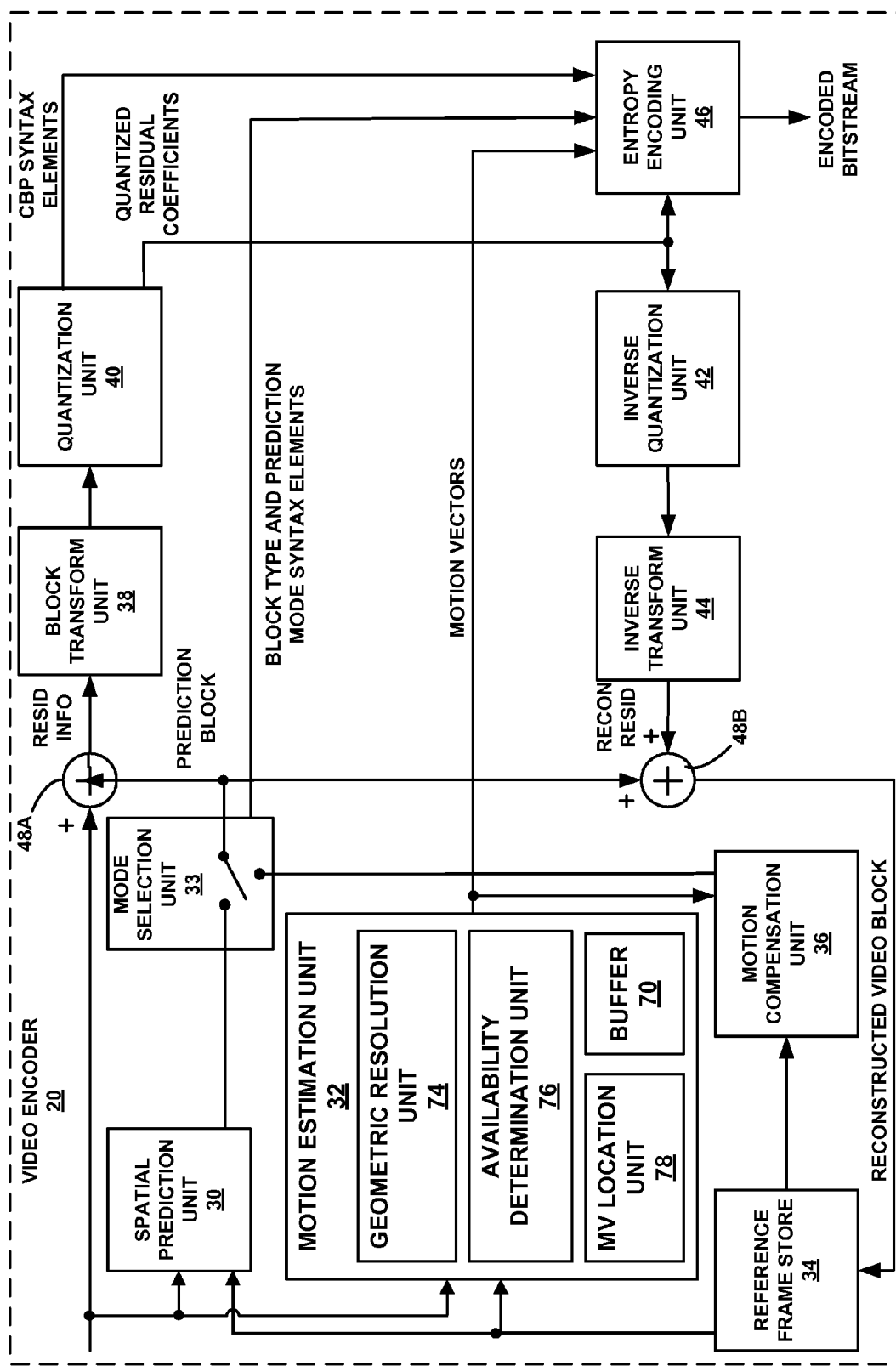
FIG. 2 is a block diagram illustrating an example of the video encoder of FIG. 1 in further detail.

FIG. 2 is a block diagram illustrating video encoder 20 of FIG. 1 that performs the efficient coding techniques of this disclosure. Video encoder 20 may correspond to that of source device 12 of FIG. 1. Video encoder 20 performs intra- and inter-coding of blocks within coded units, e.g. video frames or slices. Intra-coding relies on spatial prediction to reduce or remove spatial redundancy in video data within a given video frame, slice or other coded unit. For purposes of illustration, the techniques will be described for a slice of a frame. However, the techniques may be used for any coded unit, such as the entire frame or any portion of the frame. For intra-coding, video encoder 20 forms a prediction block based on one or more previously encoded blocks within the same slice as the block being coded. Inter-coding relies on temporal prediction to reduce or remove temporal redundancy within adjacent frames of a video sequence. For inter-coding, video encoder 20 performs motion estimation to track the movement of matching video blocks between two or more adjacent frames.

As shown in FIG. 2, video encoder 20 receives a current video block within a video frame or slice to be encoded. Video encoder 20 includes components for performing temporal prediction and spatial prediction. In the example of FIG. 2, video encoder 20 includes a spatial prediction unit 30, motion estimation unit 32, mode selection unit 33, reference frame store 34, motion compensation unit 36, block transform unit 38, quantization unit 40, inverse quantization unit 42, inverse transform unit 44 and entropy encoding unit 46. An in-loop de-blocking filter (not shown) may be applied to reconstructed video blocks to remove blocking artifacts. Video encoder 20 also includes summers 48A and 48B ("summers 48"). Motion estimation unit 32 and motion compensation unit 36 perform temporal prediction for inter-coding of video blocks. Spatial prediction unit 30 performs spatial prediction for intra-coding of video blocks.

To perform temporal prediction, motion estimation unit 32 compares the current video block to blocks in one or more adjacent video frames to generate one or more motion vectors. The current video block refers to a video block currently being coded, and may comprise input to video encoder 20. The adjacent frame or frames (which include the video blocks to which the current video block is compared) may be retrieved from frame store 34. Frame store 34 may comprise any type of memory or data storage device to store one or more previously encoded frames or blocks. In this case, frame store may store blocks within the previously encoded frames. Motion estimation unit 32 identifies a block in an adjacent frame that most closely matches the current video block, e.g., a block in the adjacent frame that has a smallest mean squared error (MSE), sum of squared difference (SSD), sum of absolute difference (SAD), or has the smallest rate-distortion cost. Motion estimation may be performed for blocks of variable sizes, e.g., 16×16, 16×8, 8×16, 8×8 or smaller block sizes, based on the block type of the current video block.

Motion estimation unit 32 may produce a motion vector (MV) (or multiple MV's in the case of bidirectional prediction) that indicates a magnitude and trajectory of the displacement between the current video block and the identified predictive block used to code the current video block. Motion vectors may have half- or quarter-pixel precision, or even finer precision, allowing video encoder 20 to track motion with higher precision than integer pixel locations and obtain a better prediction block. As described below, motion estimation unit 32 may compress MVs by outputting an MV difference. Using the resulting MV or compressed MV, motion compensation unit 36 forms a prediction video block by motion compensation. In the case of integer pixel precision, motion compensation unit 36 selects the block at the location identified by the motion vector as the prediction block. In the case of fractional pixel precision, motion compensation unit 36 may perform interpolation to form the prediction block.

In the case of spatial prediction, spatial prediction unit 30 generates a prediction block based on one or more adjacent blocks within a common frame. Spatial prediction unit 30 may, for example, generate the prediction block by performing interpolation using one or more adjacent blocks within the current frame and a selected prediction mode. The one or more adjacent blocks within the current frame may, for example, be retrieved from frame store 34. Thus, in the case of spatial prediction, frame store 34 may store previously encoded blocks of the current frame that have been decoded and reconstructed. For an intra 16×16 block type, for example, spatial prediction unit 30 may generate the prediction block using one of four prediction modes; a DC prediction mode, a horizontal prediction mode, a vertical prediction mode and a plane prediction mode. As another example, spatial prediction unit 30 may select one of the adjacent blocks within the current frame as the prediction block. In this manner, spatial prediction unit 30 relies on blocks within a common frame to generate the prediction block instead of blocks within adjacent frames.

Mode selection unit 33 selectively switches between the prediction block generated by spatial prediction unit 30 and the prediction block generated by motion compensation unit 36 based on the coding mode selected to encode the current block. In this manner, video encoder 20 may selectively perform inter-coding and intra-coding, e.g., on a frame-by-frame or block-by-block basis. Video encoder 20 generates residual information (labeled "RESID INFO" in FIG. 2) by subtracting the selected prediction block produced from the current video block at summer 48A. Thus, in the case of intra-coding, video encoder 20 generates the residual information by subtracting the selected prediction block output by spatial prediction unit 30 from the current video block at summer 48A. In the case of inter-coding video, encoder 20 generates the residual information by subtracting the selected prediction block output by motion compensation unit 36 from the current video block at summer 48A. As described above, the residual information quantifies the differences between the prediction video block and the current video block being coded. Block transform unit 38 applies a transform, such as a DCT or a 4×4 or 8×8 integer transform, to the residual information to produce residual transform coefficients. Quantization unit 40 quantizes the residual transform coefficients to further reduce the bit rate.

Following quantization, inverse quantization unit 42 and inverse transform unit 44 may apply inverse quantization and inverse transformation, respectively, to reconstruct the residual information (labeled "RECON RESID" in FIG. 2). Summer 48B adds the reconstructed residual information to the prediction block produced by motion compensation unit 36 or spatial prediction unit 30 to produce a reconstructed video block for storage in frame store 34. The reconstructed block may be used by spatial prediction unit 30 to intra-code another block in the current frame. Additionally, the reconstructed video block may be used by motion estimation unit 32 and motion compensation unit 36 to inter-code a block in a subsequent video frame.

In particular, motion estimation unit 32 may utilize the reconstructed video block to deconstruct or compress the above described motion vectors (MVs). H.264/MPEG-4 AVC coding techniques typically require that each inter-coded block be encoded with a corresponding MV. As block sizes may vary from large, e.g., 16×16 pixel blocks, to small, e.g., 4×4 pixel blocks, the number of blocks in a frame or slice may vary. Motion estimation unit 32 may compress motion vectors because encoding a motion vector for each block may require a significant number of bits, especially if blocks of smaller sizes, e.g., 4×4, 8×4, or 4×8, are chosen.

To compress the motion vectors, motion estimation unit 32 may rely on geometrically related or neighboring blocks stored in reference frame store 34 to that of the current block. Generally, motion vectors (MVs) for neighboring blocks are similar or highly correlated with those of the current block. Motion estimation unit 32 may therefore access available neighboring blocks to retrieve MVs associated with each of the neighboring blocks. Motion estimation unit 32 may then, based on the determined MVs for each of the available neighboring blocks or motion vector data, predict a motion vector for the current block. Motion estimation unit 32 may predict the motion vector or calculate a predicted motion vector (MVp) as, for example, the median of those available motion vectors. While median filtering is the most common method by which to calculate MVp, motion estimation unit 32 may calculate MVp according to any other prediction scheme, such as special ad-hoc prediction schemes that supersede median filtering. For example, assuming the current sub-block has a partition of 16×8, for the first partition (the top one), if the reference index is the same as the one above (across a MB boundary), motion estimation unit 32 may, instead of applying median filtering, assign the MVp to the same value as the MV in the block above.

Motion estimation unit 32 may also estimate or derive an MV for the current MV in the manner described above. That is, motion estimation unit 32 may estimate the MV by determining the amount of motion between a block in the reference frame and the current block, as described above. Motion estimation unit 32 may calculate a difference between the derived or estimated motion vector (MVe) for the current block and the predicted motion vector or MVp. Motion estimation unit 32 may then transmit the motion vectors for the current block as the difference computed from the MVp and the MVe. As the difference generally comprises fewer bits than the comparable MVe, motion estimation unit 32 may, by using the difference, compress the motion vector data.

As noted above, motion estimation unit 32 may require information concerning available neighboring blocks as well as motion vectors. In this respect, motion estimation unit 32 may implement, in various aspects, the efficient coding techniques described in this disclosure to more efficiently determine the neighboring blocks for the current block, determine the availability of the neighboring blocks and locate the MVs for each of the neighboring blocks. Motion estimation unit 32 may, therefore, implement the efficient coding techniques described in this disclosure, for example, to output the motion vectors to entropy encoding unit 46.

Entropy encoding unit 46 may receive the residual information in the form of quantized residual coefficients for the current video block from quantization unit 40. Additionally, entropy encoding unit 46 receives block header information for the current video block in the form of one or more header syntax elements from the mode selection unit 33 and other components within video encoder 20. The header syntax elements may identify particular characteristics of the current video block. For a block being intra-coded, for example, entropy encoding unit 46 may receive a block type syntax element and a prediction mode syntax element from the mode selection unit 33, and CBP syntax elements for luma and chroma from the quantization unit 40. For a block being inter-coded, entropy encoding unit 46 may additionally receive one or more motion vectors as syntax elements for the current video block from the motion estimation unit 32. The syntax elements described above are examples of the syntax elements that may be received by entropy encoding unit 46. Entropy encoding unit 46 may receive more or fewer syntax elements. Entropy encoding unit 46 encodes the header information and the residual information for the current video block to generate an encoded bitstream.

The above discussion illustrates that the techniques may, in various aspects, be implemented by video encoder 20 to generally encode the digital video data more efficiently and, in particular, more efficiently encode motion vectors. Although not described in detail with respect to FIG. 2, encoder 20, generally, and motion estimation unit 32, particularly, may comprise substantially similar components, modules, units and other elements as those described with respect to decoder 26 of the following FIG. 3 in order to implement the efficient coding techniques described in this disclosure.

Figure 3:
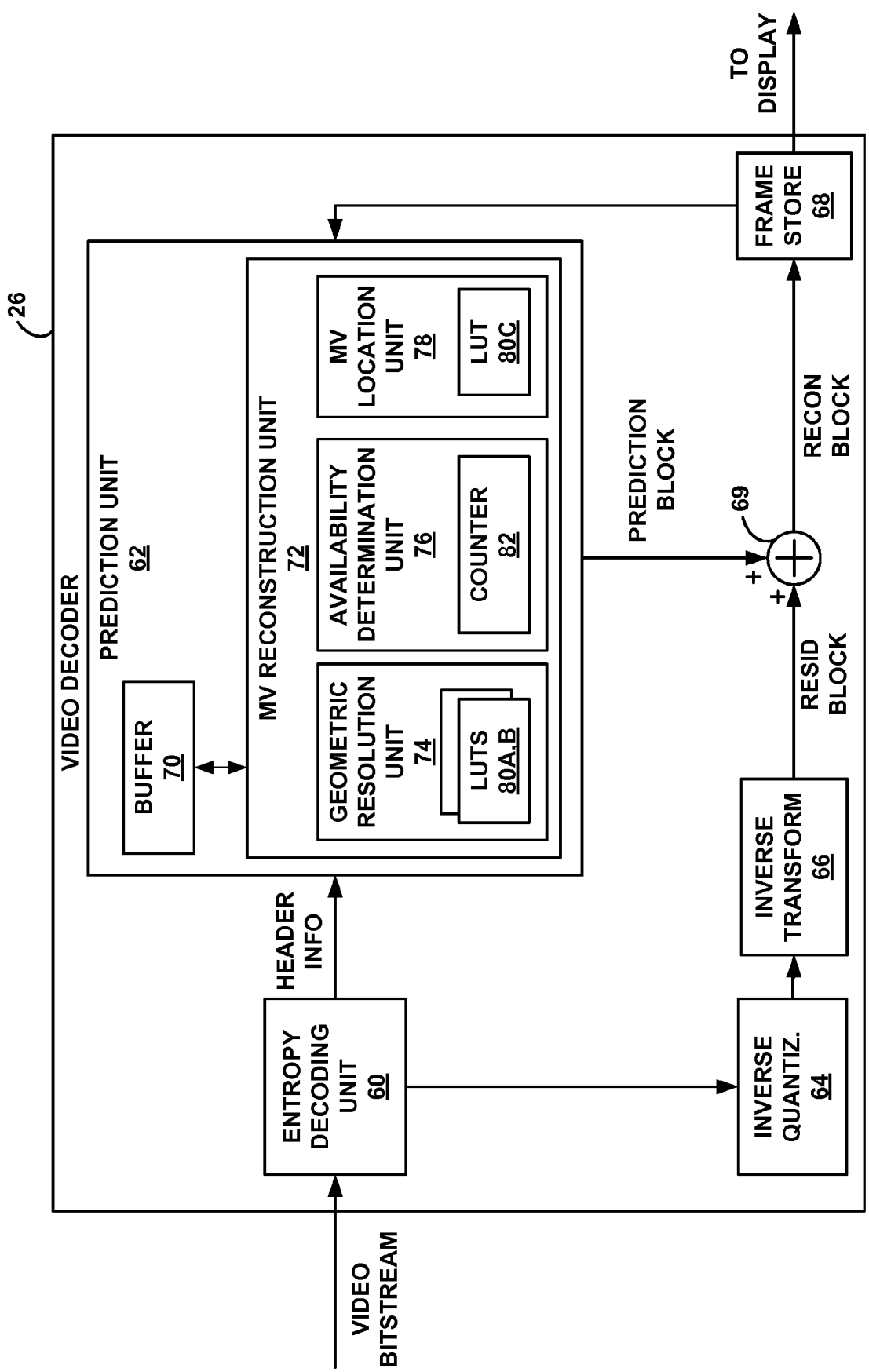
FIG. 3 is a block diagram illustrating an example of the video decoder of FIG. 1 in further detail.

In the example of FIG. 3, motion estimation unit 32 may include a buffer 70, a geometric resolution unit 74, an availability determination unit 76 and a motion vector (MV) location unit 78 substantially similar to those described below with respect to video decoder 26 and MV reconstruction unit 72. Briefly, however, geometric resolution unit 74 may implement the efficient coding techniques directed to resolving geometric relationships in order to determine neighboring blocks for a current block. Availability determination unit 76 may implement the efficient coding techniques directed to determining an availability for each of the neighboring blocks. MV location unit 78 may implement the efficient coding techniques directed to location of motion vector data within buffer 70 for a given one or more of the neighboring blocks determined to be available. More information concerning each of buffer 70 and units 74-76 are described below with respect to the following FIG. 3.

FIG. 3 is a block diagram illustrating an example of video decoder 26 of FIG. 1 in further detail. Video decoder 26 may perform intra- and inter-decoding of blocks within coded units, such as video frames or slices. In the example of FIG. 3, video decoder 26 includes an entropy decoding unit 60, prediction unit 62, coefficient scanning unit 63, inverse quantization unit 64, inverse transform unit 66, and frame store 68. Video decoder 26 also includes summer 69, which combines the outputs of inverse transform unit 66 and prediction unit 62.

Entropy decoding unit 60 receives the encoded video bitstream (labeled "VIDEO BITSTREAM" in FIG. 3) and decodes the encoded bitstream to obtain residual information (e.g., in the form of a one-dimensional vector of quantized residual coefficients) and header information (e.g., in the form of one or more header syntax elements). Entropy decoding unit 60 performs the reciprocal decoding function of the encoding performed by encoding module 46 of FIG. 2. Prediction unit 62 generates a prediction block using at least a portion of the header information.

Entropy decoding unit 60 also decodes the encoded video data to obtain the residual information in the form of a one-dimensional coefficient vector. Inverse quantization unit 64 inverse quantizes, i.e., de-quantizes, the quantized residual coefficients. Inverse transform unit 66 applies an inverse transform, e.g., an inverse DCT, inverse integer transform, or inverse directional transform, to the de-quantized residual coefficients to produce a residual block of pixel values. Summer 69 sums the prediction block generated by prediction unit 62 with the residual block from inverse transform unit 66 to form a reconstructed video block. In this manner, video decoder 26 reconstructs the frames of the video sequence block-by-block using the header information and the residual information.

Block-based video coding can sometimes result in visually perceivable blockiness at block boundaries of a coded video frame. In such cases, deblock filtering may smooth the block boundaries to reduce or eliminate the visually perceivable blockiness. As such, a deblocking filter (not shown) may also be applied to filter the decoded blocks in order to reduce or remove blockiness. Following any optional deblock filtering, the reconstructed blocks are then placed in frame store 68, which provides reference blocks for spatial and temporal prediction of subsequent video blocks and also produces decoded video to drive display device (such as display device 28 of FIG. 1).

In the example of FIG. 3, prediction unit 62 may utilize previously decoded blocks stored to frame store 68 in order to generate the prediction block. Based on a prediction mode, prediction unit 62 may utilize motion vectors (MVs) to generate the prediction block. As described above, an encoder, such as video encoder 20 of FIG. 2, may compress motion vector data. As a result, video decoder 26, generally, and prediction unit 62, particularly, may reconstruct MVs for some block given the compressed motion vector data. Motion vector data may, once uncompressed, comprise an x-axis component of the MV or MVx and a y-axis component of the MV or MVy. Alternatively, motion vector data may comprise a magnitude and an angle.

Prediction unit 62 may therefore include a buffer 70 and a motion vector reconstruction unit 72 ("MV reconstruction unit 72") to reconstruct the MV from compressed motion vector data. Buffer 70 may store a plurality of potential neighboring blocks and the current block being decoded (including the block header information as decoded by entropy coding unit 60). Typically, the plurality of buffered blocks are retrieved from frame store 68 or stored by prediction unit 62 after decoding these blocks. One or more of the plurality of buffered blocks may represent a neighboring block, which MV reconstruction unit 62 may utilize to reconstruct an MV for the current block.

MV reconstruction unit 72 may include a geometric resolution unit 74, an availability determination unit 76 and a motion vector location unit 78 ("MV location unit 78"). Geometric resolution unit 74 may implement the efficient coding techniques directed to resolving geometric relationships between the plurality of buffered blocks stored in buffer 70 in order to identify neighboring blocks for the current block. Availability determination unit 76 may implement the efficient coding techniques directed to determining or checking an availability of the plurality of buffered blocks identified as neighboring blocks. MV location unit 78 may implement the efficient coding techniques directed to locating MVs within the plurality of MVs identified as both neighboring and available.

In operation, MV reconstruction unit 72 may load the current block into buffer 70. MV reconstruction unit 72 may also load other blocks into buffer 70 that may constitute candidate neighboring blocks. MV reconstruction unit 72 may then retrieve header information from the current block stored to buffer 72. In particular, MV reconstruction unit 72 may retrieve a block index that identifies a sequence of the block with respect to a slice or frame to which the current block corresponds. MV reconstruction unit 72 may also retrieve a partition width from the header information that specifies the width of a partition of the block. As described above, an MB may comprise a 16×16 block of pixels and may be partitioned into two or more partitions or sub-partitions of a 16×8, 8×16, 8×8, 8×4, 4×8, and 4×4. Again, both MBs and each of the partitions or sub-partitions may be generally referred to as blocks in this disclosure. The partition width may therefore specify any one of the above widths or 16, 8, or 4.

Based on the block index and the partition width, geometric unit 74 may determine indices of neighboring blocks, where the indices refer to indices used to access buffer 70 and retrieve those blocks or sub-blocks identified as neighboring blocks or sub-blocks. Geometric unit 74 may comprise at least two lookup tables 80A and 80B ("LUTS 80A, B") that take as input the block index and partition width and output indices that identify those of the plurality of buffered blocks stored in buffer 70 that constitute neighboring blocks within the meaning of H.264/MPEG-4 AVC. As described above, LUT 80A may comprise the first-stage LUT that receives the block index and partition width as inputs and outputs indices that identify the neighboring blocks assuming the plurality of buffered blocks are coded according to a non-MBAFF coding scheme. LUT 80B may comprise a second-stage LUT that receives as inputs those indices determined by LUT 80A and outputs adjusted indices that identify those of the plurality of buffered blocks that are neighboring blocks. LUT 80B may adjust the indices output by LUT 80A to account for the MBAFF coding scheme.

Geometric resolution unit 74 may, therefore, output either the indices or the adjusted indices depending on whether the frame is a non-MBAFF coded frame or an MBAFF coded frame. Regardless, availability determination unit 76 may receive either the index or adjusted indices, which may be referred to generally herein as the "neighboring indices," and determine the availability of the corresponding neighboring blocks based on the neighboring indices and an availability counter 82. Availability determination unit 76 may increment availability counter 82 in the manner described above so as to reflect the number of blocks of the current slice or frame that have been previously decoded. Based on the value of availability counter 82, availability determination unit 76 may determine, as described in more detail below, whether the neighboring block identified by the corresponding neighboring index is available for use in decoding the present block. If not available, availability determination unit 76 may indicate the unavailability of this neighboring block by outputting an invalid neighboring index. If available, availability determination unit 76 may output a valid neighboring index.

MV location unit 78 may determine a location of the motion vector data for each of the plurality of buffered blocks stored to buffer 70 that are both neighboring and available, as indicated for example by the above described valid neighboring index. If an invalid neighboring index is received, MV location unit 78 may not output an index identifying the location of the MV, but may instead forward the invalid index. However, if at least one valid index is received, MV location unit 78 may use this valid index as a key to lookup table 80C ("LUT 80C"). MV location unit 78 may also use, as an input to lookup table 80C, the prediction mode of the current block and a sub-block or sub-block type, if applicable, of the current block. Based on these inputs, LUT 80C may output a neighboring MV index to buffer 70. The neighboring MV index may identify the location of MV information associated with the particular available neighboring block identified by the input neighboring block.

MV reconstruction unit 72 may then retrieve the MV information for each of the available neighboring blocks from buffer 70 using the one or more neighboring MV indices generated by MV location unit 78. MV reconstruction unit 72 may, upon retrieving this motion vector data, determine the predicted MV or MVp by, for example, median averaging the MVs of those neighboring MVs or performing any other operation commonly employed to determine the MVp. MV reconstruction unit 72 may then access buffer 70 to retrieve an MV difference, such as the MV difference described above, from the header information of the current block of buffer 70. MV reconstruction unit 72 may then sum the difference with the MVp to estimate the original motion vector or MVe. In this manner, MV reconstruction unit 72 may attempt (as the reconstruction may not be lossless) to reconstruct the estimated motion vector or MVe for the current block using the efficient coding techniques described in this disclosure.

Figure 4:
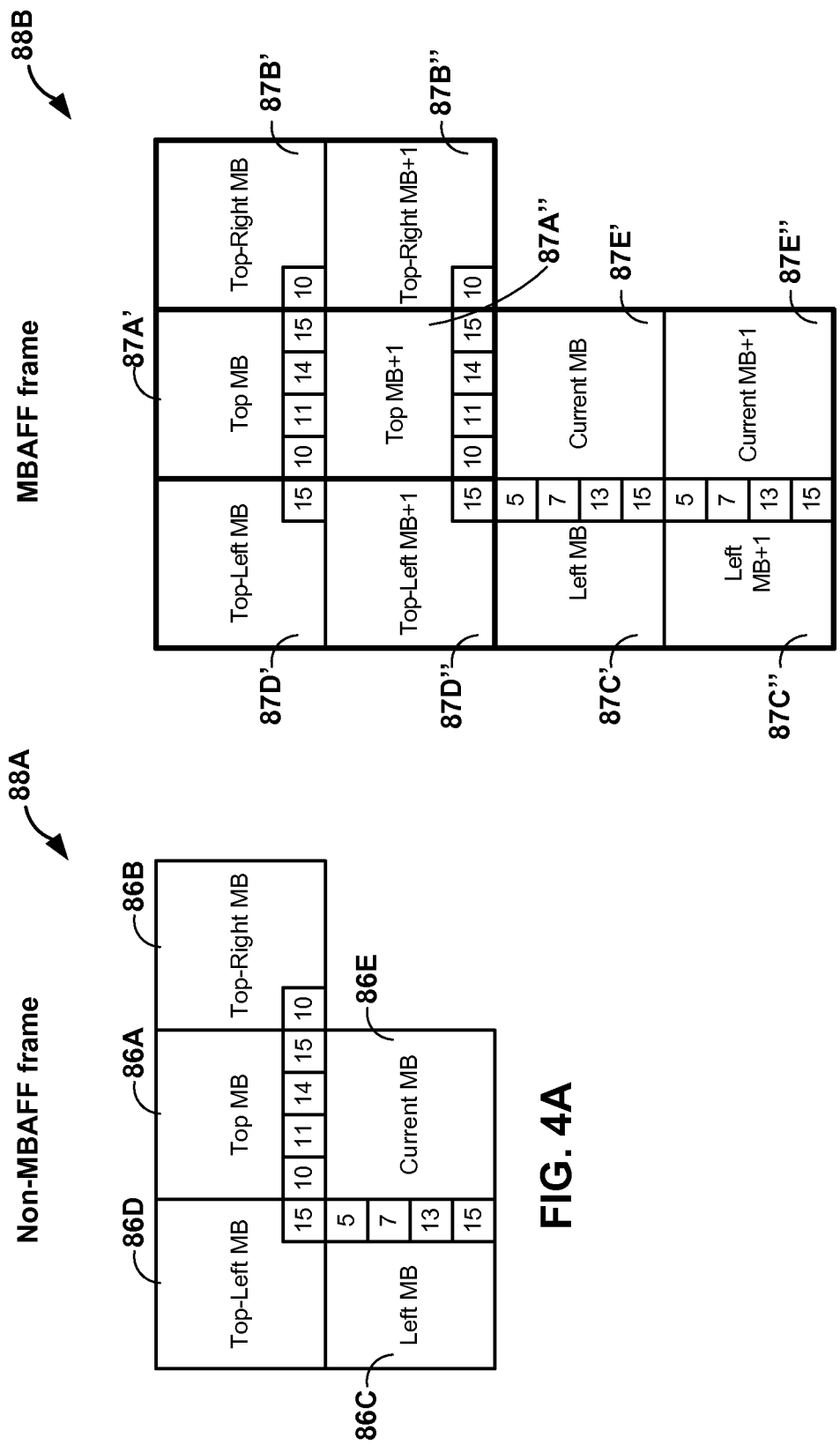
FIGS. 4A and 4B are diagrams illustrating geometrical relationships among a plurality of video macroblocks for different coding schemes.

FIGS. 4A-4B are diagrams illustrating geometrical relationships among a plurality of blocks for different coding schemes. FIG. 4A is a conceptual diagram illustrating geometric relationships among a plurality of blocks 86A-86E ("blocks 86") of a non-MBAFF coded frame 88A. Blocks 86 may each comprise blocks of dimension 16×16 pixels, and may therefore be referred to as "MBs 86." Those sub-blocks identified in MBs 86A-86D may comprise sub-blocks of dimension 4×4 pixels. Each of MBs 86 may comprise sixteen (16) 4×4 sub-blocks, which may be numbered from 0-15. Only a portion of frame 88A is shown in FIG. 4A for ease of illustration purposes and frame 88A may comprise more or less block than those MBs 86 shown in FIG. 4A. Moreover, the following discussion of geometric relationships corresponds to that defined by the H.264/MPEG-4 AVC standard, although the techniques should not be limited to this particular standard and may apply to any coding standard that relies on geometrically relevant or related video data unit to encode and/or decode a current video data unit.

In the example of FIG. 4A, current MB 86E sits at the bottom middle of the portion of frame 88A. Each of MBs 86A-86D may be identified as neighboring blocks, as described in more detail below. MB 86A lies to the top of or directly above current MB 86E and may be referred to as "top" MB 86A. MB 86B lies to the top and right of current MB 86E and may be referred to as "top-right" MB 86B. MB 86C lies directly to the left of current MB 86E and may be referred to as "left" MB 86C. MB 86D lies to the left of and above or to the top of current MB 86E and may be referred to as "top-left" MB 86D.

For each of neighboring MBs 86A-86D, only those sub-blocks required by the H.264/MPEG-4 standard for MV reconstruction are illustrated in FIG. 4A. For example, for top neighboring MB 86A, only sub-blocks numbered 10, 11, 14 and 15 are illustrated as these sub-blocks 10, 11, 14 and 15 are the only sub-blocks required for reconstructing an MV for current MB 86E. Likewise, sub-blocks 5, 7, 13, 15 of left neighboring MB 86C, sub-block 15 of top-left neighboring MB 86D and sub-block 10 of top-right neighboring MB 86B are illustrated as these are the only blocks that may be required to reconstruct an MV for current MB 86E.

FIG. 4B is a conceptual diagram illustrating geometric relationships among a plurality of block pairs 87A'/A"-87E'/E" ("blocks pairs 87") of an MBAFF coded frame 88B. Each of block pairs 87 may comprise a first block identified by a single apostrophe, e.g., block 87A', and a corresponding block identified by double apostrophes, e.g., block 87A". As a result, block pairs 87 may also be referred to generally as blocks 87. Blocks 87 may each comprise blocks of dimension 16×16 pixels and therefore may be referred to as "MBs 87." Those sub-blocks identified in MBs 87A'/A"-87D'/D" may comprise sub-blocks of dimension 4×4 pixels. Each of MBs 87 may therefore comprise 16 4×4 sub-blocks, which may be numbered from 0-15. Only a portion of frame 88B is shown in FIG. 4B for ease of illustration purposes and frame 88B may comprise more or less block than those MBs 87 shown in FIG. 4B. Moreover, the following discussion of geometric relationships corresponds to that defined by the H.264/MPEG-4 AVC standard, although the techniques should not be limited to this particular geometric arrangement.

As MBAFF frame 88B may comprise both field and frame coded blocks, the geometric relationships between MBs 87 may involve block pairs, such as MB pairs 87. Although illustrated in FIG. 4A as MBs 86, these MBs 86 may comprise block pairs similar to MB pairs 87. However, resolving the geometric relationship for non-MBAFF frames, such as frame 88A, may, as described below, not be as complex as that for MBAFF frames, such as frame 88B. That is, the geometrical relationships among like encoded blocks, e.g., when the current and a neighboring block are both coded as either frame or field blocks, may be fairly straightforward. This form of straightforward resolution occurs for non-MBAFF encoded frames, such as frame 88A depicted in FIG. 4A. Thus, FIG. 4A illustrates MBs 86 without regard to block pairs, as resolution between field coded block pairs and frame coded blocks in non-MBAFF schemes is generally the same.

However, for blocks coded differently as may occur in MBAFF coded frame 88B where the current and one of the neighboring blocks may be coded according to different modes, e.g., one frame coded and one field coded, the determination of geometric relationships to determine neighboring blocks or sub-blocks may be substantially more complex. For example, when the current block is coded in a different mode than one of the neighboring blocks, the neighboring block or sub-block may comprise blocks only from one block of the block pair, e.g., MB 87A" of MB pair 87A. The geometric relationships for both non-MBAFF and MBAFF frames 88A, 88B, respectively, are described in further detail below. As a result, for MBAFF coded frames 88B, the pairing of MBs 87 is depicted in FIG. 4B and described below.

As shown in FIG. 4B, current MB pair 87E comprises a first MB 87E' and a second MB 87E" and lies similar to MB 86 of FIG. 4A in the middle bottom of the portion of frame 88B. Current MB 87E' may be referred to as the "current MB", and current MB 87E' may be referred to as "current MB+1." As described in this disclosure, decoder 26 may need to access neighboring MB pairs 87A-87D because, in accordance with the MBAFF coding scheme, different combinations of frame and field coded blocks may reside within the same frame and reference each other.

MB pair 87A lies directly above or on top of current MB pair 87E, and therefore may be referred to as "top" MB pair 87A. Top MB pair 87A comprises a first MB 87A' referred to as "top MB" and a second MB 87A" referred to as "top MB+1." MB pair 87B lies above or on top of and to the right of current MB pair 87E, and therefore may be referred to as "top-right" MB pair 87B. Top-right MB pair 87B comprises a first MB 87B' referred to as "top-right MB" and a second 87B" referred to as "top-right MB+1." MB pair 87C lies directly to the left of current MB pair 87E, and therefore may be referred to as "left" MB pair 87C. Top-right MB pair 87C comprises a first MB 87C' referred to as "left MB" and a second MB 87C" referred to as "left MB+1." MB pair 87D lies above or on top of and to the left of current MB pair 87E, and therefore may be referred to as "top-left" MB pair 87D. Top-left MB pair 87D comprises a first MB 87D' referred to as "top-left MB" and a second MB 87D" referred to as "top-left MB+1."

For each of neighboring MB pairs 87A-87D, again, only those sub-blocks required by the H.264/MPEG-4 standard for MV reconstruction are illustrated in FIG. 4B. For example, for top neighboring MB pair 87A, only sub-blocks numbered 10, 11, 14 and 15 for respective MBs 87A' and 87A" are illustrated as these two sets of sub-blocks each including sub-blocks 10, 11, 14 and 15 are the only sub-block sets required for reconstructing a block for current MB pair 87E. Likewise, the sub-blocks numbered 10 for top-right MB pair 87B, the sub-blocks numbered 5, 7, 13 and 15 for left MB pair 87C and the sub-blocks numbered 15 of top-left MB pairs 87D are illustrated in FIG. 4B, as these are the only blocks that may be required to reconstruct an MV for current MB pair 87E.

Frames 88A and 88B ("frames 88") may be stored in frame store 68 and prediction units 62 may retrieve all or segments of the portions of frames 88A, 88B from frame store 68 and load these portions or segments thereof into buffer 70. Buffer 70, as described in more detail below, may index one or more of sub-blocks of each of MBs 86, 87, depending on the coding scheme, e.g., PAFF or MBAFF, of each of frames 88. The resolution of neighboring blocks for both non-MBAFF and MBAFF coding schemes is described below in more detail followed by an implementation of the efficient coding techniques to efficiently resolve these neighboring blocks, partitions, or sub-blocks, determine the availability of each of the determined neighboring blocks and locate MVs for each available neighboring block. Prior to these discussions, however, the partitioning of blocks into sub-blocks or partitions is discussed as this partitioning is pertinent to both the resolution of geometrical relationships and determining the availability of neighboring blocks.

Figure 5:
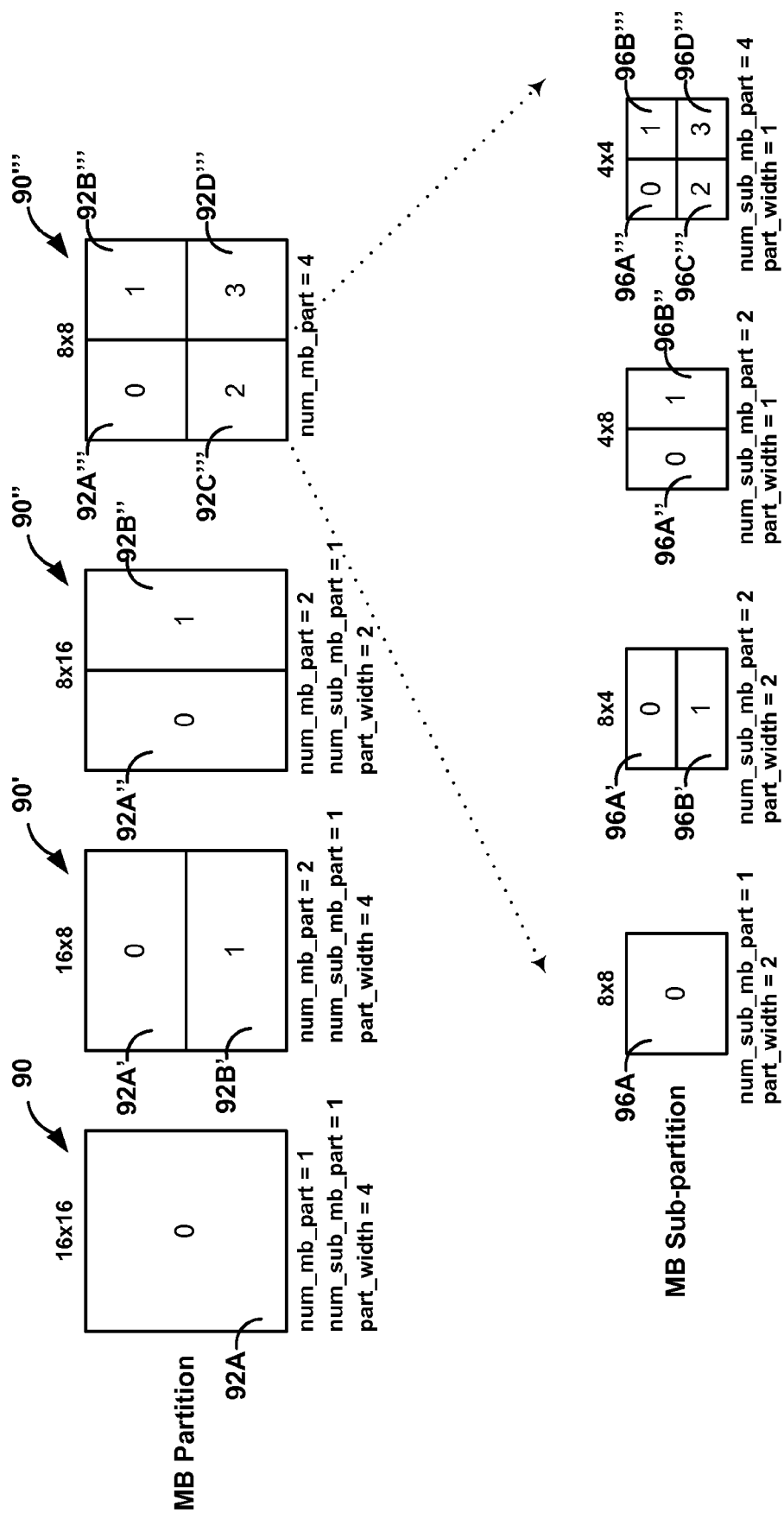
FIG. 5 is a block diagram illustrating a partitioning of a 16 pixel×16 pixel (16×16) video macroblock into various partitions and/or sub-partitions.

FIG. 5 is a block diagram illustrating a partitioning of 16 pixel×16 pixel (16×16) MB 90 into various partitions 92A-92D and/or sub-partitions 96A-96D. The top row of FIG. 5 illustrates the various partition 92A-92D that MB 90 may be divided into during encoding of the video data. The bottom row of FIG. 5 illustrates the further subdivision of an 8 pixel by 8 pixel (8×8) partition or sub-block 92C into various sub-partitions, which themselves may be referred to as sub-blocks. Below each of the various exemplary partitioning of MB 90 is listed pertinent header information that may be encoded with each exemplary instance of MB 90 to denote the partitions. Likewise, below each of the various exemplary subdivisions is listed further header information may be encoded with each exemplary instance of MB 90 to further denote the sub-partitions.

From right to left in the top row, MB 90 may be divided or partitioned in four ways. For each way, a corresponding number of apostrophes have been used to distinguish between the various manners in which MB 90 can be partitioned and sub-partitioned. For example, no apostrophe (e.g., 90) refers to a first way, while one apostrophe (e.g., 90') refers to the second way, and so on. Each of these ways of partitioning corresponds to a form of inter-coding MB 90, set forth in H.264/MPEG-4 AVC. These inter-coded modes may comprise inter__16×16 MB 90, inter__16×8 MB 90', inter__8×16 MB 90" and inter 8×8 MB 90'''. If inter__8×8 coding is used, as represented by MB 90''', each 8×8 partition 92A'''-92D''' may be individually coded in four additional sub-partitioning modes. These four modes, inter__8×8, inter__8×4, inter 4×8 and inter__4×4, are represented by inter__8×8 sub-block 92C, inter__8×4 sub-block 92C', inter__4×8 sub-block 92C'', inter__4×4 sub-block 92C'''. In the first way, MB 90 is not partitioned or subdivided but remains a 16×16 block having a single partition 92A. MB 90 in, this first instance, may be encoded with header information indicating this single partition 92A by including header variables "num_mb_part" set to one (1), "num_sub_mb_part" set to one (1), and "part_width" set to four (4). The variable "num_mb_part" refers to a variable for storing the number of MB partitions. The variable "num_sub_mb_part" refers to a variable for storing the number of sub-partitions. The variable "part_width" refers to a variable for storing the width of the partition as a multiple of 4 pixels. For example, in the instance of MB 90, in the first instance, a part_width of 4 indicates that the partition width is 4 multiplied by 4 or 16 pixels in width.

In the second way, as represented by MB 90', MB 90' is subdivided into two 16×8 partitions 92A', 92B'. MB 90' in, this second instance, may be encoded with header information indicating these partitions 92A', 92B' by including header variables "num_mb_part" set to two (2), "num_sub_mb_part" set to one (1), and "part_width" set to four (4). In the third way, as represented by MB 90'', MB 90'' is subdivided into two 8×16 partitions 92A'', 92B''. MB 90'' in, this third instance, may be encoded with header information indicating these partitions 92A'', 92B'' by including header variables "num_mb_part" set to two (2), "num_sub_mb_part" set to one (1), and "part_width" set to two (2). In the fourth way, as represented by MB 90''', MB 90''' is subdivided into four 8×8 partitions 92A''', 92B''', 92C''' and 92D'''. MB 90''' in, this fourth instance, may be encoded with header information indicating these partitions 92A''', 92B''', 92C''' and 92D''' by including header variables "num_mb_part" set to four (4). The other two variables are also set based on one of four ways in which the inter_8×8 partition may be further subdivided.

In the example of FIG. 5, the various sub-partitioning of an inter_8×8 block, e.g., partition 92C''' are further illustrated and each of the four ways in which sub-partitioning may occur are also designated, similar to above, through the use of apostrophes. In the first sub-partitioning way, partition 92C''' may be further sub-partitioned as a single sub-partition 96A. Partition 92C''' in, this first sub-partitioning instance, may be encoded with header information indicating this single sub-partition 96A by including the header variables "num_sub_mb_part" set to one (1) and "part_width" set to two (2). In the second sub-partitioning way, partition 92C''' may be further sub-partitioned into two 8×4 sub-partitions 96A' and 96B'. Partition 92C''' in, this second sub-partitioning instance, may be encoded with header information indicating these sub-partitions 96A' and 96B' by including the header variables "num_sub_mb_part" set to two (2) and "part_width" set to two (2).

In the third sub-partitioning way, partition 92C''' may be further sub-partitioned into two 4×8 sub-partitions 96A'' and 96B''. Partition 92C''', in this second sub-partitioning instance, may be encoded with header information indicating these sub-partitions 96A'' and 96B'' by including the header variables "num_sub_mb_part" set to two (2) and "part_width" set to one (1). In the forth sub-partitioning way, partition 92C''' may be further sub-partitioned into four 4×4 sub-partitions 96A''', 96B''', 96C''' and 96D'''. Partition 92C''' in, this second sub-partitioning instance, may be encoded with header information indicating these sub-partitions 96A''', 96B''', 96C''' and 96D''' by including the header variables "num_sub_mb_part" set to four (4) and "part_width" set to one (1).

In this manner, the H.264/MPEG-4 AVC standard defines the various block partitions and sub-partitions, each of which may be referred to herein generally as "blocks" and "sub-blocks," respectively. Although generally referred to in this manner, as noted above, block may constitute further sub-blocks and these sub-blocks may be referred to as blocks as well. However, for ease of discussion, partitions may be referred to as blocks or in the case of single partitions, MBs, and sub-partitions may be referred to as sub-blocks. Moreover, while the techniques may refer to resolving geometrical relationships to determine neighboring MBs for a current MB, the techniques are not limited in this respect. In other words, a neighboring MB may be construed to be generally a neighboring block or sub-block for a corresponding current block or sub-block and the techniques, as described below in more detail, may apply to any video data unit, such as MBs, blocks, and sub-blocks.

As a result, the partition and sub-partition width (or block and sub-block width) and partition and sub-partition location or starting block number may be used to derive the neighboring MBs, block, and sub-blocks in a non-MBAFF coded frame. The following FIGS. 6A-6L illustrate the derivation of resolution of neighboring MBs for a current MB with respect to a non-MBAFF coding scheme given a current MB partition or sub-partition width and partition or sub-partition location or starting block number, which may be generally referred to herein as a "video unit number."

Figure 6A:
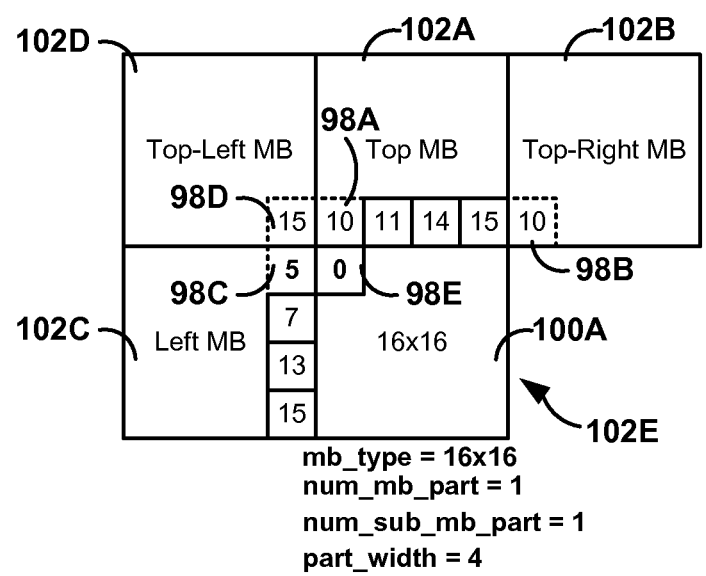

FIGS. 6A-6L are block diagrams each illustrating the geometric relationships between neighboring MBs and a current MB of a non-MBAFF coded frame. FIG. 6A is a block diagram illustrating those sub-blocks 98A-98D required from respective neighboring MBs 102A-102D to reconstruct an MV for current MB 102E having a 16×16 partition 100A. Current MB 102E includes a starting video unit number or starting block number of zero (0), which FIG. 6A shows as sub-block 98E. Given the header information for current MB 102E that specifies a partition width of 4 (or 16) and the starting block number of zero, decoder 26 in generally and, MV reconstruction unit 72, in particular, may derive neighboring sub-blocks 98A-98D of respective top, top-right, left and top-left neighboring MBs 102A-102D. Notably, sub-blocks 98A-98D are assigned numbers 10, 10, 5 and 15, respectively.

Figure 6B:
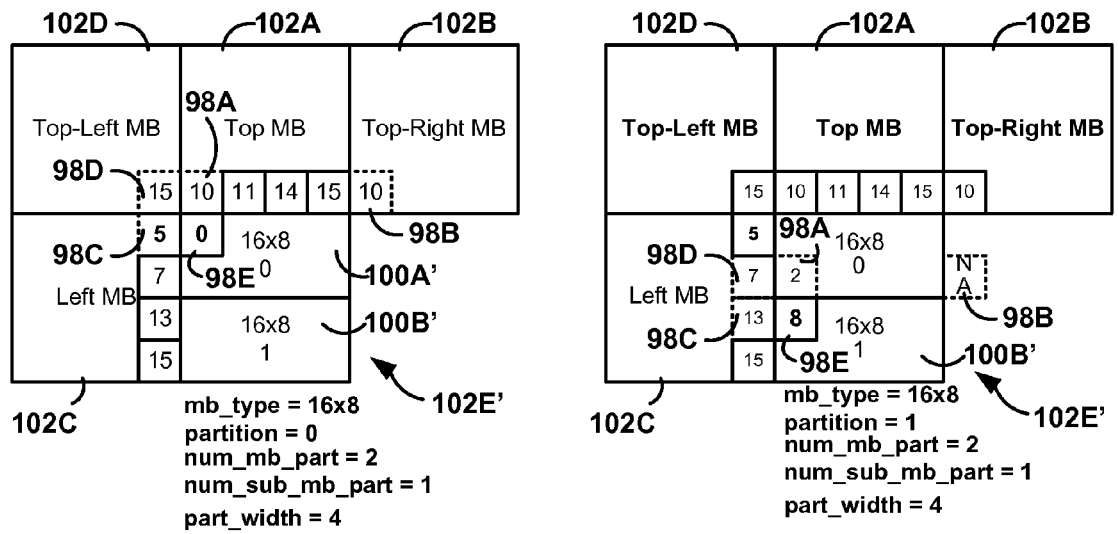

FIG. 6B is a block diagram illustrating those sub-blocks 98A-98D required from respective neighboring MBs 102A-102D to reconstruct an MV for a first partition or block 100A' of current MB 102E'. Current MB 102E' may include two partitions or blocks 100A' and 100B', similar to MB 90' of FIG. 5. The left portion of FIG. 6B illustrates the geometric relationships between neighboring MBs 102A-102D and 16×8 partition or block 100A' of current MB 102E'. The right portion of FIG. 6B illustrates the geometric relationships between neighboring MBs 102A-102D and 16×8 partition or block 100B' of current MB 102E'.

Referring to the left side of FIG. 6B, block 100A' includes a starting video unit number or starting block number of zero (0), which FIG. 6B shows as sub-block 98E. Sub-block 98E may be referred to herein as "starting" sub-block 98E as it refers, in each of FIG. 6 to the starting sub-block of the MB, block, or sub-block currently being decoded by decoder 26. Given the header information for current MB 102E' that specifies a partition width of 4 (or 16) and the starting block number of zero, decoder 26 in general and, MV reconstruction unit 72, in particular, may derive neighboring sub-blocks 98A-98D of respective top, top-right, left and top-left neighboring MBs 102A-102D. Notably, sub-blocks 98A-98D are assigned numbers 10, 10, 5 and 15, respectively, similar to sub-blocks 98A-98D as illustrated in FIG. 6A above.

Referring to the right side of FIG. 6B, block 100B' includes a starting video unit number or starting block number of eight (8), which FIG. 6B shows as sub-block 98E. Given the header information for current MB 102E' that specifies a partition width of 4 (or 16) and the starting block number of eight, decoder 26 in general and, MV reconstruction unit 72, in particular, may derive neighboring sub-blocks 98A-98D of respective current MB 102E', unavailable (N/A) right neighboring MB, and left neighboring MB 102C. Notably, sub-blocks 98A-98D are assigned numbers 2, N/A or not available (to reflect unavailability), 13 and 7, respectively.

Sub-block 98B may be unavailable because decoder 26 has not yet decoded the MB adjacent to the right of current MB 102E', considering that decoder 26 typically decoded MBs in raster scan order. As a result, this sub-block 98B may be unavailable. However, when reconstructing MVs, MV reconstruction unit 72 may only utilize three MVs of four MVs, e.g., the top, top-right and left neighboring MVs, to reconstruct a MV for the current block. As described above, MV reconstruction unit 72 may reconstruct the MV for the current block based on the three MVs by averaging the MVs of the three neighboring MB, median filtering the motion vectors and adding a differential storing in the current MB to the median filtered MV. The MV for the current MB may be used to point to a matching block in a reference frame so that we can add the residual pixel data stored for the current MB to the matching block to produce a decoded block. However, if the top-right MV is unavailable, as it is in this instance, MV reconstruction unit 72 may only utilize the top-left MV instead of the top-right. Thus, MV reconstruction unit 72 may still reconstruct an MV for the current block 100B' based on the three available MVs previously reconstructed for the blocks in which sub-blocks 98A, 98C and 98D reside. The techniques directed to determining the availability of these neighboring MBs are described in more detail below.

Moreover, as the MVs may not be stored to sub-blocks 98A, 98C and 98D in this instance. For example, decoder 26 generally and MV reconstruction unit 72 in particular may implement the MV location techniques to determine the one or more sub-block (of the corresponding blocks in which these sub-blocks 98A, 98C and 98D reside) that stores the relevant MV information or data. Again, some techniques that may be directed to determining the MV location are described in more detail below.

As described above, MV reconstruction unit 72 may implement the techniques directed to resolving such geometric relationships among video data units in a first-stage LUT 80A. As a result, the following derivation of neighboring MBs or sub-blocks of neighboring MBs may be performed or programmed into LUT 80A. The inputs to LUT 80A may comprise a partition width and a first block index, such as that corresponding to sub-block 98E. For 16 pixel wide sub-blocks, the following Table 1 represents an example of the logic that may be implemented by LUT 80A:

TABLE 1

| partition width | index >> 3 | (mbAddrA, blkA) | (mbAddrB, blkB) | (mbAddrC, blkC) | (mbAddrD, blkD) |
|---|---|---|---|---|---|
| 16 | 0 | (Left MB, 5) | (Top MB, 10) | (T-R MB, 10) | (T-L MB, 15) |
| 16 | 1 | (Left MB, 13) | (Curr MB, 2) | N/A | (Left MB, 7) |

The above Table 1 includes six columns and two rows. The first two columns represent the two inputs, e.g., partition width and starting block number or index, to LUT 80A, while the last four columns represent a shorthand of the index output of LUT 80A. LUT 80A may receive as input a partition width of 4 (or 16) and a starting index of zero. Notably, the starting index or block number assigned to sub-block 98E may be shifted to the right by 3 binary places, as represented by the ">>" operation in the header of the second column. Considering that a decimal 8 or $8_{10}$ is represented in binary format as 1000 or $1000_2$, shifting a binary number to the right is the same as dividing by 2 (and not keeping the remainder, e.g., integer division by 2). Three shifts to the right is therefore the equivalent to dividing by 8 (and not keeping the remainder, e.g., integer division by 8).

From Table 1, LUT 80A may output, for a partition of width 16 and including a starting block with a number or index less than 8 (such that a shift by 3 or integer division by 8 produces a zero), indices 5, 10, 10 and 15 assigned to sub-blocks 98C, 98A, 98B and 98D of left neighboring MB 102C, top neighboring MB 102A, top-right (T-R) neighboring MB 102B and top-left (T-L) neighboring MB 102D. Both partitions 100A and 100A' of FIGS. 6A and 6B, respectively, represent partitions of width 16 that include a starting sub-block 98E assigned an index or number of zero, which is less than 8. LUT 80 may therefore properly output indices to locate sub-blocks 98A-98D for each of partitions 100A and 100A'.

Also from Table 1, LUT 80A may output, for a partition of width 16 and including a starting block with a number or index greater than or equal to 8 (such that a shift by 3 or integer division by 8 produces a one), indices 13, 2, NA and 7 assigned to sub-blocks 98C, 98A, 98B and 98D of left neighboring MB 102C, top neighboring MB 102A, T-R neighboring MB 102B and T-L neighboring MB 102D. As used in this disclosure, "NA" is short for "Not-Available" and may represent a block that is not yet available in buffer 70, e.g., a block that cannot be loaded from frame store 68 because decoder 26 has not yet decoded this block. Partition 100B' represents such a partition of width 16 that includes a starting sub-block 98E assigned a number of index greater than or equal to 8. LUT 80A may therefore properly output indexes to locate sub-blocks 98A-98D for partition 100B'. In this manner, LUT 80A may derive neighboring MBs, blocks and sub-blocks for the current MB, block, and sub-block.

Figure 6C:
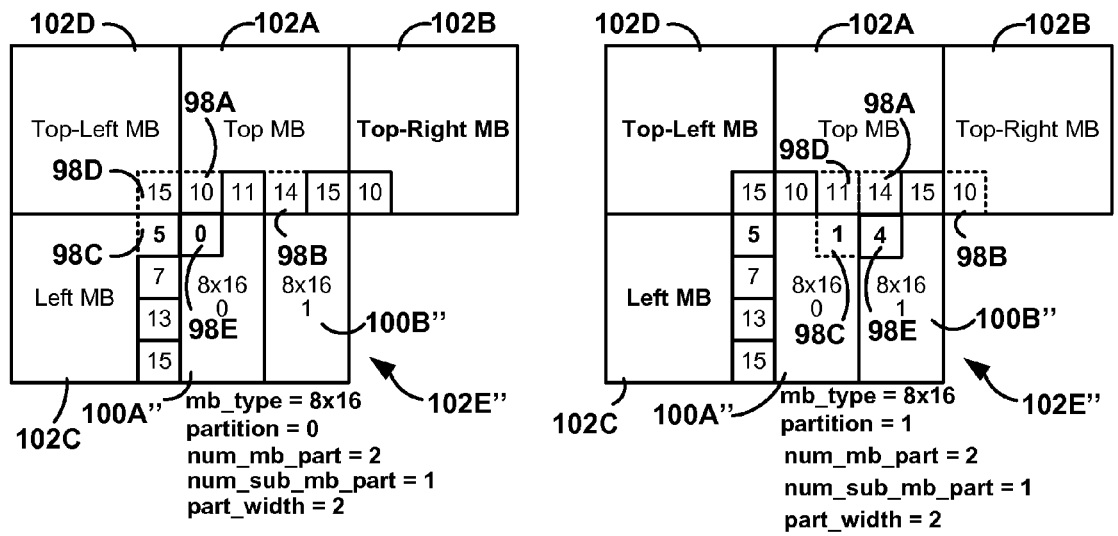

FIG. 6C is a block diagram illustrating those sub-blocks 98A-98D required from respective neighboring MBs 102A-102D to reconstruct an MV for a each of partitions or blocks 100A" and 100B" of current MB 102E". Current MB 102E" may include two 8×16 partitions or blocks 100A" and 100B", similar to MB 90" of FIG. 5. The left portion of FIG. 6C illustrates the geometric relationships between neighboring MBs 102A-102D and partition 100A" of current MB 102E". The right portion of FIG. 6B illustrates the geometric relationships between neighboring MBs 102A-102D and partition or block 100B" of current MB 102E".

Referring to the left side of FIG. 6C, block 100A" includes a starting video unit number or starting block number of zero (0), which this portion of FIG. 6C shows as sub-block 98E. Given the header information for current MB 102E" that specifies a partition width of 2 (or 8) and the starting block number of zero, decoder 26 in general and, MV reconstruction unit 72, in particular, may derive neighboring sub-blocks 98A-98D of respective top, left and top-left neighboring MBs 102A, 102C and 102D. Notably, sub-blocks 98A-98D are assigned numbers or indexes of 10, 14, 5 and 15, respectively.

Referring to the right side of FIG. 6C, block 100B" includes a starting video unit number or starting block number of four (4), which this portion of FIG. 6C shows as sub-block 98E. Given the header information for current MB 102E" that specifies a partition width of 2 (or 8) and the starting block number of four, decoder 26 in general and, MV reconstruction unit 72, in particular, may derive neighboring sub-blocks 98A-98D of respective top neighboring MB 98A, top-right neighboring MB 102B and partition 100A" of current MB 102E". Notably, each of sub-blocks 98A-98D is assigned numbers 14, 10, 1 and 11, respectively.

Figure 6D:
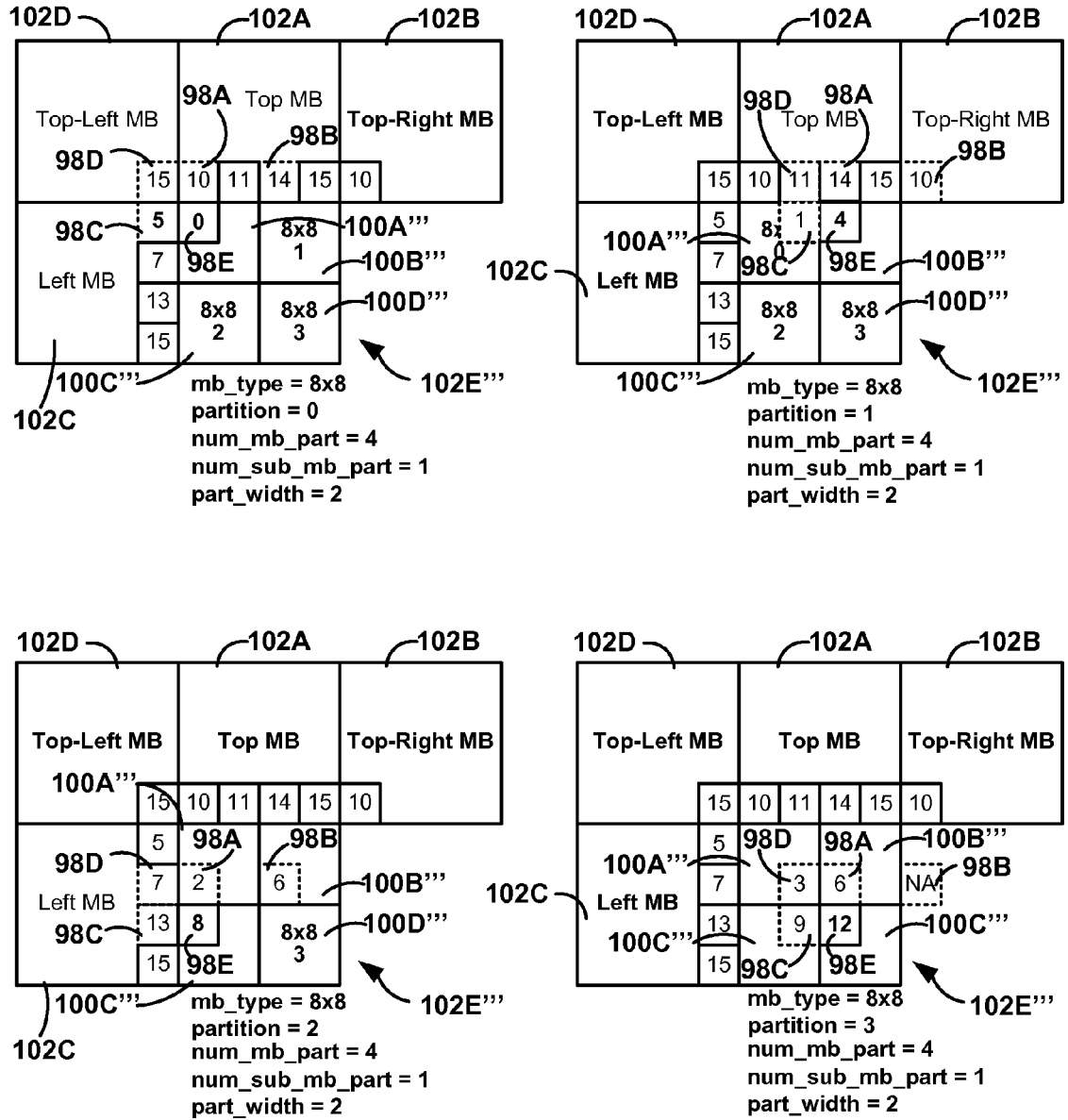

FIG. 6D is a series of block diagrams illustrating those sub-blocks 98A-98D required from respective neighboring MBs 102A-102D to reconstruct an MV for each of a plurality of 8×8 partitions or blocks 100A'''-100D''' of a current MB 102E'''. Current MB 102E''' may include four partitions or blocks 100A'''-100D''', each of which is similar to MB 90''' of FIG. 5. Each of partition or blocks 100A'''-100D''' may also be referred to as sub-blocks, each of which is similar to sub-block 96A of FIG. 5.

The upper-left portion of FIG. 6D illustrates the geometric relationships between neighboring MBs 102A-102D and partition 100A''' of current MB 102E'''. The upper-right portion of FIG. 6D illustrates the geometric relationships between neighboring MBs 102A-102D and partition or block 100B''' of current MB 102E'''. The lower-left portion of FIG. 6D illustrates the geometric between neighboring MBs 102A-102D and partition or block 100C''' of current MB 102E'''. The lower-right portion of FIG. 6D illustrates the geometric relationships between neighboring MBs 102A-102D and partition or block 100D''' of current MB 102E'''.

Referring to the upper-left portion of FIG. 6D, block 100A''' includes a starting video unit number or starting block number of zero (0), which this portion of FIG. 6D shows as sub-block 98E. Given the header information for current MB 102E''' that specifies a partition width of 2 (or 8) and the starting block number of zero, decoder 26 in general and, MV reconstruction unit 72, in particular, may derive neighboring sub-blocks 98A-98D of top, left and top-left neighboring MBs 102A, 102C and 102D, respectively. Notably, sub-blocks 98A-98D are assigned numbers 10, 14, 5 and 15, respectively.

Referring to the upper-right portion of FIG. 6D, block 100B''' includes a starting video unit number or starting block number of four (4), which this portion of FIG. 6D shows as sub-block 98E. Given the header information for current MB 102E''' that specifies a partition width of 2 (or 8) and the starting block number of four, decoder 26 in general and, MV reconstruction unit 72, in particular, may derive neighboring sub-blocks 98A-98D of top neighboring MB 102A, top-right neighboring MB 102B, partition 100A''' of current MB 102E, and top-left neighboring MB 102D. Notably, sub-blocks 98A-98D are assigned numbers 14, 10, 1 and 11, respectively.

Referring to the lower-left portion of FIG. 6D, block 100C''' includes a starting video unit number or starting block number of eight (8), which this portion of FIG. 6D shows as sub-block 98E. Given the header information for current MB 102E''' that specifies a partition width of 2 (or 8) and the starting block number of eight, decoder 26 in general and, MV reconstruction unit 72, in particular, may derive neighboring sub-blocks 98A-98D of partition 100A''' of current MB 102E''', partition 102B''' of current MB 102E''', and left neighboring MB 102C, respectively. Notably, sub-blocks 98A-98D are assigned numbers 2, 6, 13 and 7, respectively.

Referring to the lower-right portion of FIG. 6D, block 100B''' includes a starting video unit number or starting block number of twelve (12), which this portion of FIG. 6D shows as sub-block 98E. Given the header information for current MB 102E''' that specifies a partition width of 2 (or 8) and the starting block number of four, decoder 26 in general and, MV reconstruction unit 72, in particular, may derive neighboring sub-blocks 98A-98D of partition 102B''' of current MB 102E''', a right neighboring MB (which is unavailable), partition 100C''' of current MB 102E''' and partition 100A''' of current MB 102E'''. Notably, sub-blocks 98A-98D are assigned numbers 6, N/A (to reflect the unavailability of the right neighboring MB), 9 and 3, respectively.

FIGS. 6E, 6F each provide a series of block diagrams illustrating those sub-blocks 98A-98D required from respective neighboring MBs 102A-102D to reconstruct an MV for each of a plurality of 8×4 sub-partitions or sub-blocks 104A', 104B' of a current MB 102E'''. Each of the plurality of partitions 100A'''-100D''' of current MB 102E''' may include these two 8×4 sub-partitions 104A', 104B' similar partition 92C''' of FIG. 5 which may include sub-partitions 96A' and 96B'. As described above with respect to FIG. 5, an 8×8 partition may be further subdivided into 2 8×4 partitions. FIGS. 6E and 6F may therefore illustrate resolving geometric relationships between neighboring MBs 102A-102D for 8×4 sub-partitions, e.g., as represented throughout as sub-partitions or sub-blocks 104A' and 104B', of a current MB 102E'''.

The upper-left portion of FIG. 6E illustrates the geometric relationships between neighboring MBs 102A-102D and sub-partition 104A' of partition 100A'''. The upper-right portion of FIG. 6E illustrates the geometric relationships between neighboring MBs 102A-102D and sub-partition or sub-block 100B' of partition 100A'''. The lower-left portion of FIG. 6E illustrates the geometric between neighboring MBs 102A-102D and sub-partition or sub-block 100A' of partition 100B'''. The lower-right portion of FIG. 6E illustrates the geometric relationships between neighboring MBs 102A-102D and sub-partition or sub-block 100B' of partition 100B'''.

Referring to the upper-left portion of FIG. 6E, sub-block 104A' of partition 100A''' includes a starting video unit number or starting block number of zero (0), which this portion of FIG. 6E shows as sub-block 98E. Given the header information for current MB 102E''' that specifies a partition width of 2 (or 8) and the starting block number of zero, decoder 26 in general and, MV reconstruction unit 72, in particular, may derive neighboring sub-blocks 98A-98D of top, left and top-left neighboring MBs 102A, 102C and 102D, respectively. Notably, sub-blocks 98A-98D are assigned numbers 10, 14, 5 and 15, respectively.

Referring to the upper-right portion of FIG. 6E, sub-block 104B' of partition 100A''' includes a starting video unit number or starting block number of two (2), which this portion of FIG. 6E shows as sub-block 98E. Given the header information for current MB 102E''' that specifies a partition width of 2 (or 8) and the starting block number of two, decoder 26 in general and, MV reconstruction unit 72, in particular, may derive neighboring sub-blocks 98A-98D of sub-partition 100A' included within partition 100A''', unavailable partition 100B''', and left neighboring MB 102C. Notably, sub-blocks 98A-98D are assigned numbers 0, N/A, 7 and 5, respectively.

Referring to the lower-left portion of FIG. 6E, sub-block 100A' of partition 100B''' includes a starting video unit number or starting block number of four (4), which this portion of FIG. 6E shows as sub-block 98E. Given the header information for current MB 102E''' that specifies a partition width of 2 (or 8) and the starting block number of four, decoder 26 in general and, MV reconstruction unit 72, in particular, may derive neighboring sub-blocks 98A-98D of top neighboring MB 102A, top-right neighboring MB 102B, partition 100A''' of current MB 102E, and top-left neighboring MB 102D. Notably, sub-blocks 98A-98D are assigned numbers 14, 10, 1 and 11, respectively.

Given the header information for current MB 102E''' that specifies a partition width of 2 (or 8) and the starting block number of eight, decoder 26 in general and, MV reconstruction unit 72, in particular, may derive neighboring sub-blocks 98A-98D of partition 100A''' of current MB 102E''', partition 102B''' of current MB 102E''', and left neighboring MB 102C, respectively. Notably, sub-blocks 98A-98D are assigned numbers 2, 6, 13 and 7, respectively.

Referring to the lower-right portion of FIG. 6E, sub-block 104B' of partition 100B''' includes a starting video unit number or starting block number of six (6), which this portion of FIG. 6E shows as sub-block 98E. Given the header information for current MB 102E''' that specifies a partition width of 2 (or 8) and the starting block number of six, decoder 26 in general and, MV reconstruction unit 72, in particular, may derive neighboring sub-blocks 98A-98D of sub-partition 104A' included within partition 102B''', a right neighboring MB (which is unavailable), and partition 100A''' of current MB 102E'''. Notably, sub-blocks 98A-98D are assigned numbers 4, N/A (to reflect the unavailability of the right neighboring MB), 3 and 1, respectively.

Given the header information for current MB 102E''' that specifies a partition width of 2 (or 8) and the starting block number of four, decoder 26 in general and, MV reconstruction unit 72, in particular, may derive neighboring sub-blocks 98A-98D of partition 102B''' of current MB 102E''', a right neighboring MB (which is unavailable), partition 100C''' of current MB 102E''' and partition 100A''' of current MB 102E'''. Notably, sub-blocks 98A-98D are assigned numbers 6, N/A (to reflect the unavailability of the right neighboring MB), 9 and 3, respectively.

The upper-left portion of FIG. 6F illustrates the geometric relationships between neighboring MBs 102A-102D and sub-partition 104A' of partition 100C'''. The upper-right portion of FIG. 6F illustrates the geometric relationships between neighboring MBs 102A-102D and sub-partition or sub-block 100B' of partition 100C'''. The lower-left portion of FIG. 6F illustrates the geometric between neighboring MBs 102A-102D and sub-partition or sub-block 100A' of partition 100D'''. The lower-right portion of FIG. 6F illustrates the geometric relationships between neighboring MBs 102A-102D and sub-partition or sub-block 100B' of partition 100D'''.

Referring to the upper-left portion of FIG. 6F, sub-block 104A' of partition 100C''' includes a starting video unit number or starting block number of eight (8), which this portion of FIG. 6F shows as sub-block 98E. Given the header information for current MB 102E''' that specifies a partition width of 2 (or 8) and the starting block number of eight, decoder 26 in general and, MV reconstruction unit 72, in particular, may derive neighboring sub-blocks 98A-98D of partition 100A''' of current MB 102E''', partition 102B''' of current MB 102E''', and left neighboring MB 102C, respectively. Notably, sub-blocks 98A-98D are assigned numbers 2, 6, 13 and 7, respectively.

Referring to the upper-right portion of FIG. 6F, sub-block 104B' of partition 100C''' includes a starting video unit number or starting block number of ten (10), which this portion of FIG. 6F shows as sub-block 98E. Given the header information for current MB 102E''' that specifies a partition width of 2 (or 8) and the starting block number of ten, decoder 26 in general and, MV reconstruction unit 72, in particular, may derive neighboring sub-blocks 98A-98D of sub-partition 100A' included within partition 100C''', unavailable partition 100D''', and left neighboring MB 102C. Notably, sub-blocks 98A-98D are assigned numbers 9, N/A, 15 and 13, respectively.

Referring to the lower-left portion of FIG. 6F, sub-block 100A' of partition 100D''' includes a starting video unit number or starting block number of twelve (12), which this portion of FIG. 6F shows as sub-block 98E. Given the header information for current MB 102E''' that specifies a partition width of 2 (or 8) and the starting block number of twelve, decoder 26 in general and, MV reconstruction unit 72, in particular, may derive neighboring sub-blocks 98A-98D of partition 102B''' of current MB 102E''', a right neighboring MB (which is unavailable), partition 100C''' of current MB 102E''' and partition 100A''' of current MB 102E'''. Notably, sub-blocks 98A-98D are assigned numbers 6, N/A (to reflect the unavailability of the right neighboring MB), 9 and 3, respectively.

Referring to the lower-right portion of FIG. 6F, sub-block 104B' of partition 100D''' includes a starting video unit number or starting block number of fourteen (14), which this portion of FIG. 6F shows as sub-block 98E. Given the header information for current MB 102E''' that specifies a partition width of 2 (or 8) and the starting block number of fourteen, decoder 26 in general and, MV reconstruction unit 72, in particular, may derive neighboring sub-blocks 98A-98D of sub-partition 104A' included within partition 102D''', a right neighboring MB (which is unavailable), and partition 100C''' of current MB 102E'''. Notably, sub-blocks 98A-98D are assigned numbers 12, N/A (to reflect the unavailability of the right neighboring MB), 11 and 9, respectively.

The above derivations of neighboring MBs or sub-blocks of neighboring MBs may also be performed by and/or programmed into LUT 80A. The inputs to LUT 80A may, as indicated above, comprise a partition width and a first block index, such as that corresponding to sub-block 98E. For 8 pixel wide sub-blocks, the following Table 2 represents an example of the logic that may be implemented by LUT 80A:

TABLE 2

| partition width | index >> 1 | (mbAddrA, blkA) | (mbAddrB, blkB) | (mbAddrC, blkC) | (mbAddrD, blkD) |
|---|---|---|---|---|---|
| 8 | 0 | (Left MB, 5) | (Top MB, 10) | (Top MB, 14) | (T-L MB, 15) |
| 8 | 1 | (Left MB, 7) | (Curr MB, 0) | NA | (Left MB, 5) |
| 8 | 2 | (Curr MB, 1) | (Top MB, 14) | (T-R MB, 10) | (Top MB, 11) |
| 8 | 3 | (Curr MB, 3) | (Curr MB, 4) | NA | (Curr MB, 1) |
| 8 | 4 | (Left MB, 13) | (Curr MB, 2) | (Curr MB, 6) | (Left MB, 7) |
| 8 | 5 | (Left MB, 15) | (Curr MB, 8) | NA | (Left MB, 13) |
| 8 | 6 | (Curr MB, 9) | (Curr MB, 6) | NA | (Curr MB, 3) |
| 8 | 7 | (Curr MB, 11) | (Curr MB, 12) | NA | (Curr MB, 9) |

The above Table 2, similar to Table 1, includes six columns. The first two columns represent the two inputs, e.g., partition width and starting block number or index, to LUT 80A, while the last four columns represent a shorthand of the index output of LUT 80A. LUT 80A may receive as input a partition width of 2 (or 8) and a starting index of one through seven. Notably, the starting index or block number assigned to sub-block 98E may be shifted to the right by one (1) binary place, as represented by the ">>1" operation in the header of the second column. This is equivalent to a single binary division by 2. Notably, LUT 80A produces, for each 8 pixel wide partition or sub-partition of the current MB, the indices assigned to each of sub-blocks 98A-98D discussed above with respect to FIGS. 6C-6F. Again, as used in this disclosure, "NA" is short for "Not-Available" and may represent a block that is not yet available in buffer 70, e.g., a block that cannot be loaded from frame store 68 because decoder 26 has not yet decoded this block.

FIGS. 6G-6L are a series of block diagrams illustrating geometric relationships among neighboring MBs 102A-102D and a plurality of four pixel wide sub-partitions. FIGS. 6G and 6H are a series of block diagrams illustrating geometric relationships among neighboring MBs 102A-102D and a plurality of 4×8 sub-partitions or sub-blocks 104A" and 104B". These sub-partitions 104A" and 104B" may be similar to sub-partitions 96A" and 96B" of FIG. 5. FIGS. 6I-6L each is a series of block diagrams illustrating geometric relationships among neighboring MBs 102A-102D and a plurality of 4×4 sub-partitions or sub-blocks 104A'" through 104D'". Again, these sub-partitions 104A'" through 104D'" may be similar to sub-partitions 96A'" through 96D'" of FIG. 5.

As described above, the determination of relevant neighboring MBs, block and sub-blocks does not depend on the height of the current MB, block or sub-block. The determination of neighboring MBs, block and sub-blocks only depends on the current partition or sub-partition width. Thus, decoder 26 generally, and MV reconstruction unit 72, in particular, may determine neighboring sub-blocks 98A-98D as shown in FIGS. 6G-6L based, in part, on the partition width of four pixels. The other input, as indicated above, may comprise the starting block number of sub-partition location. In the example of FIGS. 6G and 6H, the starting block number assigned to the starting block of sub-partitions 104A" and 104B" are decimal numbers 0, 1, 4, 5, 8, 9, 12 and 13. In the example of FIGS. 6I-6L, the starting block numbers assigned to the starting blocks of sub-partitions 104A'"-104D'" for each partition of MB 102E'" are decimal numbers 0-15. Based on these two inputs, MV reconstruction unit 72 may determine neighboring sub-blocks 98A-98D as shown in FIGS. 6G-6L.

The above derivations illustrated in FIGS. 6G-6L of neighboring MBs or sub-blocks of neighboring MBs may also be performed by and/or programmed into LUT 80A. The inputs to LUT 80A may, as indicated above, comprise a partition width and a first block index, such as that corresponding to the current one of sub-partitions 104A'"-104D'". For four (4) pixel wide sub-blocks, the following Table 3 represents an example of the logic that may be implemented by LUT 80A:

80A, while the last four columns represent a shorthand of the index output of LUT 80A. LUT 80A may receive as input a partition width of 1 (or 4) and a starting index of one through 16. Notably, the starting index or block number assigned to the current one of sub-blocks 104A'" through 104D.'" is not shifted to the right, as each bit of the index is necessary to resolve the geometrical relationships. LUT 80A outputs, for each 4 pixel wide sub-partition of the current MB, the indexes assigned to each of sub-blocks 98A-98D shown in FIGS. 6G-6L.

As an example, for sub-block 104A" of current block 102E'", as shown in the upper-left portion of FIG. 6G, decoder 26 may determine a starting block or video unit index of 0 and partition width of 4. Using these two inputs as indices into LUT 80A, decoder 26 may identify a left neighboring sub-block 98C as a sub-block having an index of 5 in left MB 102C, a top neighboring sub-block 98A as a sub-block having an index of 10 in top MB 102A, a top-right neighboring sub-block 98B as a sub-block having an index of 11 in top MB 102A, and a top-left neighboring sub-block 98D as a sub-block having an index of 15 in top-left MB 102D.

Figure 6I:
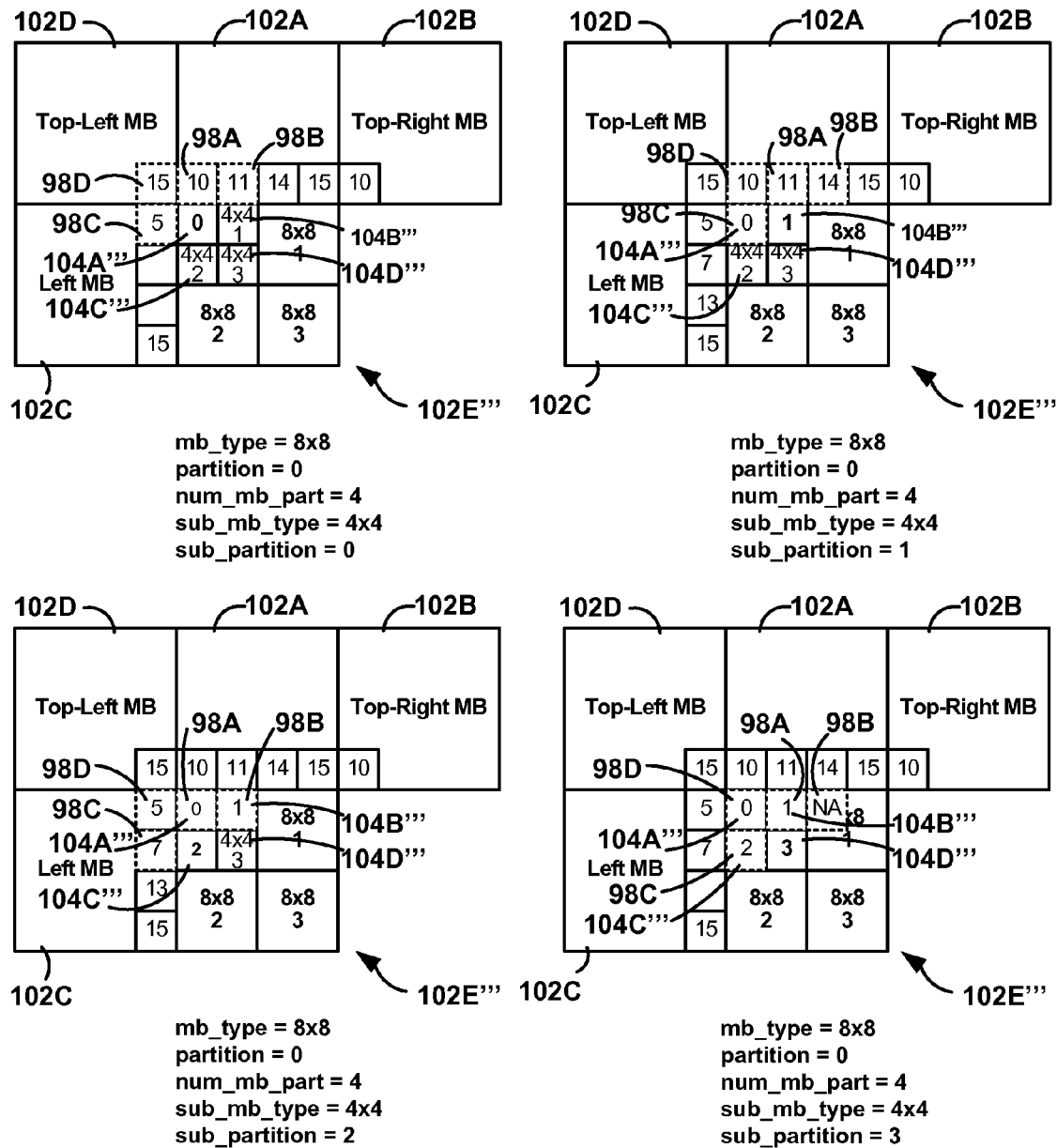

As another example, for sub-block 104C'" of current block 102E'", as shown in the lower-left portion of FIG. 6I, decoder 26 may determine a starting block or video unit index of 2 and a partition width of 4. Using these two inputs as indices into LUT 80A, decoder 26 may identify a left neighboring sub-block 98C as a sub-block having an index of 7 in left MB 102C, a top neighboring sub-block 98A as a sub-block having an index of 0 in current MB 102E'", a top-right neighboring sub-block 98B as a sub-block having an index of 1 in current MB 102E'", and a top-left neighboring sub-block 98D as a sub-block having an index of 5 in left MB 102C. While only two such examples are explicitly described, LUT 80A may employ Table 3 to resolve each of the geometrical relationships among neighboring sub-blocks 98A-98D for a current block having a partition width of 4, such as sub-partitions 104A" and 104B", as well as, 104A'"-104D'", each of which are shown in various aspects in FIGS. 6G-6L.

Figure 7B:
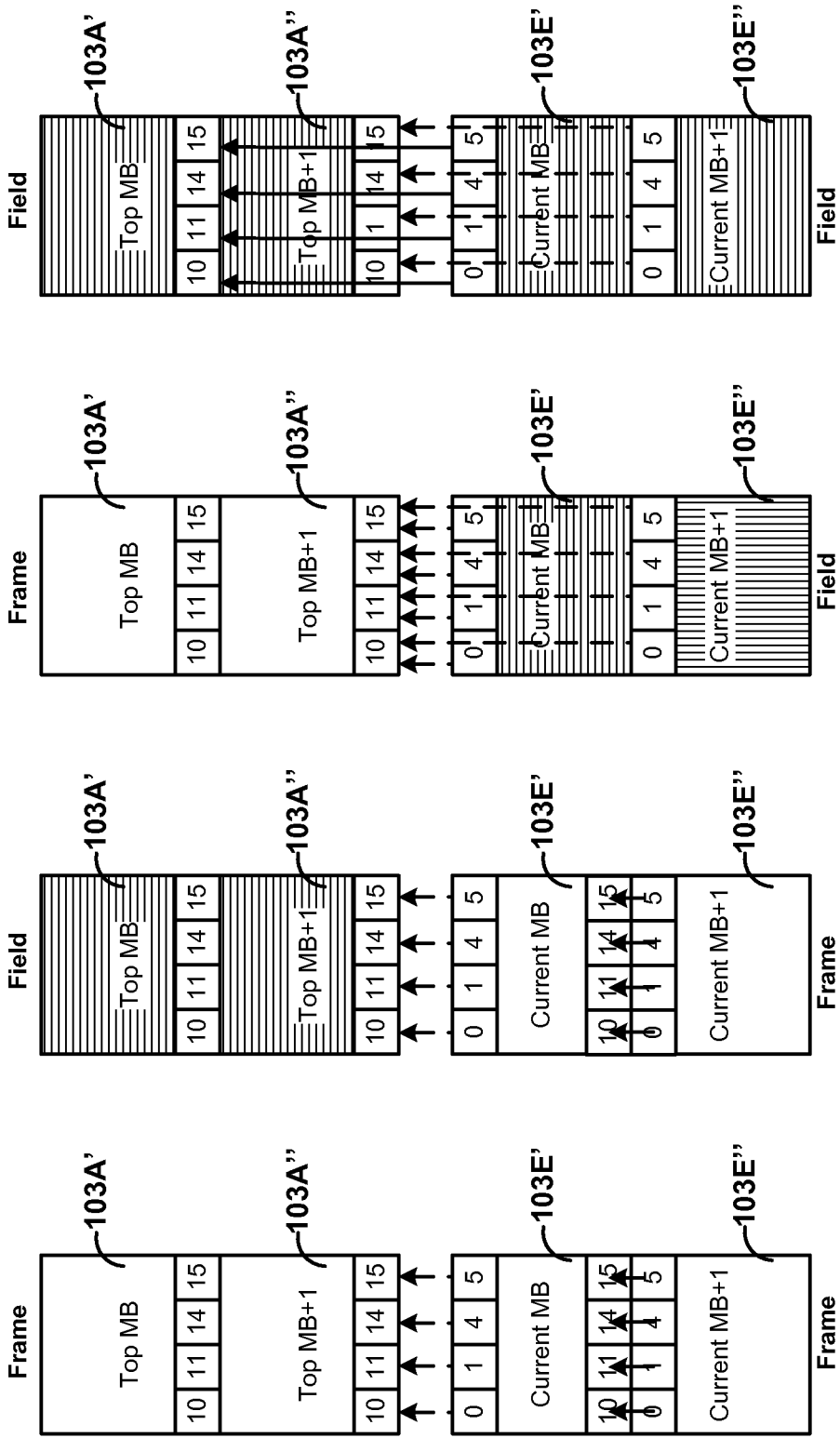

FIGS. 7A-7E are block diagrams each illustrating the geometric relationships between neighboring MBs and a current MB of an MBAFF coded frame. FIG. 7A is a series of block diagrams each illustrating the left geometric relationships between current MB 103E' and current MB+1 103E" and left MB 103C' and left MB+1 103C". MBs 103E' and 103E" may

TABLE 3

| partition width | first block index | (mbAddrA, blkA) | (mbAddrB, blkB) | (mbAddrC, blkC) | (mbAddrD, blkD) |
|---|---|---|---|---|---|
| 4 | 0 | (Left MB, 5) | (Top MB, 10) | (Top MB, 11) | (T-L MB, 15) |
| 4 | 1 | (Curr MB, 0) | (Top MB, 11) | (Top MB, 14) | (Top MB, 10) |
| 4 | 2 | (Left MB, 7) | (Curr MB, 0) | (Curr MB, 1) | (Left MB, 5) |
| 4 | 3 | (Curr MB, 2) | (Curr MB, 1) | NA | (Curr MB, 0) |
| 4 | 4 | (Curr MB, 1) | (Top MB, 14) | (Top MB, 15) | (Top MB, 11) |
| 4 | 5 | (Curr MB, 4) | (Top MB, 15) | (T-R MB, 10) | (Top MB, 14) |
| 4 | 6 | (Curr MB, 3) | (Curr MB, 4) | (Curr MB, 5) | (Curr MB, 1) |
| 4 | 7 | (Curr MB, 6) | (Curr MB, 5) | NA | (Curr MB, 4) |
| 4 | 8 | (Left MB, 13) | (Curr MB, 2) | (Curr MB, 3) | (Left MB, 7) |
| 4 | 9 | (Curr MB, 8) | (Curr MB, 3) | (Curr MB, 6) | (Curr MB, 2) |
| 4 | 10 | (Left MB, 15) | (Curr MB, 8) | (Curr MB, 9) | (Left MB, 13) |
| 4 | 11 | (Curr MB, 10) | (Curr MB, 9) | NA | (Curr MB, 8) |
| 4 | 12 | (Curr MB, 9) | (Curr MB, 6) | (Curr MB, 7) | (Curr MB, 3) |
| 4 | 13 | (Curr MB, 12) | (Curr MB, 7) | NA | (Curr MB, 6) |
| 4 | 14 | (Curr MB, 11) | (Curr MB, 12) | (Curr MB, 13) | (Curr MB, 9) |
| 4 | 15 | (Curr MB, 14) | (Curr MB, 13) | NA | (Curr MB, 12) |

The above Table 3, similar to Tables 1 and 2, includes six columns. The first two columns represent the two inputs, e.g., partition width and starting block number or index, to LUT be similar to MB 87E' and 87E" of FIG. 4B. Likewise, MBs 103C' and 103C" may be similar to MB 87C' and 87C". Moreover, MBs 103E' and 103E" may be referred to as current MB pair 103E and MBs 103C' and 103C" may be referred to as left MB pair 103C.

Each block diagram of FIG. 7A represents four different configurations of frame and field coded current MB pair 103E and left MB pair 103C. When both current MB pair 103E and left MB pair 103C are coded the same, e.g., both frame or field coded as in the top-left bottom-right portions of FIG. 7A, the geometric relationships (as illustrated by the arrows) between these two MB pairs 103E and 103C are relatively straightforward. However, when current MB pair 103E and left MB pair 103C are not coded the same, e.g., one frame and the other field coded as in the top-right and bottom-left portions of FIG. 7A, the geometric relationships (again, as illustrated by the arrows) between these two MB pairs 103E and 103C are not straightforward.

Referring to the top-right portion of FIG. 7A, when the current MB pair 103E is frame coded and the left MB pair 103C is field coded, both current MB 103E' and current MB+1 103E" reference left MB pair 103C'. Referring to the bottom-left portion of FIG. 7A, when the current MB pair 103E is field coded and the left MB pair 103C is frame coded, however, current MB 103E' and current MB+1 103E" refer to both MBs 103C' and 103C".

Similar to LUT 80A above, these derivations of neighboring left MBs or sub-blocks of neighboring left MBs may be performed by and/or programmed into LUT 80B. The inputs to LUT 80B may comprise the starting video unit number or index of the current MB, sub-block or video data unit, information concerning the coding mode, e.g., frame or field coded, of both current MB pair 103E and left MB pair 103C, and whether decoder 26 is currently decoding top MB 103E' of current MB pair 103E or bottom MB 103E" of current MB pair 103E. The following Table 4 represents an example of the logic that may be implemented by LUT 80B:

To reach this result, decoder 26 may determine that left MB is frame coded by accessing the header information of left MB 103C' and inputting a zero (0) or false value for "left MB field?" input of Table 4. Decoder 26 may further determine that current MB 103E' is frame coded also by accessing header information of current MB 103E' and inputting a zero (0) or false value for "current MB field?" input of Table 4. Decoder 26 may also determine that the current MB 103E' is not the bottom of MB pair 103 but the top and input a zero (0) or false value for "bottom MB?" input of Table 4. Decoder 26 may also receive from LUT 80A the index and identify the correct column in Table 4 that corresponds to the index of 0. Based on these inputs, decoder 26 may receive from LUT 80B the "L MB, 5" output. Each of the entries of Table 4 may be similarly derived by decoder 26 in general and MV reconstruction unit 72 in particular by accessing the header information of left MB pair 103C, current MB pair 103E, maintaining the decoding state of current MB pair 103E (as in top or bottom) and the index of the starting or first block of the current block, sub-block or partition, and inputting these variables into LUT 80B.

FIG. 7B is a series of block diagrams each illustrating the top geometric relationships between current MB 103E' and current MB+1 103E" and top MB 103A' and left MB+1 103A". As noted above, MBs 103E' and 103E" may be similar to MB 87E' and 87E" of FIG. 4B. Likewise, MBs 103A' and 103A" may be similar to MB 87A' and 87A". Moreover, MBs 103E' and 103E" may be referred to as current MB pair 103E and MBs 103A' and 103A" may be referred to as top MB pair 103A.

Each block diagram of FIG. 7B represents four different configurations of frame and field coded current MB pair 103E and top MB pair 103A. When both current MB pair 103E and top MB pair 103A are coded the same, e.g., both frame or field

TABLE 4

| Left MB field? | Curr MB field? | Bottom MB? | (mbAddrA, blkA) | | | |
|---|---|---|---|---|---|---|
| | | | first blk idx = 0 | first blk idx = 2 | first blk idx = 8 | first blk idx = 10 |
| 0 | 0 | 0 | (L MB, 5) | (L MB, 7) | (L MB, 13) | (L MB, 15) |
| 0 | 0 | 1 | (L MB + 1, 5) | (L MB + 1, 7) | (L MB + 1, 13) | (L MB + 1, 15) |
| 0 | 1 | 0 | (L MB, 5) | (L MB, 13) | (L MB + 1, 5) | (L MB + 1, 13) |
| 0 | 1 | 1 | (L MB, 5) | (L MB, 13) | (L MB + 1, 5) | (L MB + 1, 13) |
| 1 | 0 | 0 | (L MB, 5) | (L MB, 7) | (L MB, 13) | (L MB, 15) |
| 1 | 0 | 1 | (L MB, 5) | (L MB, 7) | (L MB, 13) | (L MB, 15) |
| 1 | 1 | 0 | (L MB, 5) | (L MB, 7) | (L MB, 13) | (L MB, 15) |
| 1 | 1 | 1 | (L MB + 1, 5) | (L MB + 1, 7) | (L MB + 1, 13) | (L MB + 1, 15) |

Table 4 includes 7 columns, the first three indicating whether the left MB is field coded, the current MB is field coded, and whether decoder 26 is decoding the top or bottom MB of current MB pair 103E. The next four columns indicate the sub-block of one of left neighboring MB 103C' or left neighboring MB+1 103C" constitutes the left neighboring MB for the current MB given an index of 0, 2, 8 or 10. Notably, decoder 26 may only require LUT 80B if the current block or sub-block of current MB pair 103E refers to a neighboring sub-block that resides outside of current MB pair 103E. As a result, LUT 80B may only need to account for those indices 0, 2, 8 and 10 identifying sub-blocks that lie on the edge of current MB pair 103E.

Table 4 mirrors the resolution of geometric relationships illustrated by the arrows in each of the block diagrams of FIG. 7A. The solid arrows reflect geometric relationships for current MB 103E' and the dashed arrows reflect geometric relationships for current MB+1 103E". For purposes of illustration, the top-left portion of FIG. 7A shows that a sub-block identified by an index of 0 in current 103E' has a left neighboring sub-block identified by an index of 5 in left MB 103C'. Table 4 represents this with a shorthand representation of "L MB, 5."

coded as in the two middle block diagrams of FIG. 7A, the geometric relationships (as illustrated by the arrows) between these two MB pairs 103E and 103A are relatively straightforward. However, when current MB pair 103E and top MB pair 103A are not coded the same, e.g., one frame and the other field coded as in the first and last portions of FIG. 7B, the geometric relationships (again, as illustrated by the arrows) between these two MB pairs 103E and 103A are not straightforward.

Similar to LUT 80A above, these derivations of neighboring top MBs or sub-blocks of neighboring top MBs may be performed by and/or programmed into LUT 80B. The inputs to LUT 80B may comprise the starting video unit number or index of the current MB, sub-block or video data unit, information concerning the coding mode, e.g., frame or field coded, of both current MB pair 103E and top MB pair 103A, and whether decoder 26 is currently decoding top MB 103E' of current MB pair 103E or bottom MB 103E" of current MB pair 103E. The following Table 5 represents an example of the logic that may be implemented by LUT 80B:

TABLE 5

| Top MB field? | Curr MB field? | Bottom MB? | (mbAddrB, blkB) | | | |
|---|---|---|---|---|---|---|
| | | | first blk idx = 0 | first blk idx = 1 | first blk idx = 4 | first blk idx = 5 |
| 0 | 0 | 0 | (T MB + 1, 10) | (T MB + 1, 11) | (T MB + 1, 14) | (T MB + 1, 15) |
| 0 | 0 | 1 | (CT MB + 1, 10) | (CT MB + 1, 10) | (CT MB + 1, 10) | (CT MB + 1, 10) |
| 0 | 1 | 0 | (T MB + 1, 10) | (T MB + 1, 11) | (T MB + 1, 14) | (T MB + 1, 15) |
| 0 | 1 | 1 | (T MB + 1, 10) | (T MB + 1, 11) | (T MB + 1, 14) | (T MB + 1, 15) |
| 1 | 0 | 0 | (T MB + 1, 10) | (T MB + 1, 11) | (T MB + 1, 14) | (T MB + 1, 15) |
| 1 | 0 | 1 | (CT MB + 1, 10) | (CT MB + 1, 10) | (CT MB + 1, 10) | (CT MB + 1, 10) |
| 1 | 1 | 0 | (T MB, 10) | (T MB, 11) | (T MB, 14) | (T MB, 15) |
| 1 | 1 | 1 | (T MB + 1, 10) | (T MB + 1, 11) | (T MB + 1, 14) | (T MB + 1, 15) |

Table 5 is similar to Table 4 except that Table 5 takes as an input different index numbers and field information concerning top MB pair 103A. Otherwise, Table 5 outputs the neighboring sub-blocks identified in FIG. 7B, much the same as Table 4. Again, decoder 26 may only require LUT 80B if the current block or sub-block of current MB pair 103E refers to a neighboring sub-block that resides outside of current MB pair 103E. As a result, LUT 80B may only need to account for those indices 0, 1, 4 and 5 identifying sub-blocks that lie on the edge of current MB pair 103E. Table 5 mirrors the resolution of geometric relationships illustrated by the arrows in each of the block diagrams of FIG. 7B. The solid arrows reflect geometric relationships for current MB 103E' and the dashed arrows reflect geometric relationships for current MB+1 103E".

Figure 7C:
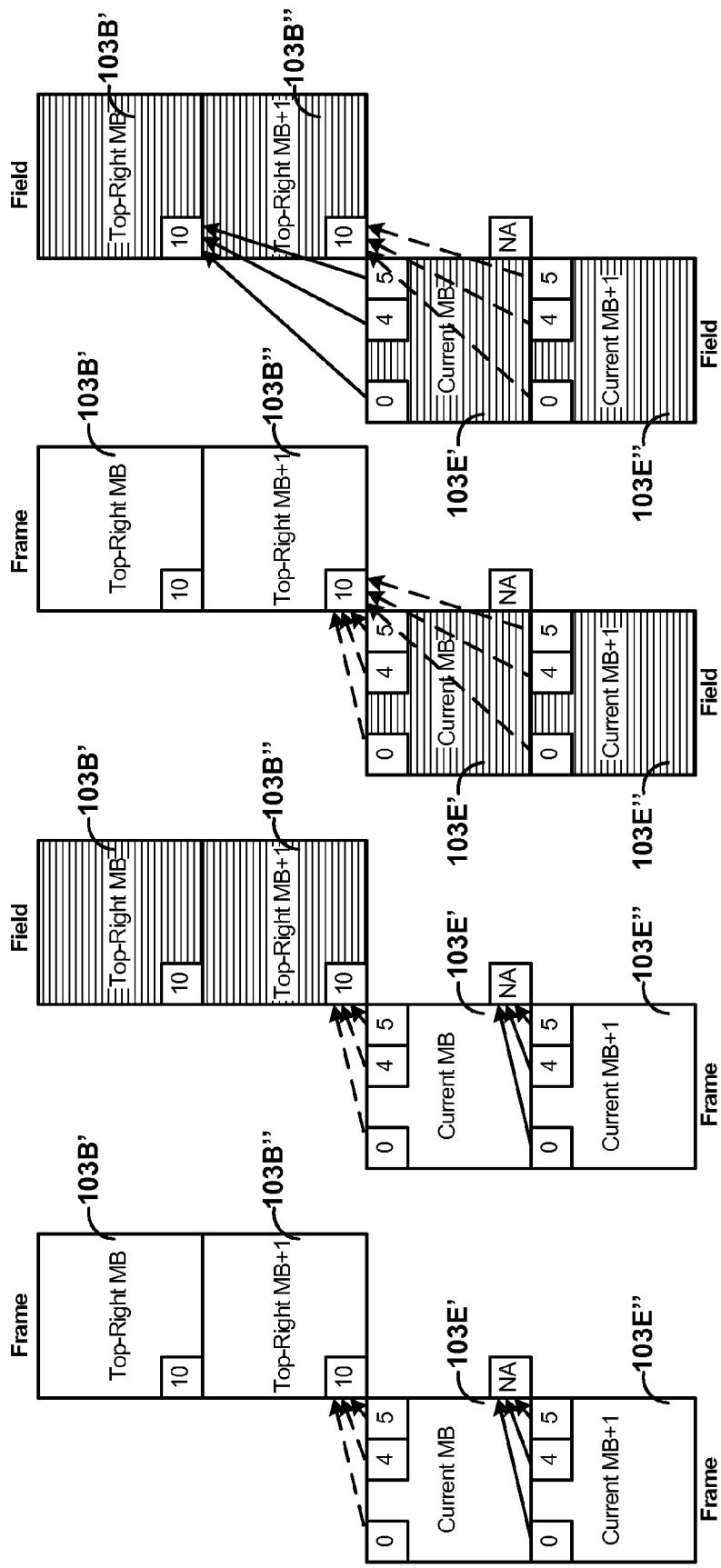

FIG. 7C is a series of block diagrams each illustrating the top-right geometric relationships between current MB 103E' and current MB+1 10E" and top-right MB 103B' and top-right MB+1 103B". As noted above, MBs 103E' and 103E" may be similar to MB 87E' and 87E" of FIG. 4B. Likewise, MBs 103A' and 103A" may be similar to MB 87A' and 87A". Moreover, MBs 103E' and 103E" may be referred to as current MB pair 103E and MBs 103B' and 103B" may be referred to as top-right MB pair 103B.

The derivation of neighboring MBs and/or neighboring sub-blocks of neighboring MBs may be illustrated, as described above, by the arrows. Again, LUT 80B may implement logic to identify these neighboring MBs based on the starting video unit number or index of the current MB, sub-block or video data unit, information concerning the coding mode, e.g., frame or field coded, of both current MB pair 103E and top-right MB pair 103B, and whether decoder 26 is currently decoding top MB 103E' of current MB pair 103E or bottom MB 103E" of current MB pair 103E. The following Table 6 represents an example of the logic that may be implemented by LUT 80B:

the neighboring sub-blocks identified in FIG. 7C, much the same as Tables 4 and 5. Again, decoder 26 may only require LUT 80B if the current block or sub-block of current MB pair 103E refers to a neighboring sub-block that resides outside of current MB pair 103E. As a result, LUT 80B may only need to account for those indexes 0, 1, 4 and 5 identifying sub-blocks that lie on the edge of current MB pair 103E. Table 6 mirrors the resolution of geometric relationships illustrated by the arrows in each of the block diagrams of FIG. 7C. The solid arrows reflect geometric relationships for current MB 103E' and the dashed arrows reflect geometric relationships for current MB+1 103E".

Figure 7D:
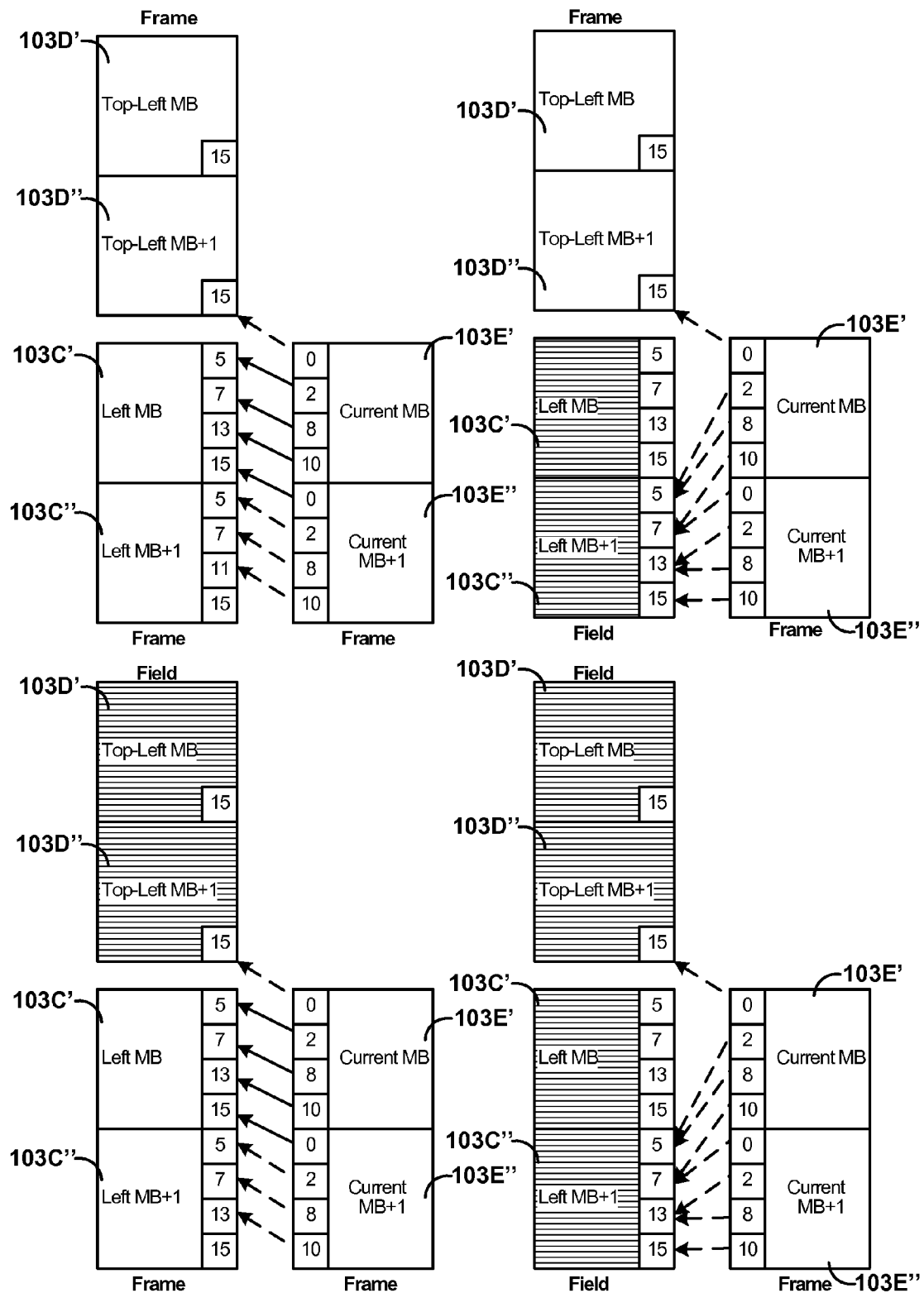
Figure 7E:
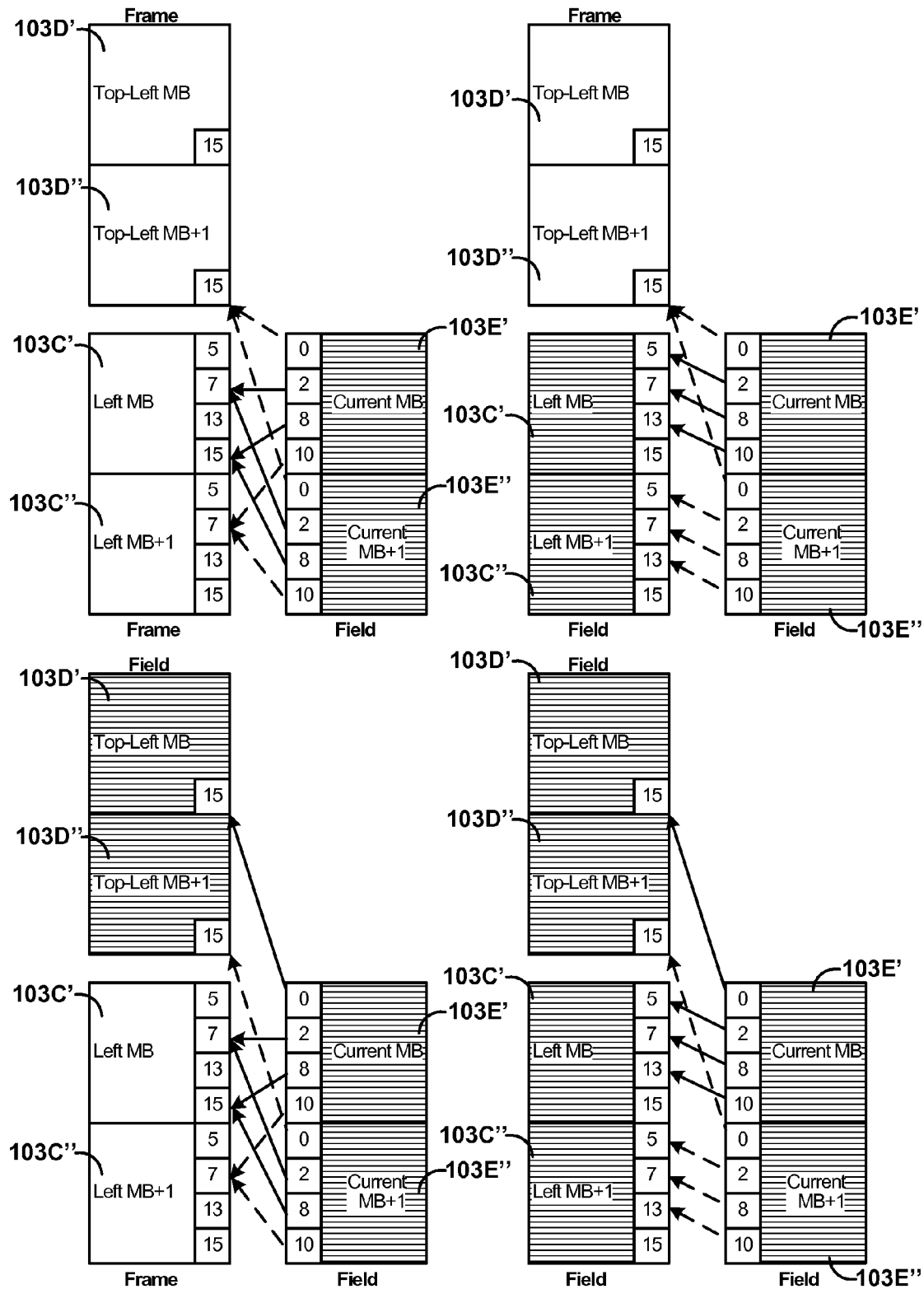

FIGS. 7D and 7E are a series of block diagrams each illustrating the top-left geometric relationship between current MB pair 103E, left MB pair 103C, top-left MB 103D' and top-left MB+1 103D". MBs 103D' and 103D" may be similar to MB 87D' and 87D" and may be referred to as top-left MB pair 103D.

The derivation of neighboring MBs and/or neighboring sub-blocks of neighboring MBs may be illustrated, as described above, by the arrows. Again, LUT 80B may implement logic to identify these top-left neighboring MBs based on the starting video unit number or index of the current MB, sub-block or video data unit, information concerning the coding mode, e.g., frame or field coded, of current MB pair 103E, left MB pair 103C and top-left MB pair 103D, and whether decoder 26 is currently decoding top MB 103E' of current MB pair 103E or bottom MB 103E" of current MB pair 103E. As the top-left geometric relationship in the MBAFF coding mode may reference both the left and top-left MB pairs 103C and 103D, respectively, decoder 26 may require the additional input which further complicates the

TABLE 6

| Top right MB field? | Curr MB field? | Bottom MB? | (mbAddrC, blkC) | | | |
|---|---|---|---|---|---|---|
| | | | first blk idx = 0 | first blk idx = 1 | first blk idx = 4 | first blk idx = 5 |
| 0 | 0 | 0 | (TR MB + 1, 10) | NA | (TR MB + 1, 10) | (TR MB + 1, 10) |
| 0 | 0 | 1 | NA | NA | NA | NA |
| 0 | 1 | 0 | (TR MB + 1, 10) | NA | (TR MB + 1, 10) | (TR MB + 1, 10) |
| 0 | 1 | 1 | (TR MB + 1, 10) | NA | (TR MB + 1, 10) | (TR MB + 1, 10) |
| 1 | 0 | 0 | (TR MB + 1, 10) | NA | (TR MB + 1, 10) | (TR MB + 1, 10) |
| 1 | 0 | 1 | NA | NA | NA | NA |
| 1 | 1 | 0 | (TR MB, 10) | NA | (TR MB, 10) | (TR MB, 10) |
| 1 | 1 | 1 | (TR MB + 1, 10) | NA | (TR MB + 1, 10) | (TR MB + 1, 10) |

Table 6 is similar to Tables 4 and 5 except that Table 6 takes as an input different index numbers and field information concerning top-right MB pair 103B. Otherwise, Table 6 outputs logic required to resolve the top-left neighboring MB. The following Table 7 represents an example of the logic that may be implemented by LUT 80B:

TABLE 7

| Left MB field? | Top left MB field? | Curr MB field? | Bottom MB? | (mbAddrD, blkD) | | | |
|---|---|---|---|---|---|---|---|
| | | | | first blk idx = 0 | first blk idx = 2 | first blk idx = 8 | first blk idx = 10 |
| 0 | 0 | 0 | 0 | (TL MB, 15) | (L MB, 5) | (L MB, 7) | (L MB, 13) |
| 0 | 0 | 0 | 1 | (L MB, 15) | (L MB + 1, 5) | (L MB + 1, 7) | (L MB + 1, 13) |
| 0 | 0 | 1 | 0 | (TL MB + 1, 15) | (L MB, 7) | (L MB, 15) | (L MB + 1, 7) |
| 0 | 0 | 1 | 1 | (TL MB + 1, 15) | (L MB, 7) | (L MB, 15) | (L MB + 1, 7) |
| 0 | 1 | 0 | 0 | (TL MB, 15) | (L MB, 5) | (L MB, 7) | (L MB, 13) |
| 0 | 1 | 0 | 1 | (L MB, 15) | (L MB + 1, 5) | (L MB + 1, 7) | (L MB + 1, 13) |
| 0 | 1 | 1 | 0 | (TL MB, 15) | (L MB, 7) | (L MB, 15) | (L MB + 1, 7) |
| 0 | 1 | 1 | 1 | (TL MB + 1, 15) | (L MB, 7) | (L MB, 15) | (L MB + 1, 7) |
| 1 | 0 | 0 | 0 | (TL MB + 1, 15) | (L MB + 1, 5) | (L MB + 1, 5) | (L MB + 1, 7) |
| 1 | 0 | 0 | 1 | (L MB + 1, 7) | (L MB + 1, 13) | (L MB + 1, 13) | (L MB + 1, 15) |
| 1 | 0 | 1 | 0 | (TL MB + 1, 15) | (L MB, 5) | (L MB, 7) | (L MB, 13) |
| 1 | 0 | 1 | 1 | (TL MB + 1, 15) | (L MB + 1, 5) | (L MB + 1, 7) | (L MB + 1, 13) |
| 1 | 1 | 0 | 0 | (TL MB + 1, 15) | (L MB + 1, 5) | (L MB + 1, 5) | (L MB + 1, 7) |
| 1 | 1 | 0 | 1 | (L MB + 1, 7) | (L MB + 1, 13) | (L MB + 1, 13) | (L MB + 1, 15) |
| 1 | 1 | 1 | 0 | (TL MB, 15) | (L MB, 5) | (L MB, 7) | (L MB, 13) |
| 1 | 1 | 1 | 1 | (TL MB + 1, 15) | (L MB + 1, 5) | (L MB + 1, 7) | (L MB + 1, 13) |

Table 7 reflects this additional input by adding another column that indicates the output given the "left MB field" even though Table 7 is directed to resolving the top-left neighboring MB or sub-block. As a result, in this example, Table 7 is twice the size of preceding Tables 4-6, as a result of the additional input/column. Despite this difference, Table 7 is much like Tables 4-6 and outputs the neighboring sub-blocks identified in FIGS. 7D and 7E, much the same as Tables 4-6. Again, decoder 26 may only require LUT 80B if the current block or sub-block of current MB pair 103E refers to a neighboring sub-block that resides outside of current MB pair 103E. As a result, LUT 80B may only need to account for those indexes 0, 2, 8 and 10 identifying sub-blocks that lie on the edge of current MB pair 103E. Table 7 mirrors the resolution of geometric relationships illustrated by the arrows in each of the block diagrams of FIGS. 7D and 7E. The solid arrows reflect geometric relationships for current MB 103E' and the dashed arrows reflect geometric relationships for current MB+1 103E".

Figure 8:
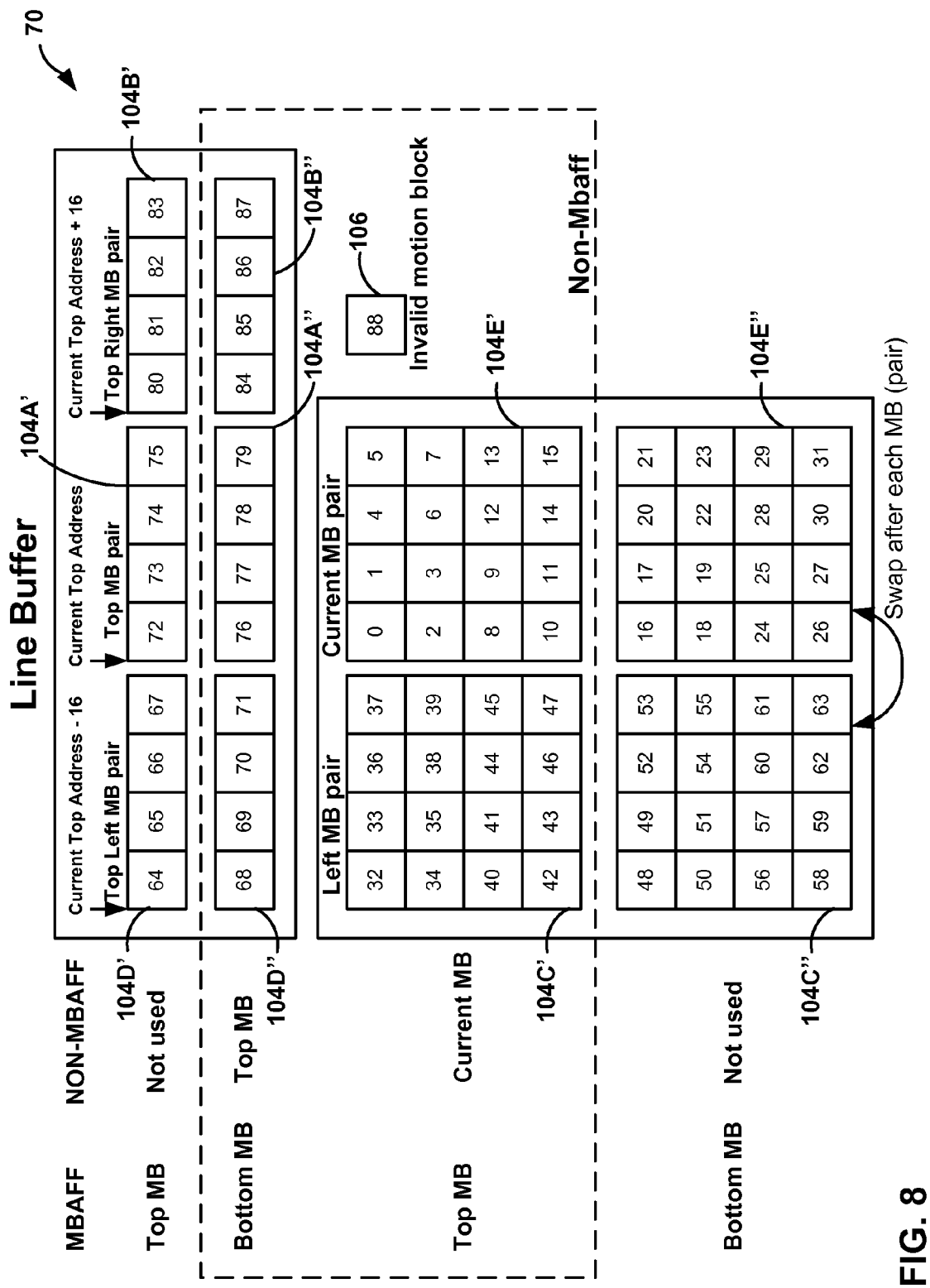
FIG. 8 is a block diagram illustrating a portion of the buffer of FIG. 3 in more detail.

FIG. 8 is a block diagram illustrating a portion of buffer 70 of FIG. 3 in more detail. Buffer 70 may comprise a hardware buffer, a software buffer, or any combination thereof. Typically, buffer 70 is implemented as a hardware buffer in a dynamic memory, such as a Random Access Memory (RAM). Buffer 70 may be referred to as a "line buffer" in that buffer 70 stores one or more lines of video data. As a line of video data may comprise substantially more information than that depicted in FIG. 8, only a portion of buffer 70 is illustrated. As such, the portion of buffer 70 shown in FIG. 8 may be referred to as a "window" or "sliding window" in that the portion currently being decoded slides the window along by 16 pixel or standard MB width increments. While shown in FIG. 8 as a line buffer, buffer 70 may comprise any hardware and/or software capable of storing a plurality of MBs.

In the example of FIG. 8, buffer 70 includes a top MB storage block 104A' and a top MB+1 storage block 104A" (or "top MB storage block pair 104A"), a top-right MB storage block 104B' and a top-right MB+1 storage block 104B" (or "top-right MB storage block pair 104B"), a left MB storage block 104C' and a left MB+1 storage block 104C" (or "left MB storage block pair 104C"), a top-left MB storage block 104D' and a top-left MB+1 storage block 104D" (or "top-left MB storage block pair 104D"), and a current MB storage block 104E' and a current MB+1 storage block 104E" (or "current MB storage block pair 104E"). Buffer 70, therefore, includes enough space to store pairs 104A-104E on the assumption that each frame will always be an MBAFF frame. If the frame comprises an MBAFF frame, all of storage block pairs 104A-104E may be used. However, if the frame comprises a non-MBAFF frame, only storage blocks 104A", 104B", 104C', 104D" and 104E' will be used. Buffer 70 also includes an invalid motion block 106, which buffer 70 may use to indicate that one of storage blocks or storage block pairs 104A-104E is invalid.

As described above, only the bottom row of 4×4 pixel blocks for each of top, top-right and top-left MB pairs are required to reconstruct MVs or otherwise perform the operations described above. Each 4×4 pixel block may store an MV, such as in those instances where a MV is copied to each 4×4 block or where the MB is partitioned into 16 4×4 blocks. Alternatively, each 4×4 block may not store a MV, but MV reconstruction unit 72 may employ MV location unit 78 to locate the MV for the given 4×4 block in order to reconstruct the MV for the current block in the manner described above. As a result, top MB storage block pair 104A, top-right MB storage block pair 104B and top-left MB storage block pair 104C may include storage for only the bottom four 4×4 pixels these MB pairs. MV reconstruction unit 72 may access frame store 68 and retrieve the information necessary to populate storage block pairs 104A-104E, including MV data and information stored to a respective block header (such as intra prediction modes). After loading these values into MB storage block pairs 104A-104E, geometric resolution unit 74, availability determination unit 76 and MV location unit 78 may access buffer 70 to perform the techniques of the disclosure as described in more detail below.

In operation, current MB storage block pair 104E and left MB storage block pair 104C may operate as so-called "ping-pong" buffers. That is, current MB storage block pair 104E may become left MB storage block pair 104C once decoding of a current MB stored to current MB storage block pair 104E is complete. Left MB storage block pair 104C in this scenario may then be used to store information for the next or current MB. For example, in some cases, one buffer ("ping") may be subject to a write operation while the other buffer ("pong") is subject to a read operation, and vice versa.

To facilitate the various aspects of the techniques, buffer 70 may be indexed in a manner that enables the above described four stages to quickly and efficiently determine neighboring MBs and MVs stored for those neighboring MBs. As the example of FIG. 8, each 4×4 sub-block of current MB storage block pair 104E is indexed from 0-15 and 16-31. Each 4×4 sub-block of left MB storage block pair is indexed from 32-47 and 48-63. Each 4×4 sub-block of top-left MB pair 104D is indexed from 64-67 and 68-71. Each 4×4 sub-block of top MB pair 104A is indexed from 72-75 and 76-79. Each 4×4 sub-block of top-right MB pair 104B is indexed from 80-83 and 84-87. Invalid motion block 106 is also indexed as 88.

The portion of buffer 70 depicted in FIG. 8 only shows the blocks for list 0. That is, given, for purposes of illustration, the context of H.264, list 0 and list 1 generally refer to a prediction direction. List 0 or L0 typically refers to forward prediction or prediction from the previous frame in time. List 1 or L1 usually refers to backward prediction or prediction from a future frame in time. Predictive or "P" frames or pictures are typically encoded with reference to at least one temporally prior frame, and therefore may be decoded with reference only to L0. Bidirectional or "B" frames or pictures are encoded with reference to at least one temporally future frame and, in some cases, B frames may be encoded with reference to at least one temporally future frame and at least one temporally prior frame. As a result, B frames may be decoded with reference to both L0 and L1. Usually, MV reconstruction utilizes L0 and L1 independently, as both L0 and L1 typically refer to different frames and prediction unit 62 may include one buffer structure for L0 and another for L1. However, the operation for MV reconstruction, with respect to each buffer is substantially similar, and consequently, for ease of illustration, buffer 70 is described in this disclosure relative to only list 0. To access blocks in list 1, however, MV reconstruction unit 72 may add 128 (or toggle bit-7 of the index input) to the indices shown for current MB storage block pair 104E and left MB storage block pair 104C. These blocks of list 1 may be stored immediately after those for list 0, but buffer 70 may not require additional indices to represent these blocks. Instead, MV reconstruction unit 72 may add 8 to the logical index.

While shown as a particular indexing scheme in FIG. 8, any of a variety of different indexing schemes may be employed. However, changing the indexing scheme may affect the following discussion concerning the construction of LUTs 80A-80C. That is, the indexing scheme employed by buffer 70 correlates with the indices output by LUTs 80A-80C. The techniques therefore are described below relative to the indexing scheme shown in FIG. 8 for ease of illustration, but the techniques may employ any indexing scheme.

Figure 9:
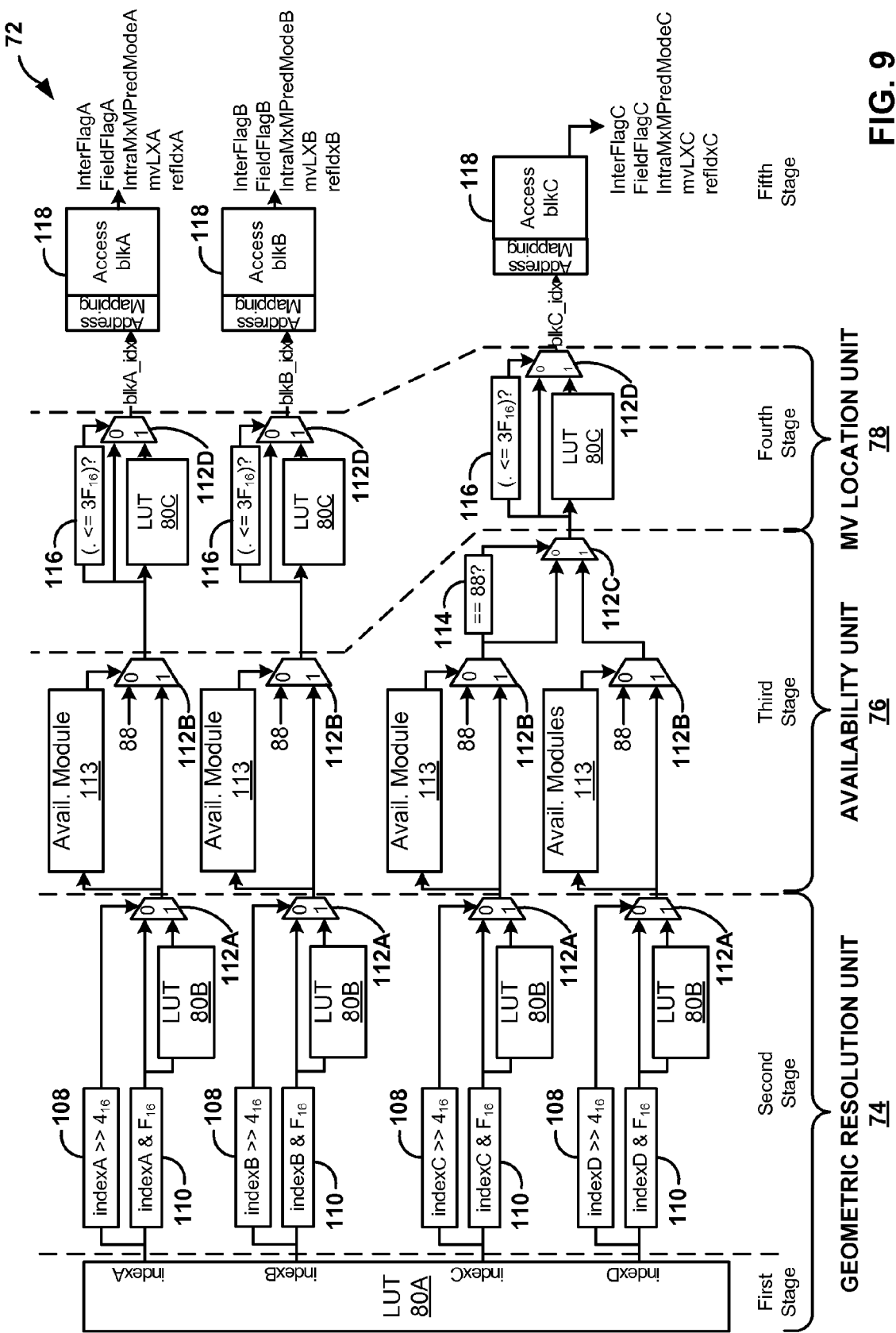
FIG. 9 is a functional block diagram illustrating an exemplary pipeline implementation of the motion vector (MV) reconstruction unit of FIG. 2.

FIG. 9 is a functional block diagram illustrating an exemplary pipeline implementation of MV reconstruction unit 72 of FIG. 2. As shown in the example of FIG. 9, MV reconstruction unit 72 comprises five stages. The first two stages represent geometric relationship unit 74, the third stage represents availability determination unit 76, and the fourth stage represents MV location unit 78. In this embodiment, MV reconstruction unit 72 further comprises a fifth stage that may map the index into addresses.

Generally, in stage one, geometric resolution unit 74 determines the blocks on the left, top, top-right, and top-left, assuming that the current frame is a non-MBAFF frame. In stage two, geometric resolution unit 74 determines neighboring blocks across the MB boundaries in the left, top, top-right and top-left directions. Geometric resolution unit 74 only employs or triggers stage two if a block across MB boundaries is required. In stage three, availability determination unit 76 checks or determines if the neighboring blocks identified in the first two stages are available. Also, availability determination unit 76 may replace the top-right block with the top-left block, if the MB that contains the top-right block is determined by the second stage to be unavailable.

In the fourth stage, MV location unit 78 determines a location of an actual MV for each of the neighboring blocks. MV location unit 78 may perform this operation because encoder 20 may not populate the MVs to the entire MB. For example, if the current MB is an inter__16×16 MB, only on MV will be reconstructed and stored to block 0 of MB storage block 104E' (as shown in buffer 70 of FIG. 8). If MV reconstruction unit 72 needs to access block 5 in this same MB storage block 104E', MV reconstruction unit 72 may include MV location unit 78 to maintain a mapping to find where the actual MV is located. In this example, MV location unit 78 may map the location to block 0. LUT 80C provides this mapping.

The pipeline implementation may comprise a plurality of hardware components. In the example of FIG. 9, geometric resolution unit 74 comprises a plurality of shifting modules 108, a plurality of "AND" modules 110, a plurality of multiplexers 112A, and above described LUTs 80A and 80B. Availability determination unit 76 comprises a plurality of multiplexers 112B, a multiplexer 112C, a comparator module 114 and a plurality of availability modules 113. Availability modules 113 may each maintain an instance of the above described availability counter, e.g., counter 82 of FIG. 3. MV location unit 78 includes a plurality of multiplexers 112D, a plurality of comparator modules 116 and above described LUT 80C. The fifth stage may comprise address mapping and access modules 118. Although shown in FIG. 9 as a plurality of LUTs 80B and a plurality of LUTs 80C, each of LUTS 80B and 80C may be implemented as a single LUT similar to that of LUT 80A.

Shifting modules 108 may each represent hardware, and/or software that shifts a value, e.g., indexA, indexB, indexC, or indexD, in the direction indicated by the double greater than sign (">>") or to the right by the number presented to the right of the ">," which in this case is by four. In effect, each of the indices output by LUT 80A, e.g., indexA, indexB, indexC, and indexD, are shifted to the right by 4 bits, effectively performing an integer division by 16. As each of indexA, indexB, indexC, and indexD comprise five bits, the division determines whether the most significant bit of each of these indices is a one. This most significant bit is fed into each of multiplexers 112A and is used to determine whether to select the output from AND modules 110 or the output from LUT 80B. This most significant bit may therefore represent whether the neighboring block referenced by each of indices A-D reside across MB boundaries from the current MB.

AND modules 110 each perform a bit-wise "AND" ("&") between each of indexA, indexB, indexC, and indexD and $F_{16}$ or $1111_2$. In effect, AND modules 110 pass through the lowest four bits of each of indexA, indexB, indexC, and indexD to each of multiplexers 112A, respectively. Both of LUTs 80B and multiplexers 112A receive the output of AND modules 110, where LUTs 80B adjust for the MBAFF encodings, but, again, only if the neighboring MB is across a MB boundary. The output from multiplexers 112A may be either the respective one of the outputs of AND modules 110 or the respective output of LUT 80B.

Availability module 113 and multiplexers 112B may then receive the output from multiplexers 112A, respectively. For indexA and indexB, depending on the output of availability module 113, multiplexer 112B outputs either the index of "88" (which may index invalid motion block 106 of buffer 70) or the output of multiplexers 112A. For indexC and indexD, availability determination unit 76 performs an additional step. According to the H.264/MPEG-4 AVC standard, if the top-right block (e.g., indexC) is not available, the top-left block (e.g., indexD) is used. Thus, comparator module 114 compares the output of multiplexer 112B to "88" or any other suitable unavailability index. If comparator module 114 outputs a true (one or 1) value multiplexer 112C selects the output from multiplexer 112B for indexD. If comparator module 114 outputs a false (zero or 0) value, multiplexer 112C selects the output from multiplexer 112B for indexC. In this way, comparator module 114 and multiplexer 112C select between indexC and indexD in accordance with the H.264/MPEG-4 AVC standard.

Both of comparator modules 116 and LUTs 80C receive the output of multiplexers 112B for indexA and indexB and the output of multiplexer 112C for indexC or indexD. Comparator modules 116 each compare the output of the respective multiplexers 112B, 112C (as represented by the period or "." in FIG. 9) to the hexadecimal value of 3F or $3F_{16}$ (which is 0011 $1111_2$ or $63_{10}$) to determine whether the output is less than or equal to $3F_{16}$. If the output is less than or equal to $3F_{16}$, multiplexers 112D each output the output from LUT 80C, respectively; otherwise multiplexers 112D output the output from multiplexers 112B, 112C, respectively.

Notably, $63_{10}$ is the index of the last sub-block of left MB storage block pair 104C and $63_{10}$ may represent any index that identifies the last sub-block of a fully stored MB. A fully stored MB constitutes a MB storage block that stores all 16×16 pixels of the MB or 16 4×4 pixel sub-blocks. This comparison is necessary to determine whether the MV is located within the current window, as represented by the portion of buffer 70 shown in FIG. 8, or stored within another window. That is, if the index exceeds $63_{10}$, in this example, the MV may be located in a portion of top, top-right, or top-left MB storage block pairs 104A, 104B, 104D not currently stored to the window of buffer 70 shown in FIG. 8.

Address mapping and access modules 118 respectively receive the output of multiplexers 112D, which map indicesA-C to an address within buffer 70. Address mapping and access modules 118 may further output a number of flags and other variables. For example, address mapping and access module 118 for indexA may output an InterFlagA, a FieldFlagA, an IntraMXMPredModeA, an mvLXA variable, and arefIdxA variable. MV reconstruction unit 72 may use this output to reconstruct the MV for the current MB or sub-block of the current MB in the manner described above.

Figure 10A:
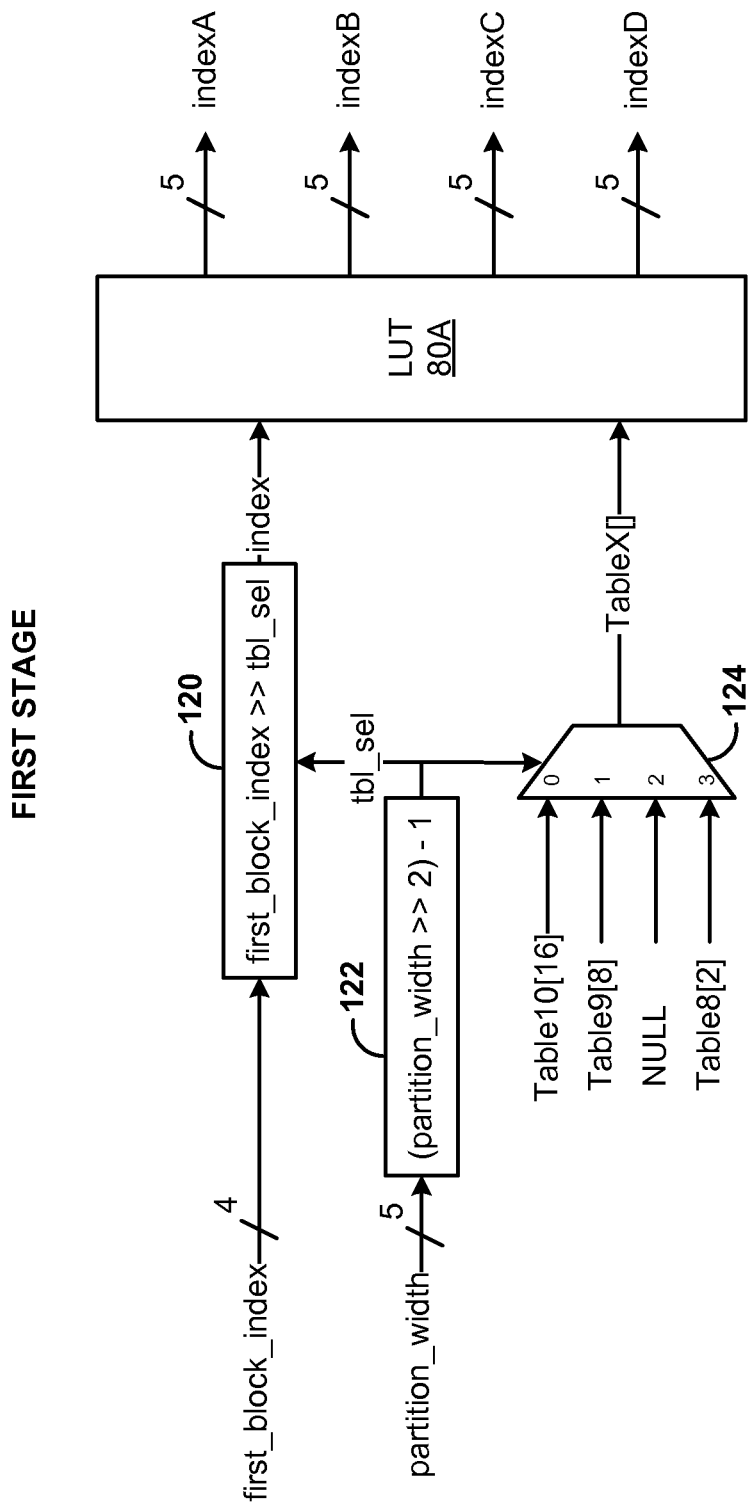
FIGS. 10A-10D are block diagrams illustrating various portions of the first through fourth stages of FIG. 9 in more detail.

FIGS. 10A-10D are block diagrams illustrating various portions of the first through fourth stages of FIG. 9 in more detail. FIG. 10A is a block diagram of the first stage of FIG. 9 in more detail. The first stage includes LUT 80A. The first stage receives as input a 4 bit "first_block_index" value and a 5 bit "partition_width" value. The first_block_index value may comprise the above described starting block index or starting video unit number, e.g., starting block 98E of one or more of FIGS. 6A-6L. The partition_width value may also comprise the above described partition width that may be parsed from the current MB header.

Geometric resolution unit 74, which may implement the first stage, may further comprise a shifter module 120, a complex shifter module 122, and a multiplexer 124. Shifter module 120 may represent any combination of hardware and/or software capable of shifting an input value, e.g., first_block_index value, by a variable number of bits, e.g., a "tbl_sel" value. Complex shifter module 122 may represent any combination of hardware and/or software capable of shifting an input value two bit places and then subtract one from the result of the shift. Multiplexer 124 may represent any combination of hardware and/or software capable of selecting between a plurality of candidate values, e.g., Table 10[16], Table 9[8], NULL, and Table 7[2], based on a selector value, e.g., the "tbl_sel" value.

Upon receiving both the starting block number or the "first_block_index" value and the partition width or the "partition_width" value, the 5-bit partition_width is shifted by two to the right, as represented by the ">>" followed by the "2" in complex shifter module 122, with the result of the shift subtracted by "1." Thus, if the partition_width value is a $16_{10}$ or $10000_2$, complex shifter module 122 shifts this to the right by 2 bits positions to generate $00100_2$ and subtracts this value by 1 to output $00011_2$. Likewise, complex shifter module 122 outputs a $1_{10}$ or $00001_2$ if the partition_width value is an $8_{10}$ or $01000_2$ and a $0_{10}$ or $00000_2$ if the partition_width value is a $4_{10}$ or $00100_2$. The output of complex shifter module 122 is referred to as the table select or "tbl_sel" value because this tbl_sel value may used by multiplexer 124 to select between Table 10[16], Table 9[8] and Table 8[2] candidate values.

Each of Tables 8-10 corresponds to a different partition width value and by way of complex shifter module 122 and multiplexer 124, LUT 80A may receive and load the correct one of Tables 8-10. LUT 80A receives the one of these table as variable "TableX[ ]" value, which may represent any of Tables 8-10. As a result, LUT 80A may need only comprise enough memory to store the largest table, which in this exemplary instance, may comprise Table 10[16].

In parallel to outputting the variable "TableX[ ]" value, shifter module 120 may receive the first_block_index value and shift this value to the right by the number of bit positions indicated by the "tbl_sel" value. Shifter module 120, in effect, divides the first_block_index value by half the partition_width value (or mathematically represented as [first index_index/(partition_width/2)]). Stated another way, shifter module 120 divides first_block_index by $2^{tbl\_sel}$ (or mathematically represented as [first_index_value/$2^{tbl\_sel}$]) Shifter module 120 may output the result of this shift as an "index" value, which LUT 80A receives and uses as a key to access the variable TableX[ ].

Table 8[2], Table 9[8] and Table 10[16] may each represent a modified version of the above Tables 1-3, respectively. Tables 8-10 may be modified to account for the indexing scheme of buffer 70 shown in FIG. 8 and to account for pipeline specific implementation details. Tables 1-3 therefore represent general tables to determine those neighboring MBs assuming a non-MBAFF frame, while the following Tables 8-10 represent implementation specific tables.

TABLE 8

| index | (flag, index) = indexA | (flag, index) = indexB | (flag, index) = indexC | (flag, index) = indexD |
|---|---|---|---|---|
| 0 | (1, 0) = 16 | (1, 4) = 20 | (1, 12) = 28 | (1, 8) = 24 |
| 1 | (1, 2) = 18 | (0, 2) = 2 | (1, 10) = 26 | (1, 10) = 26 |

Table 8[2] has two entries as indicated by the "[2]," and represents a table, much like Table 1, for resolving geometric relationships between neighboring blocks given a current block having a partition_width value of $16_{10}$. LUT 80A loads Table 8 and as the lower four bits of the first_block_index value can range between $0_{10}$ and $15_{10}$, the resultant index value output by shifter module 120 is either a zero or a one. LUT 80A then uses the index value as a key into Table 8 and outputs the last four columns, respectively, as outputs indexA, indexB, indexC and indexD. Notably, the outputs for each of indexA, indexB, indexC and indexD are shown in Table 8 as decimal values. Each of these values may comprise 5-bits, with the most significant bit representing a flag value and the last four bits representing the actual index. The flag indicates whether geometric resolution unit 74 should invoke LUT 80B or, better stated, whether one or more of neighboring blocks reside outside of the current block or within a block different from the current block. Both Tables 9,10 are similar to Table 8 but for Table 9 corresponds to a partition_width value of $8_{10}$ and Table 10 corresponds to a partition_width value of $4_{10}$.

TABLE 9

| index | (flag, index) = indexA | (flag, index) = indexB | (flag, index) = indexC | (flag, index) = indexD |
|---|---|---|---|---|
| 0 | (1, 0) = 16 | (1, 4) = 20 | (1, 6) = 22 | (1, 8) = 24 |
| 1 | (1, 1) = 17 | (0, 0) = 0 | (1, 9) = 25 | (1, 9) = 25 |
| 2 | (0, 1) = 1 | (1, 6) = 22 | (1, 12) = 28 | (1, 5) = 21 |
| 3 | (0, 3) = 3 | (0, 4) = 4 | (0, 1) = 1 | (0, 1) = 1 |
| 4 | (1, 2) = 18 | (0, 2) = 2 | (0, 6) = 6 | (1, 10) = 26 |
| 5 | (1, 3) = 19 | (0, 8) = 8 | (1, 11) = 27 | (1, 11) = 27 |
| 6 | (0, 9) = 9 | (0, 6) = 6 | (0, 3) = 3 | (0, 3) = 3 |
| 7 | (0, 11) = 11 | (0, 12) = 12 | (0, 9) = 9 | (0, 9) = 9 |

TABLE 10

| index | (flag, index) = indexA | (flag, index) = indexB | (flag, index) = indexC | (flag, index) = indexD |
|---|---|---|---|---|
| 0 | (1, 0) = 16 | (1, 4) = 20 | (1, 5) = 21 | (1, 8) = 24 |
| 1 | (0, 0) = 0 | (1, 5) = 21 | (1, 6) = 22 | (1, 4) = 23 |
| 2 | (1, 1) = 17 | (0, 0) = 0 | (0, 1) = 1 | (1, 9) = 25 |
| 3 | (0, 2) = 2 | (0, 1) = 1 | (0, 0) = 0 | (0, 0) = 0 |
| 4 | (0, 1) = 1 | (1, 6) = 22 | (1, 7) = 23 | (1, 5) = 21 |
| 5 | (0, 4) = 4 | (1, 7) = 23 | (1, 12) = 28 | (1, 6) = 22 |
| 6 | (0, 3) = 3 | (0, 4) = 4 | (0, 5) = 5 | (0, 1) = 1 |
| 7 | (0, 6) = 6 | (0, 5) = 5 | (0, 4) = 4 | (0, 4) = 4 |
| 8 | (1, 2) = 18 | (0, 2) = 2 | (0, 3) = 3 | (1, 10) = 26 |
| 9 | (0, 8) = 8 | (0, 3) = 3 | (0, 6) = 6 | (0, 2) = 2 |
| 10 | (1, 3) = 19 | (0, 8) = 8 | (0, 9) = 9 | (1, 11) = 27 |
| 11 | (0, 10) = 10 | (0, 9) = 9 | (0, 8) = 8 | (0, 8) = 8 |
| 12 | (0, 9) = 9 | (0, 6) = 6 | (0, 7) = 7 | (0, 3) = 3 |
| 13 | (0, 12) = 12 | (0, 7) = 7 | (0, 6) = 6 | (0, 6) = 6 |
| 14 | (0, 11) = 11 | (0, 12) = 12 | (0, 13) = 13 | (0, 9) = 9 |
| 15 | (0, 14) = 14 | (0, 13) = 13 | (0, 12) = 12 | (0, 12) = 12 |

Figure 10B:
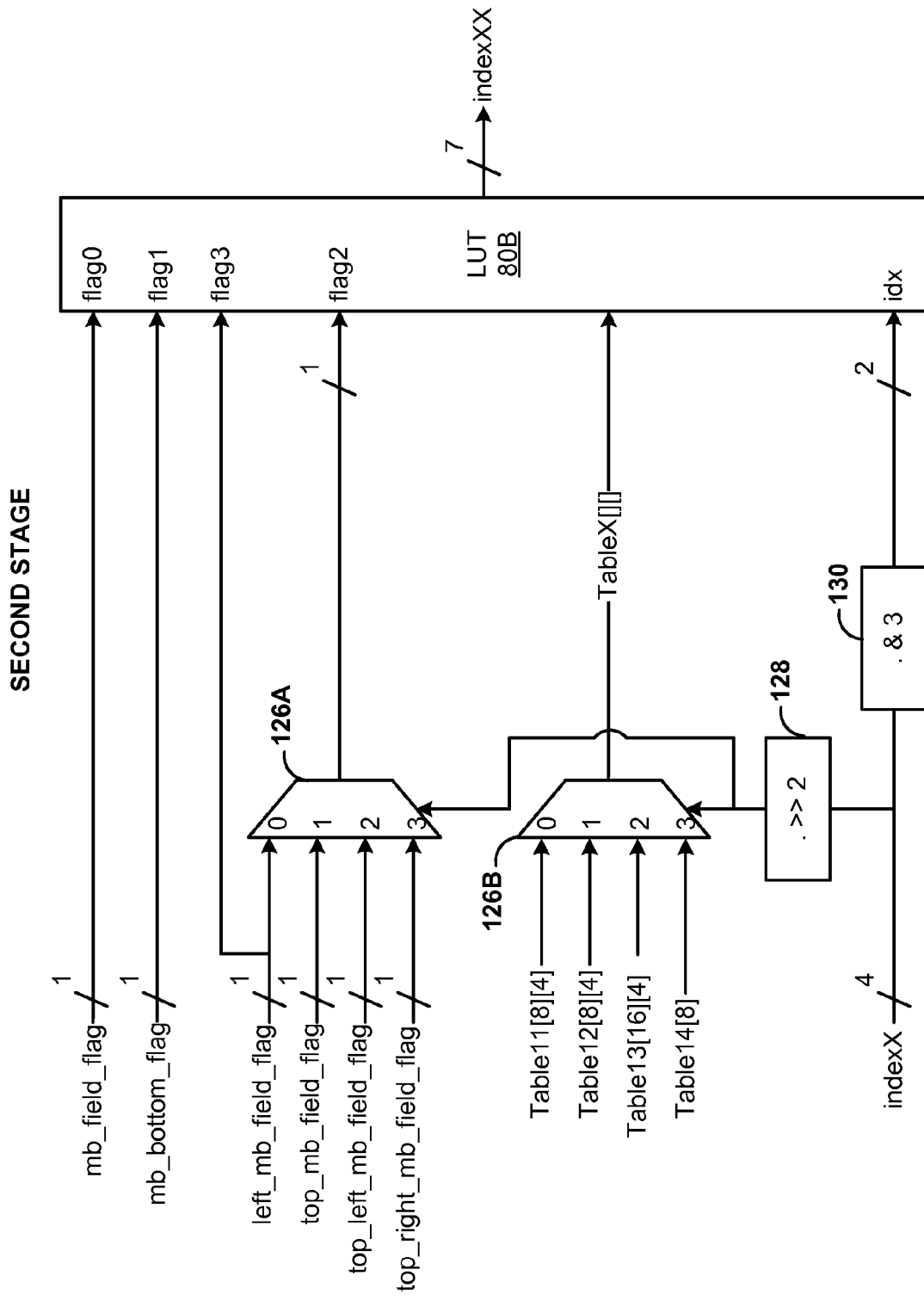

FIG. 10B is a block diagram of a portion of the second stage of FIG. 9 in more detail. The portion depicted by FIG. 10B is an example of the logic surrounding each instance of LUT 80B as shown in FIG. 9. In this example, the second stage receives as input a 1-bit "mb_field_flag" value, a 1-bit "mb_bottom_flag" value, a 1-bit "left_mb_field_flag" value, a 1-bit "top mb_field flag" value, a 1-bit "top_left_mb_field_flag" value, and a 1-bit "top right mb_field flag" value. Each of these values may be determined by accessing the associated MB header information or header information for each sub-block, such as the 4×4 sub-block.

For example, the mb_field flag value may be determined by accessing the header information for the current block and this value indicates whether the current block is field or frame coded. The mb_bottom_flag may indicate whether the current block is the bottom block of a field encoded MB pair and, again, this may be determined by accessing the header information for the current block pair. Each of the left_mb_field_flag, top_mb_field_flag, top_left_mb_field_flag and top right mb_field flag values may be determined similarly by accessing the respective header information for the identified neighboring MB or sub-block (e.g., the sub-block referenced by the associated one of indices A-D output by LUT 80A).

Again, geometric resolution unit 74 may implement the second stage and may further receive as inputs Table 11[8][4], Table 12[8][4], Table 13[16][4], Table 14[8], and a 4-bit indexX value. The indexX value may represent any one of indicesA-D output by LUT 80A and adjusted by AND module 110, as shown in FIG. 9.

Geometric resolution unit 74 may further include multiplexers 126A, 126B, shifter module 128 and "AND" module 130. While shown as separate from LUT 80B, this additional logic, hardware, and/or software may be implemented within or considered a part of LUT 80B such that LUT 80B may include these additional modules. Multiplexer 126A represents a hardware and/or software module that selects between candidate values, e.g., the left_mb_field_flag, top mb_field flag, top_left mb_field flag and top right_mb_field_flag values, based on an input value, e.g., the output from shifter module 128. Likewise, multiplexer 126B represents a hardware and/or software module that selects between candidate values, e.g., Table 11[8][4], Table 12[8][4], Table 13[16][4], and Table 14[8], based on an input value, e.g., the output from shifter module 128.

Upon receiving the above described inputs, the 4-bit indexX value is shifted by shifter module 128 by 2, as represented by ">>" followed by a "2." Referring to Table 8 above and assuming indexX equal to indexB value $(1, 4)=20_{10}$, with the flag or most significant fifth bit set to 1 indicating that geometric resolution unit 74 invokes LUT 80B and the lower four bits equal to $4_{10}$ or 0100, shifter module 128 outputs a value of $1_{10}$ or $0001_2$. Both of multiplexers 126A and 126B receive this value as the input value and select and output the top mb_field flag value and Table 12[8][4] as Table X[ ][ ], respectively. AND module 130 further performs an AND operation on this indexX and would output, assuming the above indexB, a 2-bit "idx" value of $00_2$ (or the result of $0100_2$ & $0011_2$).

As above, multiplexer 126B enables LUT 80B to only require enough storage space to store the largest one of Tables 11-14, which in this instance comprises Table 13[16][4]. LUT 80B therefore receives the appropriate one of Tables 11-14, an adjusted indexX as the idx value and a plurality of flag values, e.g., the mb_field_flag value as "flag0," mb_bottom flag value as "flag1," one of left_/top_/top_left/top right mb_field flag values as "flag2," and the left_mb_field flag value as "flag3." Using this inputs, LUT 80B may output a 7-bit indexXX, where indexXX represents an adjusted indexX, which as described above may represent any one of indicesA-D. In other words, LUT 80B outputs an adjusted one of indices A-D, where the adjustment accounts for MBAFF encoded frames, in accordance with one of Tables 11-14.

Table 11[8][4], Table 12[8][4], Table 13[16][4] and Table 14[8] may each represent a modified version of the above Table 4, Table 5, Table 7, and Table 6, respectively. Tables 11-14 may be modified to account for the indexing scheme of buffer 70 shown in FIG. 8 and to account for pipeline specific implementation details. Tables 4-7 therefore represent general tables to determine those neighboring blocks assuming a non-MBAFF frame, while the following Tables 11-14 represent implementation specific tables.

TABLE 11

| | | | idx | | | |
|---|---|---|---|---|---|---|
| flag_2 | flag_1 | flag_0 | 0 | 1 | 2 | 3 |
| 0 | 0 | 0 | 37 | 39 | 45 | 47 |
| 0 | 0 | 1 | 53 | 55 | 61 | 63 |
| 0 | 1 | 0 | 37 | 45 | 53 | 61 |
| 0 | 1 | 1 | 37 | 45 | 53 | 61 |
| 1 | 0 | 0 | 37 | 37 | 39 | 39 |
| 1 | 0 | 1 | 45 | 45 | 47 | 47 |
| 1 | 1 | 0 | 37 | 39 | 45 | 47 |
| 1 | 1 | 1 | 53 | 55 | 61 | 63 |

Table 11[8][4] has 32 entries or 8 times 4 entries as indicated by the "[8][4]," and represents a table, much like Table 4, for resolving geometric relationships for MBAFF encoded frames. LUT 80B loads Table 8 and as the four bits of the indexX value can range between $0_{10}$ and $15_{10}$, the resultant idx value output by AND module 130 is either a zero, a one, a two or a three. LUT 80B then uses the idx value as an index into Table 11 and outputs one of the values referenced by the appropriate combination of flag0, flag1, flag2 and idx as the indexXX value. Notably, the outputs are shown in Table 11 as decimal values. Each of these indexXX values may comprise 7-bits.

Table 12 is substantially similar to Table 11, but may comprise the following entries to resolve geometric relationships for a different neighboring MB, e.g., top neighboring MB:

TABLE 12

| flag_2 | flag_1 | flag_0 | idx | | | |
|---|---|---|---|---|---|---|
| | | | 0 | 1 | 2 | 3 |
| 0 | 0 | 0 | 76 | 77 | 78 | 79 |
| 0 | 0 | 1 | 10 | 11 | 14 | 15 |
| 0 | 1 | 0 | 76 | 77 | 78 | 79 |
| 0 | 1 | 1 | 76 | 77 | 78 | 79 |
| 1 | 0 | 0 | 76 | 77 | 78 | 79 |
| 1 | 0 | 1 | 10 | 11 | 14 | 15 |
| 1 | 1 | 0 | 72 | 73 | 74 | 75 |
| 1 | 1 | 1 | 76 | 77 | 78 | 79 |

As an example, assuming the above indexX is a $4_{10}$ or $0100_2$, idx value as output by AND module 130 equals $00_2$, as described above. Shifter modules 128 outputs a value of $01_2$ to select Table 12 and flag2 as the "top_mb_field_flag" value. It is further assumed for purposes of illustration, in addition to the above assumption, that the top_mb_field_flag value is a one, thereby indicating that the top neighboring MB is field encoded, the mb_field flag value is a 0, thereby indicating that the current MB is frame encoded, and the mb_bottom_flag value is a zero. Given that flag2 is a one (1), flag1 is a zero (0), flag0 is a zero (0), and idx is a (0), LUT 80B outputs a value of $76_{10}$ for indexXX.

To verify this result, refer to the second block diagram from the left of FIG. 7B, which shows the top MB 103A pair as field coded and the current MB pair 103E as frame coded. Referring further to the top-right sub-block of current MB 103E', FIG. 7B illustrates that sub-block 0 of current MB 103E' references sub-block 10 of top MB+1 103A". To resolve the index for the position, refer to the index scheme of buffer 70 as shown in FIG. 8. Top MB storage block 104A" includes a sub-block in the identical location as that of sub-block 10 of top MB+1 103A" that is indexed by an index value of $76_{10}$. In this manner, LUT 80B may adjust indices received from LUT 80A, but, again, only if the neighboring block resides outside of the current block.

The following Table 13 is loaded into LUT 80B to find the top-left block when the flag in the first stage LUT or LUT 80A is a 1. As resolving the top-left neighboring block may require both the left neighboring block and the top-left neighboring block, an additional flag3 is passed into LUT 80B that has the value of the left_mb_field flag value. Otherwise, the following Table 13 is similar to that of the preceding Tables 11, 12 in terms of determining indexXX:

TABLE 13

| flag_3 | flag_2 | flag_1 | flag_0 | idx | | | |
|---|---|---|---|---|---|---|---|
| | | | | 0 | 1 | 2 | 3 |
| 0 | 0 | 0 | 0 | 71 | 37 | 39 | 45 |
| 0 | 0 | 0 | 1 | 47 | 53 | 55 | 61 |
| 0 | 0 | 1 | 0 | 71 | 39 | 47 | 55 |
| 0 | 0 | 1 | 1 | 71 | 39 | 47 | 55 |
| 0 | 1 | 0 | 0 | 71 | 37 | 39 | 45 |
| 0 | 1 | 0 | 1 | 47 | 53 | 55 | 61 |
| 0 | 1 | 1 | 0 | 67 | 39 | 47 | 55 |
| 0 | 1 | 1 | 1 | 71 | 39 | 47 | 55 |
| 1 | 0 | 0 | 0 | 71 | 53 | 53 | 55 |
| 1 | 0 | 0 | 1 | 55 | 61 | 61 | 63 |
| 1 | 0 | 1 | 0 | 71 | 37 | 39 | 45 |
| 1 | 0 | 1 | 1 | 71 | 53 | 55 | 61 |
| 1 | 1 | 0 | 0 | 71 | 53 | 53 | 55 |
| 1 | 1 | 0 | 1 | 55 | 61 | 61 | 63 |
| 1 | 1 | 1 | 0 | 67 | 37 | 39 | 45 |
| 1 | 1 | 1 | 1 | 71 | 53 | 55 | 61 |

The following Table 14 is used to find the top-right block when the flag in the first stage LUT or LUT 80B is a 1:

| flag_2 | flag_1 | flag_0 | idx 0 |
|---|---|---|---|
| 0 | 0 | 0 | 84 |
| 0 | 0 | 1 | 88 |
| 0 | 1 | 0 | 84 |
| 0 | 1 | 1 | 84 |
| 1 | 0 | 0 | 84 |
| 1 | 0 | 1 | 88 |
| 1 | 1 | 0 | 80 |
| 1 | 1 | 1 | 84 |

To understand Table 14, refer to the block diagrams of FIG. 7C. Notably, in each block diagram of FIG. 7C, regardless of the current block of current MB 103E', for example, the top-right neighboring block is always sub-block 10, which is indexed in buffer 70 of FIG. 8 by index value 84. As a result, if the least significant bit of idx is a zero, such as would occur for a starting sub-block indexed by $0_{10}$, $4_{10}$ and $5_{10}$, LUT 80B outputs a value of 84. Otherwise, the value is a block within the current block and/or unavailable and no adjustment is necessary.

Figure 10C:
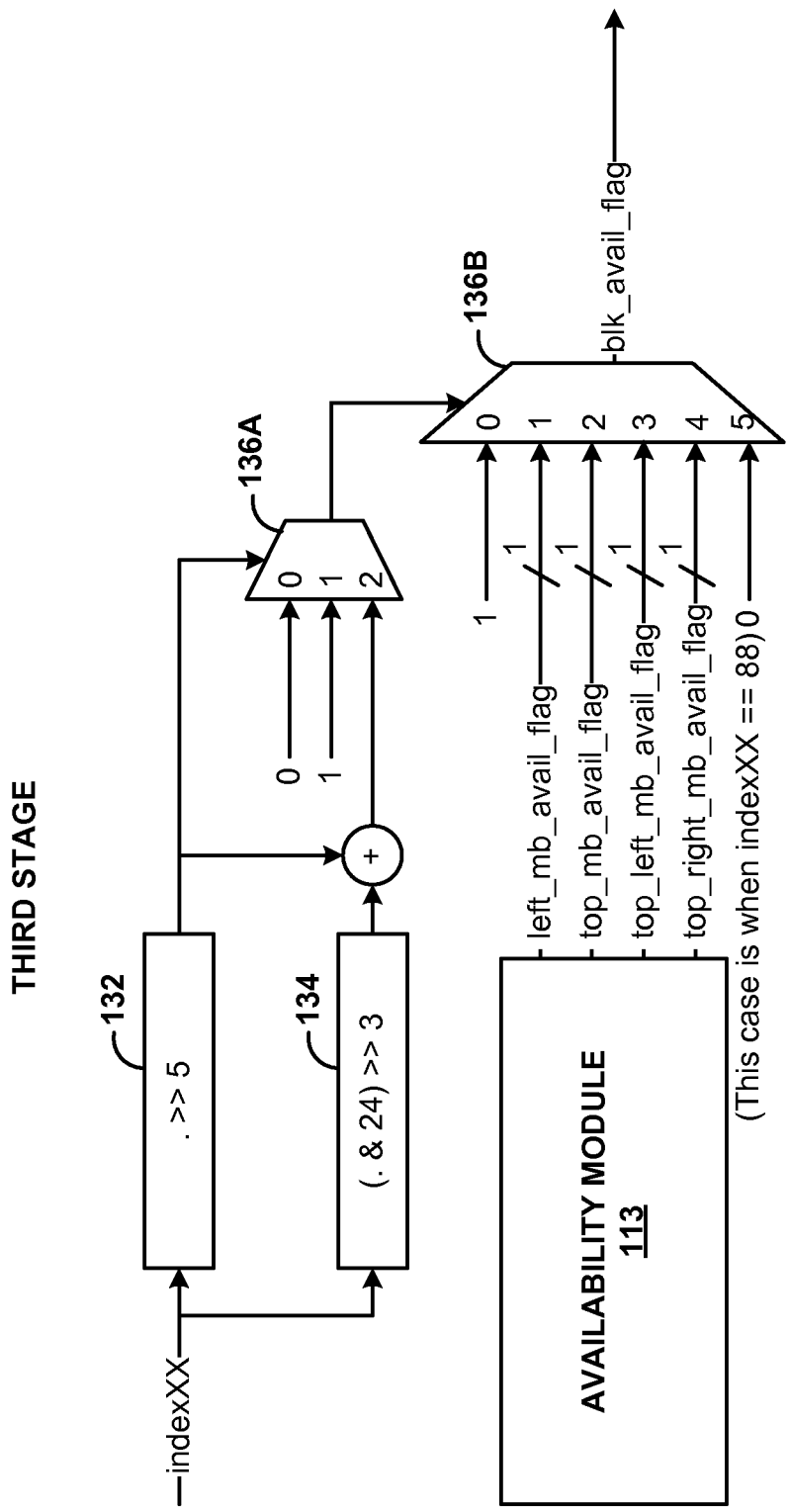

FIG. 10C is a block diagram of a portion of the third stage of FIG. 9 in more detail. The portion depicted by FIG. 10C is the logic surrounding each instance of availability module 113 as shown in FIG. 9. The second stage receives as input a 7-bit indexXX value from LUT 80B. Availability determination unit 76 may further include a shifter module 132, a complex shifter module 134, and multiplexers 136A, 136B. While shown as separate from availability module 113, this additional logic, hardware, and/or software may be implemented within or considered a part of availability module 113 such that availability module 113 may include these additional modules in some cases.

Shifter module 132 represents a hardware and/or software module that receives as input the 7-bit indexXX value and shifts that value five bit positions to the right. Complex shifter module 134 represents a hardware and/or software module that first performs an AND operation on the 7-bit indexXX value with a $24_{10}$ value (or $18_{16}$ or $00110002_2$), shifting the result of the AND operation by $3_{10}$ bit positions. Availability module 113 represents a hardware and/or software module that maintains the counter to output a plurality of flags in a manner described in more detail below. Briefly, availability module 113 outputs a plurality of neighboring availability flags, e.g., a "left_mb_avail_flag," a "top_mb_avail_flag," a "top_left_mb_avail_flag" and a "top right_mb_avail_flag", each of which indicate the availability of respective left, top, top-left, and top-right neighboring blocks.

Multiplexers 136A represents a hardware and/or software module that selects one of a plurality of candidate values, e.g., a zero (0) value, a one (1) value, and an addition of the output of shifter module 132 and complex shifter module 134. The addition of the two outputs selects whether the neighboring block identified by indexXX is the top, top-left, top-right block or previously identified as unavailable (e.g., this is the case when indexXX is equal to 88). Multiplexer 136B represents a hardware and/or software module that selects one of a plurality of candidate values, e.g., a one (1) value, the left_mb_avail_flag value, the top_mb_avail_flag value, the top_left_mb_avail_flag value, the top right_mb_avail_flag value, and a zero (0) value, based on an input value, e.g., the output of multiplexer 136A. Multiplexer 136B outputs the selected value as a "blk_avail_flag" value, which indicates whether the corresponding neighboring block is available or not.

Figure 10D:
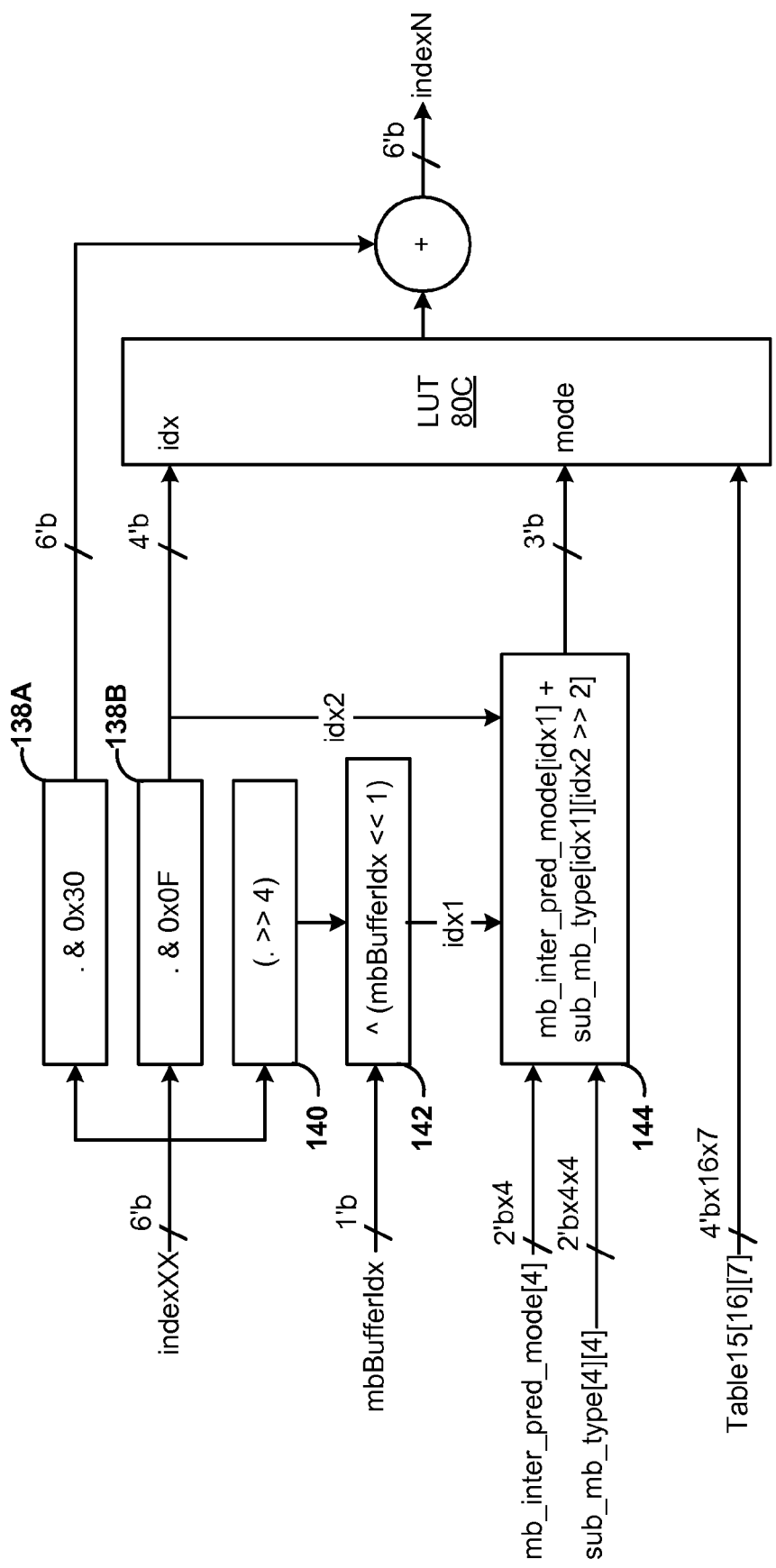

FIG. 10D is a block diagram illustrating the fourth stage of FIG. 9 in more detail. MV location unit 78 may implement this fourth stage and may comprise AND module 138A, 138B, a shifter module 140, a complex shifter 142, and a complex addition module 144, as well as, the above described LUT 80C. These modules 138A, 138B, 140, 142 and 144 may be similar to those modules, elements or units described above in that each represent a hardware and/or software module for performing the operations shown in FIG. 10D. These operations are generally represented throughout FIGS. 9, 10A-10D in a shorthand notation similar to if not exactly the same as that used by most Hardware Description Languages (HDLs). In this instance, the operations are defined by the Verilog HDL. In this instance, contrary to LUTs 80A, 80B, LUT 80C may be statically configured with a Table 15 while, as described above, LUTS 80A, 80B may be dynamically loaded with tables depending on the values of various inputs received at each of the stages. However for purposes of consistency, LUT 80C is shown loading Table 15[16][7].

The following Table 15 may represent one such table that LUT 80C may statically store or dynamically load which comprises 16×7 entries of 4 bits each or 4'b×16×7:

TABLE 15

| idx | Mode | | | | | | |
| --- | --- | --- | --- | --- | --- | --- | --- |
|  | 0 | 1 | 2 | 3 | 4 | 5 | 6 |
| 0 | 0 | 0 | 0 | 0 | 0 | 0 | 0 |
| 1 | 0 | 0 | 0 | 0 | 0 | 1 | 1 |
| 2 | 0 | 0 | 0 | 0 | 2 | 0 | 2 |
| 3 | 0 | 0 | 0 | 0 | 2 | 1 | 3 |
| 4 | 0 | 0 | 4 | 4 | 4 | 4 | 4 |
| 5 | 0 | 0 | 4 | 4 | 4 | 5 | 5 |
| 6 | 0 | 0 | 4 | 4 | 6 | 4 | 6 |
| 7 | 0 | 0 | 4 | 4 | 6 | 5 | 7 |
| 8 | 0 | 8 | 0 | 8 | 8 | 8 | 8 |
| 9 | 0 | 8 | 0 | 8 | 8 | 9 | 9 |
| 10 | 0 | 8 | 0 | 8 | 10 | 8 | 10 |
| 11 | 0 | 8 | 0 | 8 | 10 | 9 | 11 |
| 12 | 0 | 8 | 4 | 12 | 12 | 12 | 12 |
| 13 | 0 | 8 | 4 | 12 | 12 | 13 | 13 |
| 14 | 0 | 8 | 4 | 12 | 14 | 12 | 14 |
| 15 | 0 | 8 | 4 | 12 | 14 | 13 | 15 |

As shown in FIG. 10D, LUT 80C receives as input an idx value and a mode value. The idx value is equal to the output of AND module 138B, which performs an AND operation on the 6 least significant bits ($6'b$) of indexXX using a mask of 0x0F or $F_{16}=001111_2$. This output of AND module 138B is further labeled "idx2" and used as an input to complex addition module 144.

Complex addition module 144 outputs the mode value input to LUT 80C by adding the inputs of mb_inter_pred_mode[idx1] and sub_mb_type[idx1][idx2>>2]. Complex shifter 142 outputs the idx1 value used by complex addition module 144 by performing an exclusive OR or "XOR" operation on an output of shifter module 140 (which shifts indexXX four bit positions to the right) and a 1-bit mbBufferIdx shifted to the left by one bit position. mbBufferIdx refers to a value that indicates whether to swap the current MB and left MB without doing any explicit copying. Referring, for example, to buffer 70 of FIG. 8, mbBufferIdx may indicate whether block number 0-31 represents the current or left MB pair. If mbBufferIdx is equal to zero (0), then block numbers 0-31 refer to the current MB pair. If mbBufferIdx is equal to one (1), then block numbers 0-31 refer to the left MB pair. In this manner, the techniques may require fewer operations by altering the flag instead of copying the current MB pair to the left MB pair. Both of the mb_inter_pred_mode[4] and sub_mb_type[4][4] input values may be determined by MV location unit 78 by accessing the header information of the corresponding neighboring blocks in buffer 70. Complex addition module 144, in effect, resolves the correct mode based on the type of MB inter-prediction mode, e.g., 16×16, 16×8, 8×16, 8×8, etc., and sub-MB type, e.g., 8×8, 8×4, 4×8, 4×4, etc.

Given these inputs, LUT 80C may output a temporary index in accordance with Table 15. The mode input represents the type of partitioning. A mode value of 0 may represent a 16×16 partition. A mode value of 1 may represent a 16×8 partition. A mode value of 2 may represent an 8×16 partition, while a mode value of 3 may represent an 8×8 partition. A mode value of 4 may represent an 8×4 sub-partition, and a mode value of 5 may represent a 4×8 sub-partition. A mode value of 6 may represent a 4×4 sub-partition. Given the idx and this mode, the corresponding entry of Table 15 identifies the index that correctly stores the motion vector data, which in this instance may comprise the starting block of the partition or sub-partition.

MV location unit 78 may then add this temporary index to the output of AND module 138A. AND module 138A performs an AND operation on the 6 least significant bits of indexXX using a hexadecimal value of 0x30 or $30_{16}=110000_2$. The result of the addition is indexN, which MV location unit 78 may output to the fifth stage of MV reconstruction unit 72 as shown in FIG. 9. This fifth stage as described above may then map the index to an address of buffer 70, whereupon MV reconstruction unit 72 may access buffer 70 to reconstruct the MV for the current block in the manner described above.

Figure 11:
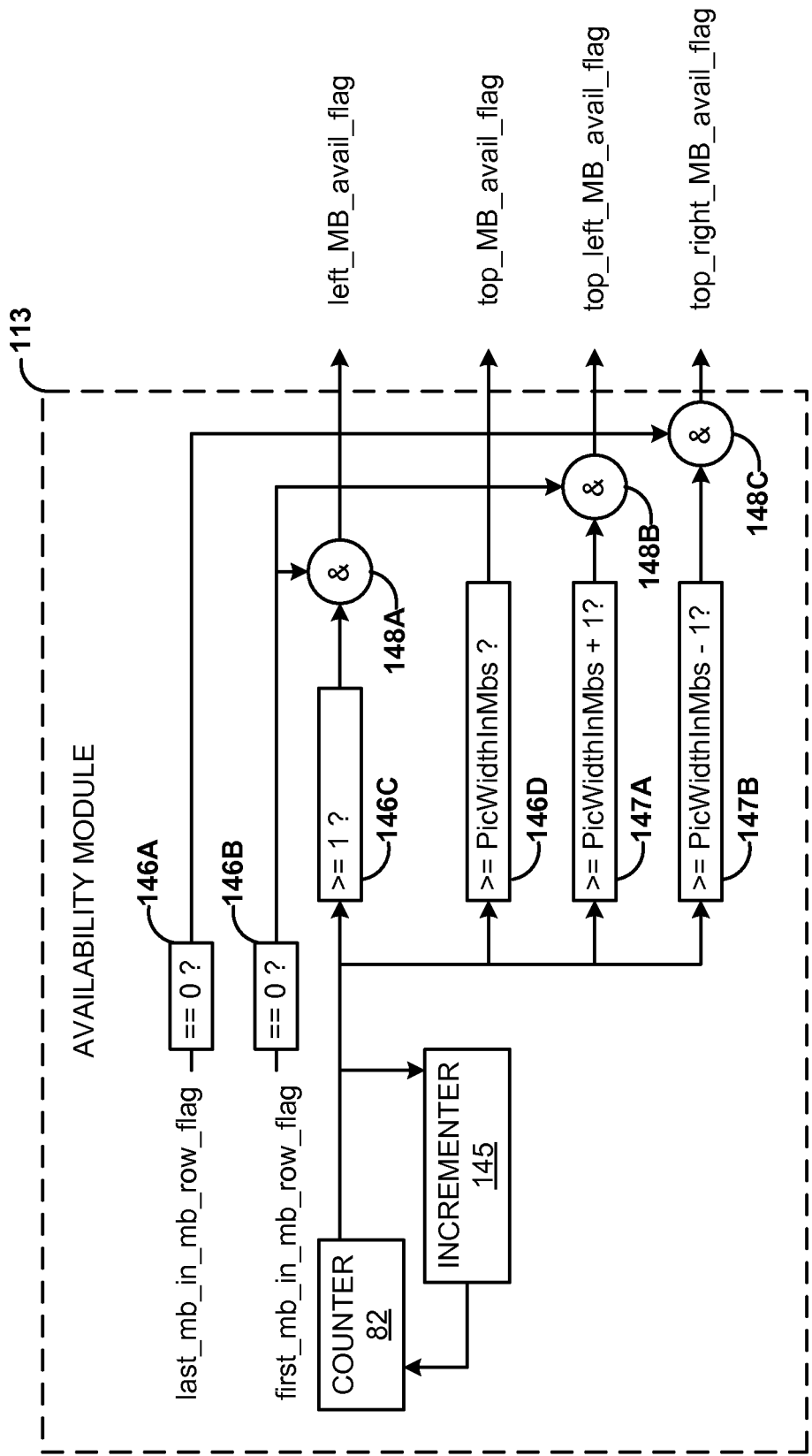
FIG. 11 is a block diagram illustrating the availability module of FIG. 10C in more detail.

FIG. 11 is a block diagram illustrating availability an example of module 113 of FIG. 10C in more detail. Availability module 113 may comprise a hardware module, a software module or any combination thereof. Availability module 113 includes an incrementer 145, comparison modules 146A-146D, complex comparison modules 147A, 147B, AND modules 148A-148C, and above described counter 82 (which may also be referred to in this disclosure as "availability counter 82").

Availability module 113 may maintain two variables or flags. The first flag may comprise a "last_mb_in_mb_row_flag" that indicates whether the current MB is the last MB in the row. If the first flag is set to a one or true value, then the current MB represents the last MB in the row. If the first flag is set to a zero or false value, then the current MB is not the last MB in the row. This first flag may be useful in determining the availability of the top-right neighboring. The second flag may comprise a "first_mb_in_mb_row_flag" that indicates whether the current MB is the first MB in the row. If the second flag is set to a one or true value, then the current MB represents the first MB in the row. If the second flag is set to a zero or false value, then the current MB is not the first MB in the row. This second flag may be useful in determining the availability of the left and top-left neighboring MB.

Comparison modules 146A, 146B receive the first and second flag and determine whether the first and second flags are equal to zero, respectively. If equal to zero, comparison modules 146A, 146B output a one or true value to respective AND modules 148A-148C. If not equal to zero, comparison modules 146A, 146B output a zero or false value to respective AND modules 148A-148C. By virtue of the AND operation, a zero value received by one of AND modules 148A-148C renders the associated one of the above described neighboring availability flags, e.g., left MB_avail_flag, top_left MB_avail_flag, and top right MB_avail_flag as a zero or false. A one received by AND modules 148A-148C, however, pushes the decision of availability on the output of comparison modules 146C and complex comparison modules 147A, 147B. Notably, an AND module is not required to determine the availability of the top neighboring MB, as the top_MB_avail_flag does not depend on whether the current MB is the first or last block of the row.

Counter 82 maintains a current count of the number of MB previously decoded. Incrementer 145 may receive the count value stored to counter 82 and increment the count value stored in counter 82 by one after each MB or MB pair is decoded. The count value stored to counter 82 is also forwarded to each of comparison modules 146C, 146D and complex comparison modules 147A, 147B, which determine the availability of the top, top-right, left and top-left neighboring MBs.

For example, comparison module 146C compares the count value stored to counter 82 to a value of 1 to determine whether the count value is greater than or equal (">=") to 1. If the count value is greater than 1, then the left neighboring MB is available as at decoding moves in the above described raster-scan order. Decoding at least 1 previous MB indicates that the current MB has at least a left neighboring MB. Comparison module 146D determines whether the count value stored to counter 82 is greater than or equal to the variable "PicWidthInMbs." The PicWidthInMbs variable may be determined by accessing header information associated with the current frame stored to buffer 70 or the current MB. The PicWidthInMbs variable may indicate the width of the current picture or frame as a number of MBs (e.g., 16×16 pixel blocks) or, better stated, a width of a row of a current picture or frame in MBs. If the count value is greater than or equal to the PicWidthInMbs variable, decoder 26 has decoded an entire row's worth of MBs and therefore the top neighboring MB for the current MB is available. If not greater than the PicWidthInMbs variable, then decoder 26 has only decoded part of a rows worth of MBs and therefore the top neighboring MB is not available.

Similar to comparison module 146D, complex comparison modules 147A and 147B each compare the count value to an adjusted PicWidthInMbs variable. Complex comparison module 147A, for example, determines whether the count value stored by counter 82 is greater than or equal to the PicWidthInMbs variable plus one. The addition of one is necessary to move the current MB one to the right of the first decoded MB in the slice or frame. Thus, if decoder 26 has previously decoded at least a row's worth of MBs plus one, the top-left neighboring MB is available assuming, as described above, that the current MB is not the first MB in the row. Otherwise, the top-left neighboring MB is unavailable. Complex comparison module 147B, as another example, determines the availability of top-right neighboring MB by comparing the count value stored to counter 82 to the PicWidthInMbs variable minus one. If the count value is greater than or equal to the result of the PicWidthInMbs variable minus 1, the top-right neighboring MB is available, assuming, again as described above that the current MB is not the last MB in the row.

FIGS. 12A-12F are each block diagrams illustrating the operation of the efficient coding techniques directed to determining the availability of neighboring MBs for a current MBs 149A-149F of a picture or frame 150. While described with respect to a slice 151 (as represented by the grey blocks of FIGS. 12A-12F), the efficient coding techniques directed to determining the availability of neighboring MBs may be applied on a frame or any other applicable partition of a frame.

Frame 150 comprises a frame with a width in MBs of five (5). Slice 151 starts with a MB having a MB index equal to 7. As described above, slice 151 may comprise an independently decodable portion of a frame, such as frame 150. With respect to slice 151, therefore, counter 82 may be reset at the beginning of the slice to indicate that no neighboring blocks are available until at least one MB of the slice, e.g., at least MB identified by MB index 7 is decoded by decoder 26. FIGS. 12A-12F represent this by including a "Cnt=0" in the MB identified by a MB index of 7 to suggest that the count value stored to counter 82 is reset to zero at the beginning of slice 151.

Figures 12A, 12B, 12C:
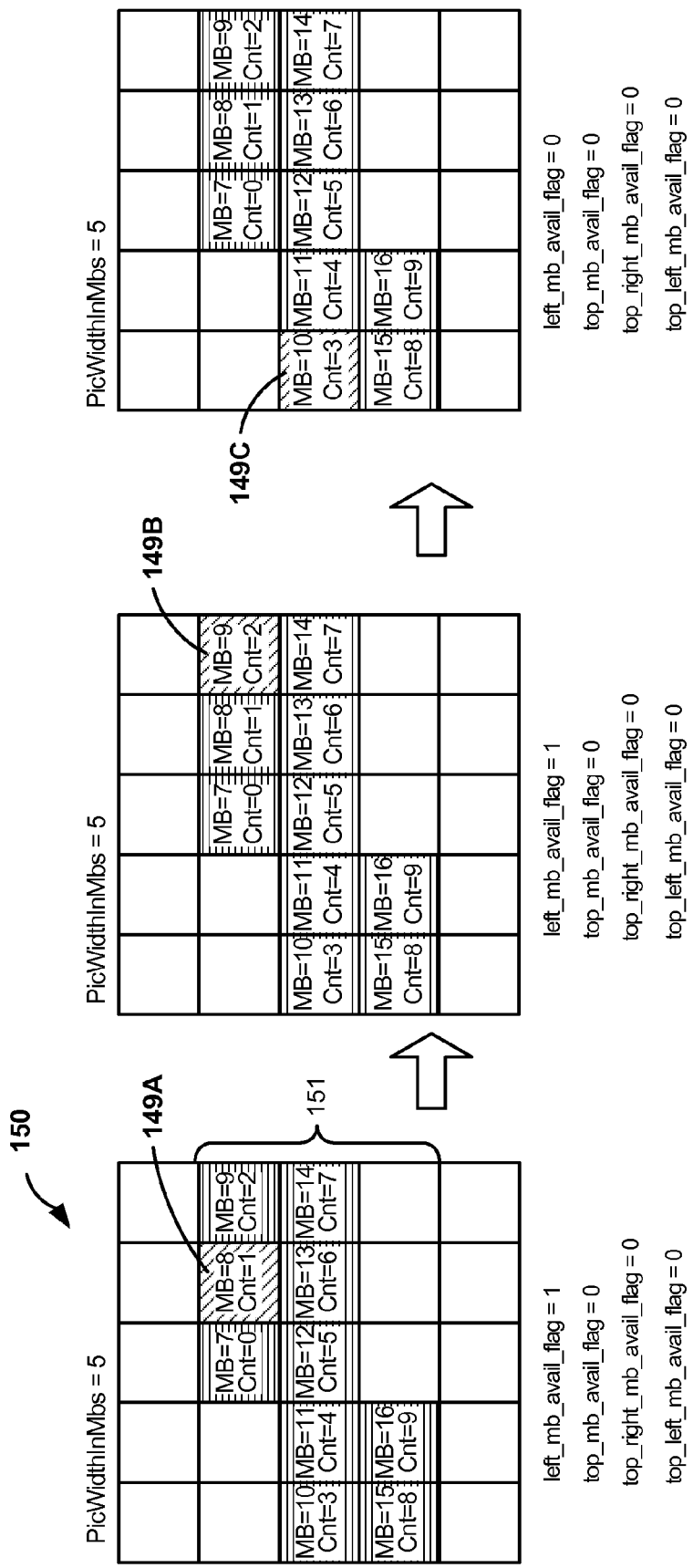
FIGS. 12A-12F are block diagrams illustrating the operation of the efficient coding techniques directed to determining the availability of neighboring macroblocks for current macroblocks 149A-149F of a picture or frame.

FIG. 12A is a block diagram that depicts a current MB 149 of frame 150 having a MB index of 11. As the slice begins at a MB identified by an index of 7, decoder 4 has previously decoded one MB, e.g., the MB identified by MB indexes 7, and accordingly, the count value, e.g., "Cnt," is equal to one. As current MB 149A is neither the first or last MB in the row, the first and second flags (or last/first_mb_in_mb_row_flag) of availability module 113 (as shown in FIG. 11) are set to zero and comparison modules 146A, 146B therefore output a one or true value to AND modules 148A-148C.

Given that the count value is greater than or equal to one, comparison module 146C outputs a one value, which when AND'ed with the one from comparison module 146B produces a one or true for the left_MB_avail_flag, thereby indicating that the left neighboring MB is available. However, the top, top-left and top-right neighboring MBs are unavailable as the count value of one is not greater than or equal to a PicWidthInMbs value of 5, a PicWidthInMbs plus one or 6, and a PicWidthInMbs value minus one or 4, respectively. As a result, comparison module 146D and complex comparison modules 147A, 147B each output a zero or false value, which when AND'ed by AND modules 148B, 148C respectively, outputs a zero for top_/top_left/top right MB_avail_flag.

FIG. 12B is a block diagram that depicts the state of frame 150 after decoding current MB 149A of FIG. 12A. Current MB 149B is the next MB in raster-scan order to be decoded by decoder 26 and therefore is referred to as the "current" MB. Incrementer 145 increments the count value stored to counter 82 by one in response to decoder 26 decoding current MB 149A, which FIG. 12B indicates with a "Cnt=2" in current MB 149B. Current MB 149B is, unlike current MB 149A, at the end of the row or represents the last MB in the row, and availability module 113 sets last_mb_in_mb_row_flag to one, which comparison module 146A compares to zero and outputs a zero to AND modules 148C. As a result, top right MB_avail_flag is a zero regardless of the comparison performed by complex comparison module 147B. However, as current MB 149B is not the first MB in the row, the first_mb_in_mb_row_flag is set to zero, and comparison module 146B outputs a one or true value to AND modules 148A, 148B.

Given that the count value is greater than or equal to one, comparison module 146C outputs a one value, which when AND'ed with the one from comparison module 146B produces a one or true for the left_MB_avail_flag, thereby indicating that the left neighboring MB is available. The top and top-left neighboring MBs are not available, however, as the count value is not greater than or equal to the PicWidthInMbs (e.g., 2 not >=5) or the result of PicWidthInMbs plus one (e.g., 2 not >=6), and comparison module 146D and complex comparison module 147A each output a zero, which when AND'ed by AND modules 148B, respectively outputs a zero or false for top_MB_avail_flag and top_left_MB_avail_flag.

FIG. 12C is a block diagram that depicts the state of frame 150 after decoding current MB 149B of FIG. 12B. Current MB 149C is the next MB in raster-scan order to be decoded by decoder 26 and therefore is referred to as the "current" MB. Incrementer 145 increments the count value stored to counter 82 by one in response to decoder 26 decoding current MB 149C, which FIG. 12C indicates with a "Cnt==3" in current MB 149C. Current MB 149B is at the start of the row or represents the first MB in the row, and availability module 113 sets first_mb_in_mb_row_flag to one. Comparison module 146B therefore compares this flag to zero and outputs a zero to both of AND modules 148B, 148C. As a result, both of left and top_left_MB_avail_flag are a zero regardless of the output of modules 146C and 147A, respectively. However, as current MB 149B is not the last MB in the row, the last_mb_in_mb_row_flag is set to zero, and comparison module 146B outputs a one or true value to AND modules 148C. The top right neighboring MB is not available, as the count value is not greater than or equal to the result of PicWidthInMbs minus 1 (e.g., 3 not >=4), and comparison module 146D output a zero, which when AND'ed by AND modules 148B, respectively outputs a zero or false for top right MB_avail_flag.

Figures 12D, 12E, 12F:
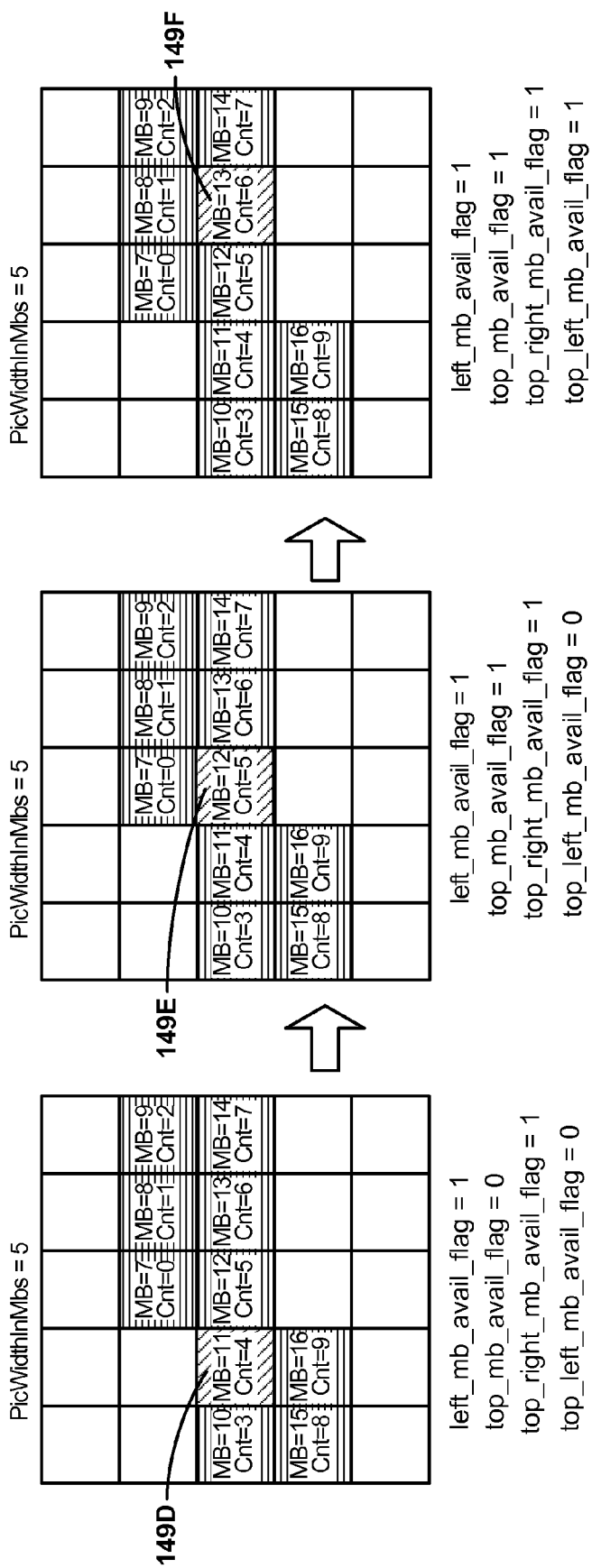

FIG. 12D is a block diagram that depicts the state of frame 150 after decoding current MB 149C of FIG. 12C. Current MB 149D is the next MB in raster-scan order to be decoded by decoder 26 and therefore is referred to as the "current" MB. Incrementer 145 increments the count value stored to counter 82 by one in response to decoder 26 decoding current MB 149A, which FIG. 12D indicates with a "Cnt=4" in current MB 149D. Again, as current MB 149D is neither the first or last MB in the row, the first and second flags (or last_/first_mb_in_mb_row_flag) of availability module 113 (as shown in FIG. 11) are set to zero and comparison modules 146A, 146B therefore output a one or true value to AND modules 148A-148C.

Given that the count value is greater than one, comparison module 146C outputs a one value, which when AND'ed with the one from comparison module 146B produces a one or true for the left_MB_avail_flag, thereby indicating that the left neighboring MB is available. The top neighboring MB, in the example of FIG. 12D, is not available as the count value of 4 is not greater than or equal to the PicWidthInMbs variable of 5, and comparison module 146D outputs a zero for top_MB_avail_flag. Top-left neighboring MB is also not available as the count value is not greater than or equal to the result of PicWidthInMbs plus one (e.g., 4 not >=6), and complex comparison module 147A outputs a zero, which when AND'ed by AND module 148B outputs a zero for top_left_MB_avail_flag. The top-right neighboring MB is available as the count value is greater than or equal to the result of PicWidthInMbs minus one (e.g., 4>=4), and complex comparison module 147B outputs a one, which when AND'ed by AND module 148C outputs a one for top_right_MB_avail_flag.

FIG. 12E is a block diagram that depicts the state of frame 150 after decoding current block 149D of FIG. 12D. Current MB 149E is the next MB in raster-scan order to be decoded by decoder 26 and therefore is referred to as the "current" MB. Incrementer 145 increments the count value stored to counter 82 by one in response to decoder 26 decoding current MB 149A, which FIG. 12E indicates with a "Cnt=5" in current MB 149E. Again, as current MB 149E is neither the first or last MB in the row, the first and second flags (or last_/first_mb_in_mb_row_flag) of availability module 113 (as shown in FIG. 11) are set to zero and comparison modules 146A, 146B therefore output a one or true value to AND modules 148A-148C.

Given that the count value is greater than one, comparison module 146C outputs a one value, which when AND'ed with the one from comparison module 146B produces a one or true for the left_MB_avail_flag, thereby indicating that the left neighboring MB is available. The top neighboring MB, in the example of FIG. 12E, is also available as the count value of 5 is greater than or equal to the PicWidthInMbs variable of 5, and comparison module 146D outputs a one for top_MB_avail_flag. Top-left neighboring MB is not available as the count value is not greater than or equal to the result of PicWidthInMbs plus one (e.g., 5 not >=6), and complex comparison module 147A outputs a zero, which when AND'ed by AND module 148B outputs a zero for top_left_MB_avail_flag. The top-right neighboring MB is available as the count value is greater than or equal to the result of PicWidthInMbs minus one (e.g., 5>=4), and complex comparison module 147B outputs a one, which when AND'ed by AND module 148C outputs a one for top right MB_avail_flag.

FIG. 12F is a block diagram that depicts the state of frame 150 after decoding current MB 149E of FIG. 12E. Current MB 149F is the next MB in raster-scan order to be decoded by decoder 26 and therefore is referred to as the "current" MB. Incrementer 145 increments the count value stored to counter 82 by one in response to decoder 26 decoding current MB 149E, which FIG. 12F indicates with a "Cnt=6" in current MB 149F. Again, as current MB 149F is neither the first or last MB in the row, the first and second flags (or last_/first_mb_in_mb_row_flag) of availability module 113 (as shown in FIG. 11) are set to zero and comparison modules 146A, 146B therefore output a one or true value to AND modules 148A-148C.

Given that the count value is greater than one, comparison module 146C outputs a one value, which when AND'ed with the one from comparison module 146B produces a one or true for the left_MB_avail_flag, thereby indicating that the left neighboring MB is available. The top neighboring MB, in the example of FIG. 12F, is available as the count value of 6 is greater than or equal to the PicWidthInMbs variable of 5, and comparison module 146D outputs a one for top_MB-avail_flag. Top-left neighboring MB is also now available as the count value is greater than or equal the result of PicWidthInMbs plus one (e.g., 6>=6), and complex comparison module 147A outputs a one, which when AND'ed by AND module 148B outputs a one for top_left_MB_avail_flag. The top-right neighboring MB is available as the count value is greater than or equal to the result of PicWidthInMbs minus one (e.g., 6>=4), and complex comparison module 147B outputs a one, which when AND'ed by AND module 148C outputs a one for top right MB_avail_flag.

Availability module 113 may maintain the above described first and second flags through simple mathematical operations. For example, availability module 113 may determine whether the current MB is the first MB in the row by "mod" dividing the MB index of the current MB by the PicWidthInMbs variable. A "mod" division performs a regular division but returns the remainder instead of the quotient. If the remainder is zero, then the current MB is the first MB in the row. Likewise, to determine whether the current MB is the last MB in the row, availability unit 113 may perform another "mod" division on the MB index of the current MB by PicWidthInMbs variable. If the resulting remainder is equal to the PicWidthInMbs variable minus one, then the current MB is the last MB in the row. This procedure may be derived by examining the MB indexes for each block in FIGS. 12A-12F and noting that the first MB of the row contains a multiple of the PicWidthInMbs variable while the last MB of the row contains a multiple of the PicWidthInMbs variable minus one.

Figure 13:
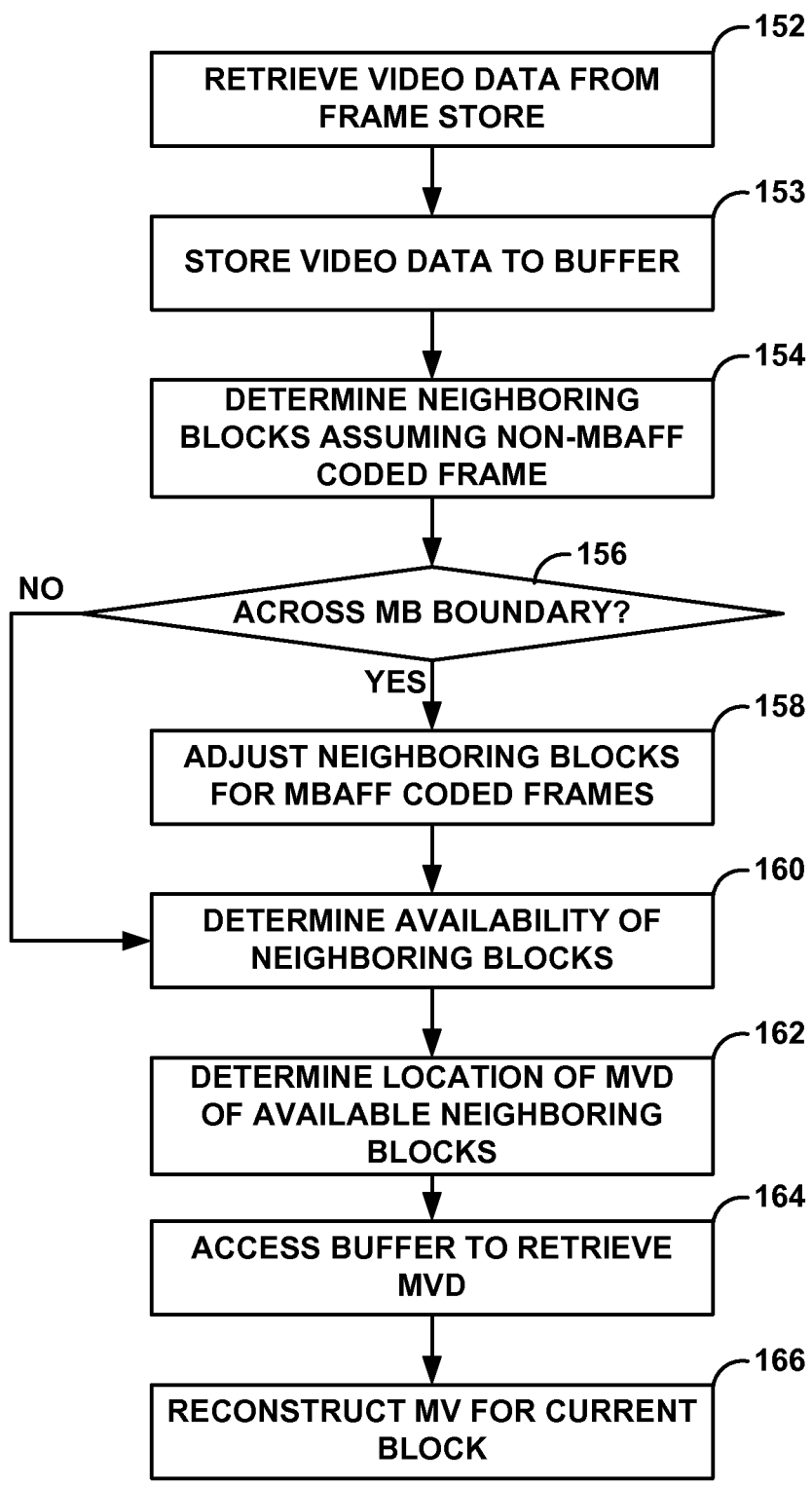
FIG. 13 is a flowchart illustrating exemplary operation of the MV reconstruction unit of FIG. 3 in performing the efficient decoding techniques described in this disclosure.

FIG. 13 is a flowchart illustrating exemplary operation of MV reconstruction unit 72 of FIG. 3 in performing efficient decoding techniques described in this disclosure. Initially, MV reconstruction unit 72 accesses frame store 68 and retrieves video data corresponding to a frame and/or slice (152). MV reconstruction unit 72 then stores this video data to buffer 70 (153). MV reconstruction unit 72, and more particularly, geometric resolution unit 74 may resolve geometric relationships between a plurality of blocks or blocks to determine neighboring blocks for a current block, as described above. In some instances, geometric resolution unit 72 may resolve the geometric relationships in two stages, e.g., the first and second stage as shown in FIG. 9.

In the first stage, geometric resolution unit 72 may determine the neighboring blocks for the current block assuming the frame that includes both the neighboring blocks and the current block is a non-MBAFF coded frame, as also described above (154). Geometric resolution unit 72 may include a first LUT 80A which determines the neighboring blocks for the current block based on the above described partition width of the current block and the starting block number of video data unit number of the current block. LUT 80A may, upon receiving these inputs, output a plurality of indices, e.g., indexA, indexB, indexC and indexD, that identify the left, top, top-right and top-left neighboring blocks, respectively. The indices may further each include a flag that identifies whether each one of the neighboring blocks resides across a block boundary. That is, the flag identifies, for a respective one of the neighboring blocks, whether the neighboring block is included within the current block or one of the top, left, top-left, or top-right neighboring blocks. Only if the neighboring block does not reside in the same block as that of the current block does geometric resolution unit 74 need to invoke LUT 80B to adjust those indices identifying blocks that reside outside of the current block for potential MBAFF coding schemes.

If a neighboring block resides across a block boundary ("YES," 156), geometric resolution unit 74 adjusts the indices identifying neighboring blocks that reside outside of the current block for MBAFF coded frames in accordance with LUT 80B in the manner described above (158). If not across a block boundary ("NO," 156) or after adjusting the indices, availability determination unit 76 may determine whether the neighboring block identified by each of the indices is available. That is, availability determination unit 76 may determine the availability of the neighboring blocks (160). For those neighboring blocks determined to be available, MV location unit 78 may determine a location within each neighboring block that stores the MV data for that neighboring block. (162).

MV reconstruction unit 72 may then retrieve this motion vector data by accessing the identified location in buffer 70 (164). MV reconstruction unit 72 may employ a fifth stage, such as the fifth stage shown in FIG. 9, to map the index to an address within buffer 70, whereupon MV reconstruction unit 72 uses this address to access buffer 70. Upon retrieving the motion vector data for each available neighboring block, MV reconstruction unit 72 may reconstruct an MV for the current block in the manner described above (166).

Figure 14A:
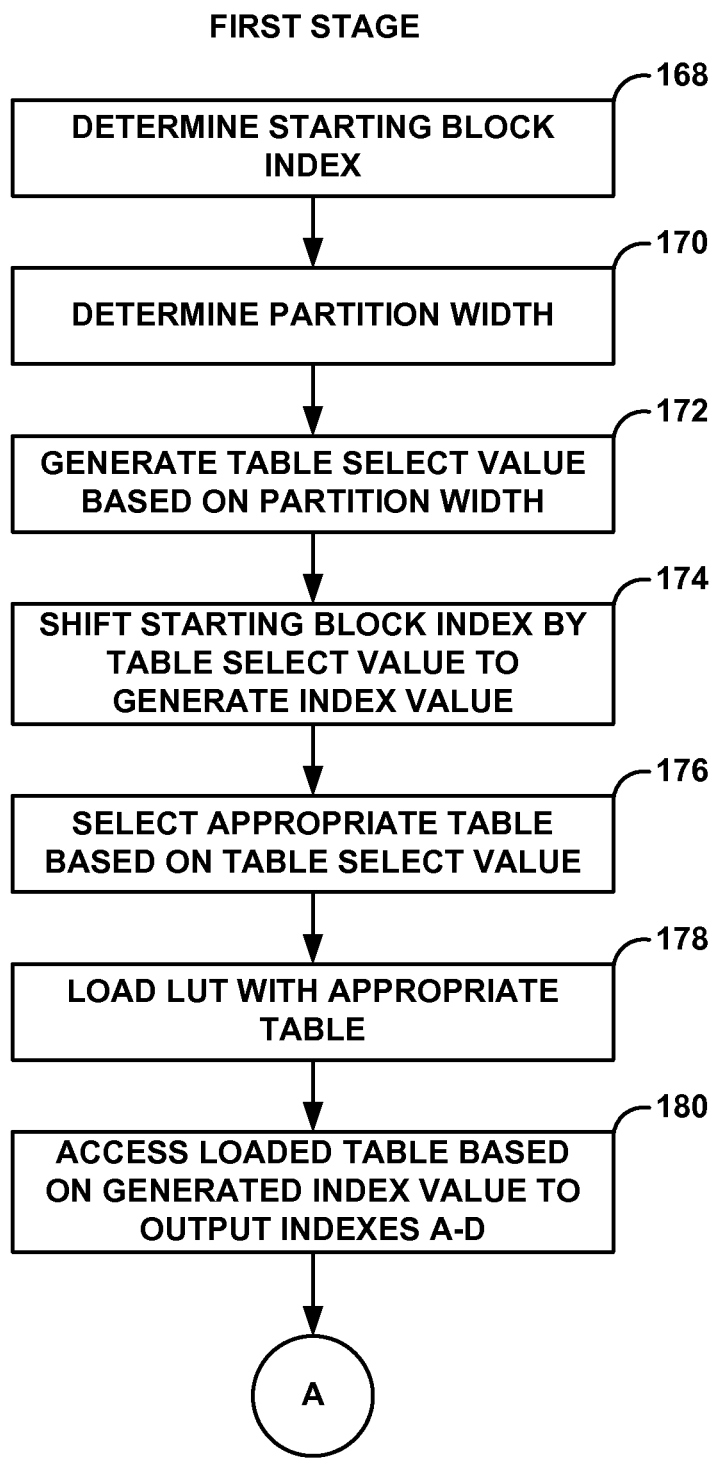
FIGS. 14A-14D are flowcharts illustrating detailed operation of an exemplary implementation of the MV reconstruction unit as shown in FIG. 9 and FIGS. 10A-10D.

FIGS. 14A-14D are flowcharts illustrating detailed operation of an exemplary implementation of MV reconstruction unit 72 as shown in FIG. 9 and FIGS. 10A-10D. FIG. 14A is a flowchart illustrating a first stage of MV reconstruction unit 72, which may be implemented by geometric resolution unit 74, as described above with respect to FIG. 10A. Initially, in the first stage, geometric resolution unit 74 may determine starting block index (e.g., first_block_index) and a partition_width (e.g., partition_width) from header information of the current block (168, 170). Geometric resolution unit 74 may further generate a table select value (e.g., tbl_sel) by shifting the partition_width value and subtracting the result of the shift by one, as described above (172).

After determining the table select value, geometric resolution unit 74 may also shift, in the manner described above, the starting block index by a number of bit position indicated by the table select value to generate an index value (174). Geometric resolution unit 74 may also employ the table select value to select an appropriate one of a plurality of tables to load in LUT 80A, as described above (176). Geometric resolution unit 74 may load LUT 80A with the appropriate table and access the table in LUT 80A based on the index value determined above to output indexA, indexB, indexC, and indexD in accordance with the loaded table, as described above (178, 180). Also, as described above, each of indexA, indexB, indexC and indexD may correspond to a respective location of a left, top, top-right, and top-left neighboring block. Each of indicesA-D may further include a flag that indicates whether the respective left, top-top-right, top-left neighboring block resides across a block boundary or within another block different from the current block.

While described in this disclosure relative to "loading" a table into LUTs 80A-80C, a number of alternative implementations may exist and the techniques should not be limited to the above described "dynamic" loading implementation, which is dynamic in that LUTs 80A-80C are loaded in response to a particular index, partition width, etc. Alternative implementations may comprise, for example, instances where LUTs 80A-80C are pre-loaded in a prior stage. Moreover, each of LUTs 80A-80C may comprise multiple LUTs, where each of the multiple LUTs are pre-loaded LUTs the appropriate one of the pre-loaded LUTs is selected based on the situation. Thus, selecting a table may comprise selecting a table pre-loaded to one of a plurality of LUTs, in one instance, and the disclosure should not be limited to any particular implementation for selecting either tables or LUTs.

Figure 14B:
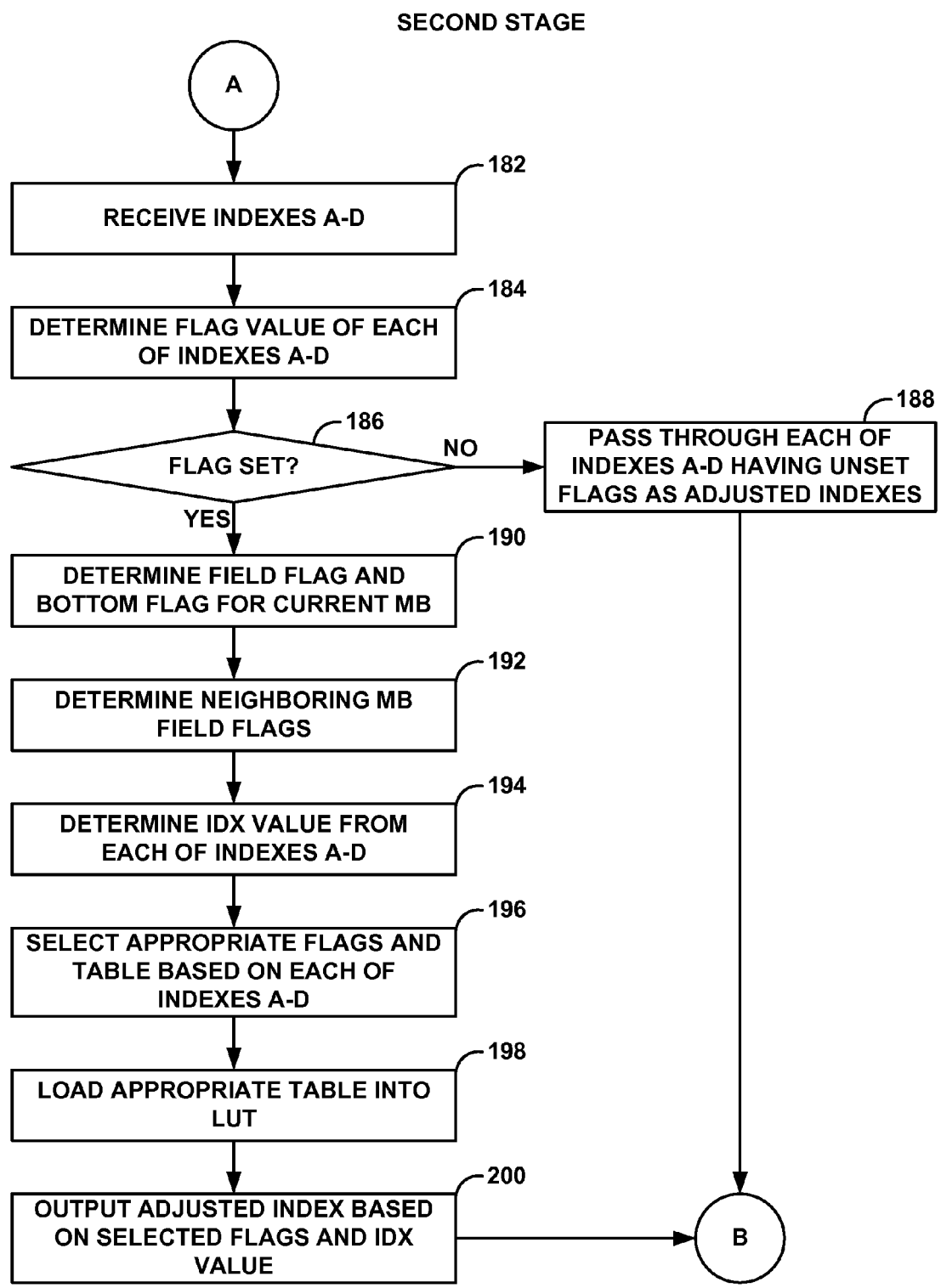

FIG. 14B is a flowchart illustrating a second stage of MV reconstruction unit 72, as shown in FIG. 9, which may also be implemented by geometric resolution unit 74, as described above with respect to FIG. 10B. Initially, the second stage of geometric resolution unit 74 receives indicesA-D and determines a value of the flag included within each of indicesA-D (182, 184). Based on the value of each of the flags included within indicesA-D, e.g., whether the flag is set (186), geometric resolution unit 74 determines whether to adjust each of indicesA-D, respectively, to account for MBAFF encoded frames, as described above.

If the flag is not set, geometric resolution unit 74 passes through each of indicesA-D that include the unset flags as the adjusted indices, e.g., indexXX (188). Otherwise, for those flags that are set, geometric resolution unit 74 determines a plurality of values for corresponding flags, e.g., mb_field flag, mb_bottom_flag, left_mb_field_flag, top_mb_field_flag, and top right mb_field flag, for the current and neighboring blocks, as described above (190, 192). After determining the value of each of the flags, geometric resolution unit 74 further determines an idx value based on each of indicesA-D (194). Moreover, geometric resolution unit 74, also as described above, selects appropriate one or more of the left_mb_field_flag, top_mb_field_flag, top_left_mb_field_flag, and top_right mb_field_flag, and appropriate one of Tables 11, 12, 13 and 14 based on each of indicesA-D (196).

Geometric resolution unit 74 then loads the appropriate one of Tables 11-14 into LUT 80B and accesses the table stored to LUT 80B based on the appropriate one or more of the flags, mb_field_flag, mb_bottom_flag, and idx value. LUT 80B outputs adjusted indexXX based on these flags and idx value, where the adjusted indexXX accounts for MBAFF coded frames, while indexX assumed a non-MBAFF coded frame.

Figure 14C:
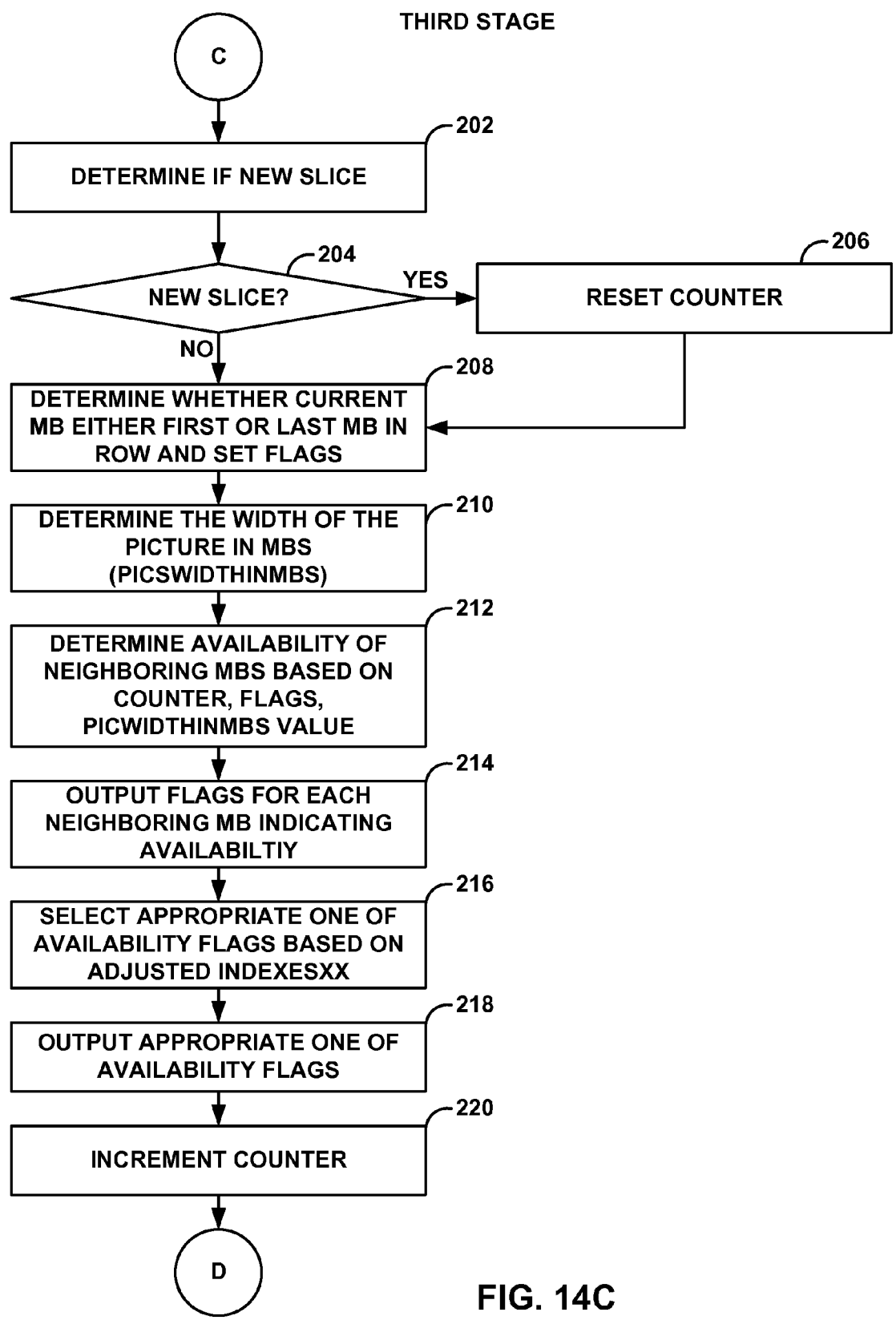

FIG. 14C is a flowchart illustrating a third stage of MV reconstruction unit 72, which may be implemented by availability determination unit 76, as described above with respect to FIG. 10C. Availability determination unit 76 may initially determine whether the current block is the first block of a new slice (202). Availability determination unit 76 may determine whether the current block is the first of a new slice by determining if the current block is adjacent to a network abstraction layer (NAL) header that marks the beginning of a new slice. If the current block is the first of a new slice (204), availability module 113 of each availability determination unit 76 may reset counter 82 (206). Otherwise, if not a new slice (204), availability module 113 may determine whether the current block represents either a first or last block in the row and set the first and second flags, e.g., last_mb_in_mb_row_flag and first_mb_in_mb_row_flag, as described above with respect to FIGS. 11 and 12A-12F (208).

Availability module 113 may further determine a PicWidthInMbs value, as described above (210). Based on the first and second flags, the adjusted indexXX, the counter value stored to counter 82 and the PicWidthInMbs value, availability module 113 may determine the availability of each of the neighboring blocks in the manner described above with respect to FIGS. 12A-12F (212). Availability module 113 may then output availability flags, e.g., left_mb_avail_flag, top_mb_avail_flag, top_left_mb_avail_flag, and top_right_mb_avail_flag (214). Availability determination unit 76 may selects the appropriate one of the plurality of availability flags or a value of $88_{10}$ based on adjusted indexXX, as described above with respect to FIG. 10C (216).

Availability determination unit 76 then outputs the appropriate one of availability flags that indicates the availability of the respective one of the top, top-right, left, or top-left neighboring block identified by the received adjusted indexXX (218). Incrementer 145 of availability module 113 may upon decoder 26 decoding the current block, increment counter 82 (220). Incrementer 145 may determine that decoder 26 has finished decoding the current block by maintaining a block index that corresponds to the previously decoded block and comparing this maintained block index to the current block index. If different, increment 145 may then increment counter 82. If not different, incrementer 145 may wait to increment counter 82.

Figure 14D:
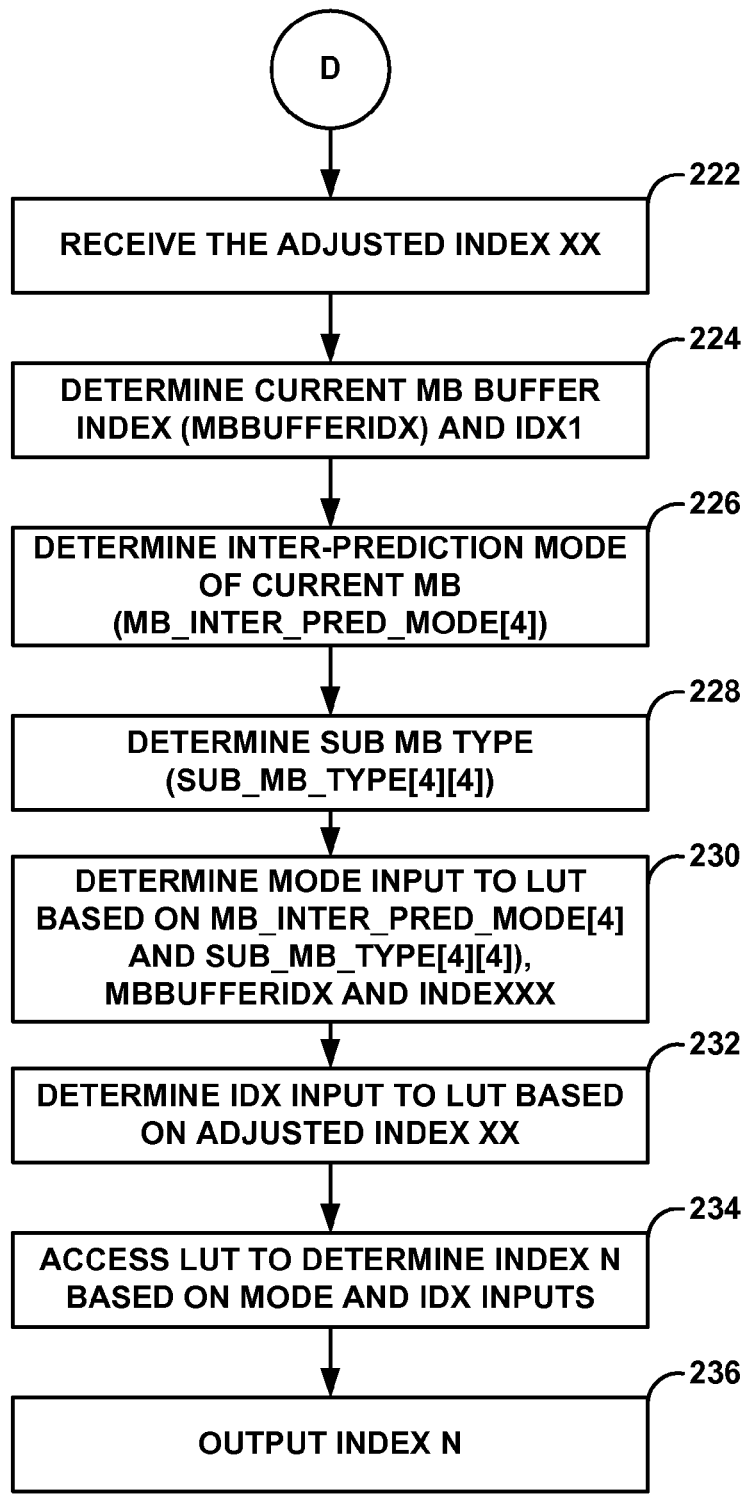

FIG. 14D is a flowchart illustrating a fourth stage of MV reconstruction unit 72, which may be implemented by MV location unit 78, as described above with respect to FIG. 10D. Initially, MV location unit 78 receives the adjusted indexXX from stage three (222). MV location unit 78 determines a block buffer index for the current block (mbBufferIdx), an inter-prediction mode of the current block (MB_inter pred_mode[4]) and a sub-block type (sub_mb_type[4][4]), as described above (224-228). MV location unit 78 then determines a mode input to LUT 80C based on, for example, mb_inter pred_mode[4], sub_mb_type[4][4], mbBufferIdx and indexXX, also as described above (230).

In some instances, MV location unit 78 may determine an idx1 based on mbBufferIdx and an idx2 based on indexXX. MV location unit 78 may then use idx1 and idx2 to reference particular locations within the mb_inter pred_mode[4] vector and the sub_mb_type[4][4] matrix. For example, as shown in FIG. 10D, MV location unit 78 may use idx1 as a reference into mb_inter_pred_mode, e.g., mb_inter pred_mode[idx1], and both idx1 and idx2 as a reference into sub_mb_type, e.g., sub_mb_type[idx1][idx2>>2]. After determining the mode input, MV location unit 78 may determine an idx input to LUT 80C based on adjusted indexXX and access LUT 80C to determine indexN based on the mode and idx inputs (232, 234). LUT 80C, in response to receiving the mode and idx inputs, outputs an temporary index in accordance with the above Table 15. To generate or output indexN, MV location unit 78 may, as described above, add at least part of indexXX to the temporary index output by LUT 80C (236).

The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset. If implemented in software, the techniques may be realized at least in part by a computer-readable medium comprising instructions that, when executed, cause a processor to perform one or more of the methods described above.

A computer-readable medium may form part of a computer program product, which may include packaging materials. A computer-readable medium may comprise a computer data storage medium such as random access memory (RAM), synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code or instructions may be executed by one or more processors, such as one or more DSPs, general purpose microprocessors, ASICs, field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules. The disclosure also contemplates any of a variety of integrated circuit devices that include circuitry to implement one or more of the techniques described in this disclosure. Such circuitry may be provided in a single integrated circuit chip or in multiple, interoperable integrated circuit chips in a so-called chipset. Such integrated circuit devices may be used in a variety of applications, some of which may include use in wireless communication devices, such as mobile telephone handsets.

Various embodiments of the disclosed techniques have been described. These and other embodiments are within the scope of the following claims.

The invention claimed is:

1. A method comprising:
   incrementing an availability counter after each of a plurality of video data units is processed;
   determining, based on the availability counter, whether one or more of the plurality of video data units (i) have been previously processed and (ii) are available for use as neighboring video data units in the processing of a current one of the plurality of video data units based in part on whether the current video data unit comprises a first or a last video data unit in a row of the plurality of video data units; and
   processing the current video data unit based on the determination.

2. The method of claim 1, wherein determining whether the one or more of the plurality of neighboring video data units are available comprises:
   obtaining one of one or more indices that identify the neighboring video data units;
   determining whether the current video data unit comprises the first or the last video data unit in the row of the plurality of video data units;
   setting at least one flag based on the determination of whether the current video data unit comprises the first or last video data unit in the row;
   determining a width of the row as a function of a number of video data units in the row;
   setting a plurality of neighboring availability flags based on the availability counter, the at least one flag, and the width; and
   outputting one of the plurality of neighboring availability flags based on the obtained one of the indices that indicates the availability of the corresponding one of the plurality of neighboring video data units.

3. The method of claim 2, wherein setting the plurality of neighboring availability flags comprises setting a flag for each of a top, top-right, left, and top-left neighboring video data unit.

4. The method of claim 1, wherein determining whether the one or more of the plurality of neighboring video data units are available comprises obtaining at least one of a plurality of indices identifying the plurality of neighboring video data units.

5. The method of claim 4, further comprising determining the plurality of indices by:
   determining, while processing the current video data unit, a partition width and a video unit number of the current video data unit; and
   accessing, using the determined partition width and the video unit number, a plurality of look-up tables (LUTs) to output the one or more indices identifying the plurality of neighboring video data units.

6. The method of claim 5, wherein accessing the plurality of LUTs comprises accessing, using the determined partition width and video unit number, a first one of the plurality of LUTs to resolve a geometric relationship between the current video data unit and the one or more of the plurality of neighboring video data units assuming that the current and neighboring video data units are each encoded according to a first one of at least two coding modes to output the one or more indices.

7. The method of claim 6,
   wherein the first coding mode comprises a non-MacroBlock Adaptive Field/Frame (non-MBAFF) coding mode, and
   wherein a second one of the at least two coding modes comprises a MacroBlock Adaptive Field/Frame (MBAFF) coding mode.

8. The method of claim 6, wherein accessing the first LUT comprises:
   selecting one of a plurality of tables based on the partition width;
   loading the first LUT with the selected one of the tables; and
   accessing the first LUT using the first block index to output the one or more indices in accordance with the selected one of the tables.

9. The method of claim 6, wherein accessing the first LUT comprises outputting the one or more indices to a second one of the plurality of LUTs, wherein each of the one or more indices includes a flag that indicates whether the respective one or more of the plurality of neighboring video data units reside outside of the current video data unit.

10. The method of claim 9, wherein accessing the one or more LUTs further comprises:
    determining whether to access the second LUT based on the flag of each of the one or more indices; and
    accessing the second LUT when at least one of the flags of each of the one or more indices indicates that the respective one the plurality of neighboring video data units reside outside of the current video data unit to output corresponding adjusted indices, wherein the adjusted indices account for when the assumption is incorrect and the current and neighboring video data units are encoded according to MacroBlock Adaptive Field/Frame (MBAFF) coded frame.

11. The method of claim 10, wherein accessing the second one of the plurality of LUTs to output the corresponding adjusted indices comprises:
    obtaining one of the indices from the first LUT;
    determining a first flag that indicates a field coding mode of the current video data unit;
    determining a second flag that indicates a bottom position of the current video data unit;
    determining a plurality of neighboring flags that indicate the field coding mode for the corresponding plurality of neighboring video data units;
    selecting one of a plurality of tables based on the obtained one of the indices;
    loading the table into the second LUT; and
    accessing the second LUT using the obtained one of the indices, the first and second flags and the plurality of neighboring flags to output a corresponding one of the adjusted indices.

12. The method of claim 10, wherein accessing the second LUT comprises passing through as the corresponding adjusted index those of the plurality of indices that each include the flag that indicates that the respective one of the plurality of neighboring video data units reside within the current video data unit without accessing the second LUT.

13. The method of claim 5, wherein processing the current video data unit based on the determination comprises accessing, for each of the neighboring video data units determined to be available, another look-up table (LUT) based on one of the one or more indices to determine a location of motion vector data within the corresponding one of the plurality of neighboring video data unit determined to be available.

14. The method of claim 13, wherein accessing the other LUT comprises:
obtaining one of the one or more indices;
determining a mode input that identifies a type of partitioning for the current video data unit; and
accessing the other LUT using the obtained one of the indices and the determined mode to output an index identifying the location of the motion vector data within the corresponding one of the plurality of neighboring video data units.

15. The method of claim 13, wherein processing the current video data unit based on the determination further comprises:
mapping at least one of index that identifies the location of the motion vector data to at least one address;
accessing a memory using the at least one address to retrieve the motion vector data for at least one of the plurality of neighboring video data units determined to be available; and
reconstructing a motion vector for the current video data unit based on the motion vector data retrieved for the at least one of the plurality of neighboring video data units determined to be available.

16. The method of claim 1, wherein processing the current video data unit comprises decoding the current video data unit based on the determination.

17. An apparatus comprising:
an availability determination unit that includes an availability counter,
wherein the availability determination unit increments the availability counter after each of the plurality of video data units is processed and determines, based on the availability counter, whether one or more of the plurality of video data units (i) have been previously decoded and (ii) are available for use as neighboring video data units in the processing of a current one of the plurality of video data units based in part on whether the current video data unit comprises a first or a last video data unit in a row of the plurality of video data units, and
another unit that processes the current video data unit based on the determination of whether one or more of the neighboring video data units are available.

18. The apparatus of claim 17, wherein the availability determination unit includes an availability module that determines whether the one or more of the plurality of neighboring video data units are available by:
obtaining one of one or more indices that identify the neighboring video data units;
determining whether the current video data unit comprises the first or the last video data unit in the row of the plurality of video data units;
setting at least one flag based on the determination of whether the current video data unit comprises the first or last video data unit in the row;
determining a width of the row as a function of a number of video data units in the row;
setting a plurality of neighboring availability flags based on the availability counter, the at least one flag, and the width; and
outputting one of the plurality of neighboring availability flags based on the obtained one of the indices that indicates the availability of the corresponding one of the plurality of neighboring video data units.

19. The apparatus of claim 18, wherein the availability module sets the plurality of neighboring availability flags by setting a flag for each of a top, top-right, left, and top-left neighboring video data unit.

20. The apparatus of claim 17,
wherein the availability determination unit determines whether the one or more of the plurality of neighboring video data units are available by obtaining at least one of a plurality of indices identifying the plurality of neighboring video data units, and
wherein the apparatus further comprises a geometric resolution unit that includes a plurality of look-up tables (LUTs) to determine the plurality indices by:
determining, while processing the current video data unit, a partition width and a video unit number of the current video data unit; and
accessing, using the determined partition width and the video unit number, the plurality of look-up tables (LUTs) to output the one or more indices identifying the plurality of neighboring video data units.

21. The apparatus of claim 20, wherein the geometric resolution unit accesses the plurality of LUTs by accessing, using the determined partition width and video unit number, a first one of the plurality of LUTs to resolve a geometric relationship between the current video data unit and the one or more of the plurality of neighboring video data units assuming that the current and neighboring video data units are each encoded according to a first one of at least two coding modes to output the one or more indices.

22. The apparatus of claim 21,
wherein the first coding mode comprises a non-MacroBlock Adaptive Field/Frame (non-MBAFF) coding mode, and
wherein a second one of the at least two coding modes comprises a MacroBlock Adaptive Field/Frame (MBAFF) coding mode.

23. The apparatus of claim 21, wherein the geometric resolution unit accesses the first LUT by:
selecting one of a plurality of tables based on the partition width;
loading the first LUT with the selected one of the tables; and
accessing the first LUT using the first block index to output the one or more indices in accordance with the selected one of the tables.

24. The apparatus of claim 21, wherein the geometric resolution unit accesses the first LUT by outputting the one or more indices to a second one of the plurality of LUTs, wherein each of the one or more indices includes a flag that indicates whether the respective one or more of the plurality of neighboring video data units reside outside of the current video data unit.

25. The apparatus of claim 24, wherein the geometric resolution unit accesses the one or more LUTs by further:
determining whether to access the second LUT based on the flag of each of the one or more indices; and
accessing the second LUT when at least one of the flags of each of the one or more indices indicates that the respective one the plurality of neighboring video data units reside outside of the current video data unit to output corresponding adjusted indices, wherein the adjusted indices account for when the assumption is incorrect and the current and neighboring video data units are encoded according to MacroBlock Adaptive Field/Frame (MBAFF) coded frame.

26. The apparatus of claim 25, wherein the geometric resolution unit accesses the second one of the plurality of LUTs to output the corresponding adjusted indices by:
   obtaining one of the indices from the first LUT;
   determining a first flag that indicates a field coding mode of the current video data unit;
   determining a second flag that indicates a bottom position of the current video data unit;
   determining a plurality of neighboring flags that indicate the field coding mode for the corresponding plurality of neighboring video data units;
   selecting one of a plurality of tables based on the obtained one of the indices;
   loading the table into the second LUT; and
   accessing the second LUT using the obtained one of the indices, the first and second flags and the plurality of neighboring flags to output a corresponding one of the adjusted indices.

27. The apparatus of claim 26, wherein the geometric resolution unit accesses the second LUT by passing through as the corresponding adjusted index those of the plurality of indices that each include the flag that indicates that the respective one of the plurality of neighboring video data units reside within the current video data unit without accessing the second LUT.

28. The apparatus of claim 20, wherein the other unit comprises a motion vector (MV) location unit that processes the current video data unit based on the determination by:
   accessing, for each of the neighboring video data units determined to be available, another look-up table (LUT) based on one of the one or more indices to determine a location of motion vector data within the corresponding one of the plurality of neighboring video data unit determined to be available.

29. The apparatus of claim 28, wherein the MV location unit accesses the other LUT by:
   obtaining one of the one or more indices;
   determining a mode input that identifies a type of partitioning for the current video data unit; and
   accessing the other LUT using the obtained one of the indices and the determined mode to output an index identifying the location of the motion vector data within the corresponding one of the plurality of neighboring video data units.

30. The apparatus of claim 29,
   wherein the other unit further comprises an address mapping and access module that processes the current video data unit based on the determination by further:
   mapping at least one of index that identifies the location of the motion vector data to at least one address; and
   accessing a memory using the at least one address to retrieve the motion vector data for at least one of the plurality of neighboring video data units determined to be available, and
   wherein the other unit comprises a motion vector reconstruction unit that processes the current video data unit by reconstructing a motion vector for the current video data unit based on the motion vector data retrieved for the at least one of the plurality of neighboring video data units determined to be available.

31. The apparatus of claim 17,
   wherein the apparatus comprises a decoder that includes the availability unit and the other unit, and
   wherein the decoder processes the current video data unit by decoding the current video data unit.

32. The apparatus of claim 17, wherein the apparatus comprises a wireless communication device.

33. The apparatus of claim 17, wherein the apparatus comprises an integrated circuit.

34. An apparatus comprising:
   means for incrementing an availability counter after each of the plurality of video data units is processed;
   means for determining, based on the availability counter, whether one or more of the plurality of video data units (i) have been previously decoded and (ii) are available for use as neighboring video data units in the processing of a current one of the plurality of video data units based in part on whether the current video data unit comprises a first or a last video data unit in a row of the plurality of video data units; and
   means for processing the current video data unit based on the determination.

35. The apparatus of claim 34, wherein the means for determining whether the one or more of the plurality of neighboring video data units are available comprises:
   means for obtaining one of one or more indices that identify the neighboring video data units;
   means for determining whether the current video data unit comprises the first or the last video data unit in the row of the plurality of video data units;
   means for setting at least one flag based on the determination of whether the current video data unit comprises the first or last video data unit in the row;
   means for determining a width of the row as a function of a number of video data units in the row;
   means for setting a plurality of neighboring availability flags based on the availability counter, the at least one flag, and the width; and
   means for outputting one of the plurality of neighboring availability flags based on the obtained one of the indices that indicates the availability of the corresponding one of the plurality of neighboring video data units.

36. The apparatus of claim 35, wherein the means for setting the plurality of neighboring availability flags comprises means for setting a flag for each of a top, top-right, left, and top-left neighboring video data unit.

37. The apparatus of claim 34,
   wherein the means for determining whether the one or more of the plurality of neighboring video data units are available comprises means for obtaining at least one of a plurality of indices identifying the plurality of neighboring video data units, and
   wherein the apparatus further comprises means for determining the plurality of indices that includes:
   means for determining, while processing the current video data unit, a partition width and a video unit number of the current video data unit; and
   means for accessing, using the determined partition width and the video unit number, a plurality of look-up tables (LUTs) to output the one or more indices identifying the plurality of neighboring video data units.

38. The apparatus of claim 37, wherein the means for accessing the plurality of LUTs comprises means for accessing, using the determined partition width and video unit number, a first one of the plurality of LUTs to resolve a geometric relationship between the current video data unit and the one or more of the plurality of neighboring video data units assuming that the current and neighboring video data units are each encoded according to a first one of at least two coding modes to output the one or more indices.

39. The apparatus of claim 38,
   wherein the first coding mode comprises a non-MacroBlock Adaptive Field/Frame (non-MBAFF) coding mode, and wherein a second one of the at least two coding modes comprises a MacroBlock Adaptive Field/Frame (MBAFF) coding mode.

40. The apparatus of claim 38, wherein the means for accessing the first LUT comprises outputting the one or more indices to a second one of the plurality of LUTs, wherein each of the one or more indices includes a flag that indicates whether the respective one or more of the plurality of neighboring video data units reside outside of the current video data unit.

41. The apparatus of claim 40, wherein the means for accessing the one or more LUTs further comprises:
means for determining whether to access the second LUT based on the flag of each of the one or more indices; and
means for accessing the second LUT when at least one of the flags of each of the one or more indices indicates that the respective one the plurality of neighboring video data units reside outside of the current video data unit to output corresponding adjusted indices, wherein the adjusted indices account for when the assumption is incorrect and the current and neighboring video data units are encoded according to MacroBlock Adaptive Field/Frame (MBAFF) coded frame.

42. The apparatus of claim 41, wherein the means for accessing the second one of the plurality of LUTs to output the corresponding adjusted indices comprises:
means for obtaining one of the indices from the first LUT;
means for determining a first flag that indicates a field coding mode of the current video data unit;
means for determining a second flag that indicates a bottom position of the current video data unit;
means for determining a plurality of neighboring flags that indicate the field coding mode for the corresponding plurality of neighboring video data units;
means for selecting one of a plurality of tables based on the obtained one of the indices;
means for loading the table into the second LUT; and
means for accessing the second LUT using the obtained one of the indices, the first and second flags and the plurality of neighboring flags to output a corresponding one of the adjusted indices.

43. The apparatus of claim 37, wherein the means for processing the current video data unit based on the determination comprises means for accessing, for each of the neighboring video data units determined to be available, another look-up table (LUT) based on one of the one or more indices to determine a location of motion vector data within the corresponding one of the plurality of neighboring video data unit determined to be available.

44. The apparatus of claim 43, wherein the means for accessing the other LUT comprises:
means for obtaining one of the one or more indices;
means for determining a mode input that identifies a type of partitioning for the current video data unit; and
means for accessing the other LUT using the obtained one of the indices and the determined mode to output an index identifying the location of the motion vector data within the corresponding one of the plurality of neighboring video data units.

45. The apparatus of claim 43, wherein the means for processing the current video data unit based on the determination further comprises:

means for mapping at least one of index that identifies the location of the motion vector data to at least one address;
means for accessing a memory using the at least one address to retrieve the motion vector data for at least one of the plurality of neighboring video data units determined to be available; and
means for reconstructing a motion vector for the current video data unit based on the motion vector data retrieved for the at least one of the plurality of neighboring video data units determined to be available.

46. The apparatus of claim 34,
wherein the means for processing the plurality of video data units comprises means for decoding the plurality of video data units defined by the video data, and
wherein the means for processing the current video data unit comprises means for decoding the current video data unit based on the determination.

47. A non-transitory computer-readable storage medium comprising instructions that cause a programmable processor to:
process a plurality of video data units defined by video data;
increment an availability counter after each of the plurality of video data units is processed;
determine, based on the availability counter, whether one or more of the plurality of video data units (i) have been previously decoded and (ii) are available for use as neighboring video data units in the processing of a current one of the plurality of video data units based in part on whether the current video data unit comprises a first or a last video data unit in a row of the plurality of video data units; and
process the current video data unit based on the determination.

48. The computer-readable storage medium of claim 47, wherein the instruction cause the processor to determine whether the one or more of the plurality of neighboring video data units are available by:
obtaining one of one or more indices that identify the neighboring video data units;
determining whether the current video data unit comprises the first or the last video data unit in the row of the plurality of video data units;
setting at least one flag based on the determination of whether the current video data unit comprises the first or last video data unit in the row;
determining a width of the row as a function of a number of video data units in the row;
setting a plurality of neighboring availability flags based on the availability counter, the at least one flag, and the width; and
outputting one of the plurality of neighboring availability flags based on the obtained one of the indices that indicates the availability of the corresponding one of the plurality of neighboring video data units.

49. The computer-readable storage medium of claim 48, wherein the instruction cause the processor to set the plurality of neighboring availability flags by setting a flag for each of a top, top-right, left, and top-left neighboring video data unit.

* * * * *